(12) United States Patent
Yamagishi et al.

(10) Patent No.: US 11,522,933 B2
(45) Date of Patent: Dec. 6, 2022

(54) INFORMATION PROCESSING APPARATUS AND INFORMATION PROCESSING METHOD

(71) Applicant: SONY GROUP CORPORATION, Tokyo (JP)

(72) Inventors: Yasuaki Yamagishi, Kanagawa (JP); Kazuhiko Takabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/424,742

(22) PCT Filed: Jan. 29, 2020

(86) PCT No.: PCT/JP2020/003079
§ 371 (c)(1),
(2) Date: Jul. 21, 2021

(87) PCT Pub. No.: WO2020/166323
PCT Pub. Date: Aug. 20, 2020

(65) Prior Publication Data
US 2022/0124139 A1   Apr. 21, 2022

(30) Foreign Application Priority Data

Feb. 12, 2019   (JP) .............................. JP2019-022675

(51) Int. Cl.
*H04L 65/65*   (2022.01)
*H04L 65/1069*   (2022.01)
(Continued)

(52) U.S. Cl.
CPC .......... *H04L 65/65* (2022.05); *H04L 65/1069* (2013.01); *H04L 67/101* (2013.01); *H04L 67/1025* (2013.01)

(58) Field of Classification Search
CPC . H04L 65/608; H04L 65/1069; H04L 67/101; H04L 67/1025
(Continued)

(56) References Cited

U.S. PATENT DOCUMENTS 9,614,714 B2 *   4/2017   Belling ............. H04L 29/06176
2011/0090902 A1 *   4/2011   Jung ................... H04L 65/1006
709/204

(Continued)

FOREIGN PATENT DOCUMENTS

JP   2007-036835 A   2/2007
JP   2014-527769 A   10/2014
(Continued)

OTHER PUBLICATIONS

3rd Generation Partnership Project; Technical Specification Group Services and System Aspects; IP Multimedia Subsystem (IMS); Multimedia Telephony; Media handling and interaction (Release 15), 3GPP TS 26.114 V15.1.0, Dec. 2017, pp. 1-399, 3GPP.
(Continued)

*Primary Examiner* — Meng Vang
(74) *Attorney, Agent, or Firm* — Paratus Law Group, PLLC

(57) ABSTRACT

There is provided an information processing apparatus and an information processing method that enable uplink streaming to be performed adaptively. In an information processing system, a communication module that performs protocol negotiation for content uplink stream transmits to a different communication device a Service object that includes information regarding stream of a content for use in the protocol negotiation, receives from the different communication device information for negotiation transmitted on the basis of the Service object, and performs control protocol negotiation for the content uplink stream with the different
(Continued)

communication device. The present technology can be applied to a communication system that performs uplink streaming, for example.

19 Claims, 48 Drawing Sheets

(51) Int. Cl.
  *H04L 67/101* (2022.01)
  *H04L 67/1025* (2022.01)
(58) Field of Classification Search
  USPC .......................................................... 709/231
  See application file for complete search history.

(56) References Cited

U.S. PATENT DOCUMENTS

| | | | |
|---|---|---|---|
| 2012/0212569 A1* | 8/2012 | Lei ................... | H04W 36/0022 348/14.02 |
| 2014/0146129 A1* | 5/2014 | Ye .......................... | H04N 7/147 348/14.09 |
| 2015/0163788 A1* | 6/2015 | Karunakaran ........ | H04L 67/148 370/254 |
| 2016/0021163 A1* | 1/2016 | Lee ....................... | H04L 65/103 370/352 |
| 2016/0234261 A1* | 8/2016 | Tietsch ............... | H04L 65/1016 |
| 2018/0367579 A1 | 12/2018 | Kolan et al. | |

FOREIGN PATENT DOCUMENTS

| | | |
|---|---|---|
| JP | 2017-500805 A | 1/2017 |
| JP | 2018-190040 A | 11/2018 |

OTHER PUBLICATIONS

3rd Generation Partnership Project; Technical Specification Group Services and System Aspects; Uplink Streaming (Release 15), 3GPP TS 26.238 V15.0.0, Dec. 2017, pp. 1-32, 3GPP.

* cited by examiner

FIG. 13

```
<workflow startTime="(PROCESSING START ABSOLUTE TIME (IN CASE OF SCHEDULE TYPE))">
  <seq> (REPRESENTING SEQUENTIAL PROCESSING OF CHILD ELEMENT)
    <Application url='FLUS-Sink-url'
      delayLimit="(DELAY LIMIT FOR PROCESSING (OFFSET))" >
      <OutputDescription/><ResourceDescription/>
    </Application>
    <par> (REPRESENTING PARALLEL PROCESSING OF CHILD ELEMENTS)
      <Application url='Transcode-url'
        delayLimit="(DELAY LIMIT FOR PROCESSING (OFFSET))" >
        <InputDescription/><OutputDescription/><ResourceDescription/>
      </Application>
      <Application url='Cache/PStorage-url'
        delayLimit="(DELAY LIMIT FOR PROCESSING (OFFSET))" >
        <InputDescription/><ResourceDescription/>
      </Application>
    </par>
    <Application url='Distribution-url'
      delayLimit="(DELAY LIMIT FOR PROCESSING (OFFSET))" >
      <InputDescription/><ResourceDescription/>
    </Application>
  </seq>
</workflow>
```

```
<Workflow>
 <Seq>
  <Application url='FLUS-Sink-url'>
   <OutputDescription/><ResourceDescription/>
  </Application>
  <Application name='Production-url'>
   <InputDescription/><ResourceDescription/>
  </Application>
 </Seq>
</Workflow>
```

```
<ResourceDescription>
 <ResourceClass
    id='urn:generic_resource_class:AVC-UHDTV-4K-10-4-2-2-AllIntra-DASH'
    t='60000.123(sec)'>
 </ResourceDescription>
```

FIG. 28

```
<ResourceDescription>
  <ResourceClass
    id='urn:vendor_specific_resource_class:MEHostVendorXXX:PStorage-1TByte'
    startTime='2002-09-24-06:00' endTime='2002-09-24-06:30'>
</ResourceDescription>
```

FIG. 31

```
<Workflow>
<Seq>
<Application url='FLUS-Sink-url'>
<OutputDescription/><ResourceDescription/>
</Application>
<Par>
<Application url='Cache/PStorage-url'>
<InputDescription/><ResourceDescription/>
</Application>
<Application url='Distribution-url'>
<InputDescription/><ResourceDescription/>
</Application>
</Par>
</Seq>
</Workflow>
```

FIG. 35

```
Service/
 …
 Policy @DoNotMigrate='true': (ME-Host TRANSFER NOT ALLOWED), OR false (ALLOWED (DEFAULT))'
```

FIG. 48

```
<Workflow>
 <Seq>
  <Application url='FLUS-Sink-url' duplicate='true' />
  <Par>
   <Application url='Cache/PStorage-url' duplicate='true' />
   <Application url='Distribution-url' />
  </Par>
 </Seq>
</Workflow>
```

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2020/003079 (filed on Jan. 29, 2020) under 35 U.S.C. § 371, which claims priority to Japanese Patent Application No. 2019-022675 (filed on Feb. 12, 2019), which are all hereby incorporated by reference in their entirety.

TECHNICAL FIELD

The present disclosure relates to an information processing apparatus and an information processing method, and more specifically to an information processing apparatus and an information processing method that enable uplink streaming to be performed adaptively.

BACKGROUND ART

In recent years, the number of use cases of distributing streams such as User Generated Contents (UGC) contents generated by general users is increasing. Along with this, there is a possibility that a standard content (stream) uplink interface will be supported in a distribution platform called a video ecosystem.

For example, in such use cases, it is assumed that a wide variety of streams recorded using not only a low-cost smartphone camera or video camera but also a professional-use camera for business purposes will be uplinked. Therefore, the stream uplink interface is required to be able to deal with all of them adaptively.

Furthermore, in accordance with transition to the fifth generation mobile communication system (hereinafter referred to as 5G), it is assumed that ultra-high quality uplink of professional-use recorded streams via carrier networks and Internet networks will become common in the future. Moreover, it is assumed that instant capture and instant uplink using any capture mobile device, such as a smartphone, a digital still camera, and a wearable terminal, will become common. Therefore, there will be a strong demand for a cloud-native media processing environment in which the streams are processed in a media processing system on the cloud with low latency and then passed to a distribution system.

For example, a Framework For Live Uplink Streaming (FLUS) framework is currently under consideration in Third Generation Partnership Project (3GPP) as an upload interface from a stream capture device to the cloud (refer to Non-Patent Documents 1 and 2, for example).

CITATION LIST

Non-Patent Documents

Non-Patent Document 1: 3GPP TS 26.238 V15.0.0 (2017-12) 3rd Generation Partnership Project; Technical Specification Group Services and System Aspects; Uplink Streaming (Release 15)
Non-Patent Document 2: 3GPP TS 26.114 V15.1.0 (2017-12) 3rd Generation Partnership Project; Technical Specification Group Services and System Aspects; IP Multimedia Subsystem (IMS); Multimedia Telephony; Media handling and interaction (Release 15)

SUMMARY OF THE INVENTION

Problems to be Solved by the Invention

As described above, the stream uplink interface that uplinks a wide variety of streams is required to deal with any use case adaptively.

The present disclosure has been made in view of such circumstances, and is intended to enable uplink streaming to be performed adaptively.

Solutions to Problems

In an information processing apparatus as an aspect of the present disclosure, a communication module that performs protocol negotiation for content uplink stream transmits to a different communication device a Service object that includes information regarding stream of a content for use in the protocol negotiation, receives from the different communication device information for negotiation transmitted on the basis of the Service object, and performs control protocol negotiation for the content uplink stream with the different communication device.

An information processing method as an aspect of the present disclosure includes a communication module that performs protocol negotiation for content uplink stream, transmitting to a different communication device a Service object that includes information regarding stream of a content for use in the protocol negotiation, receiving from the different communication device information for negotiation transmitted on the basis of the Service object, and performing control protocol negotiation for the content uplink stream with the different communication device.

In an aspect of the present disclosure, a Service object that includes information regarding stream of a content for use in protocol negotiation is transmitted to a different communication device, information for negotiation transmitted on the basis of the Service object is received from the different communication device, and control protocol negotiation for content uplink stream is performed with the different communication device.

BRIEF DESCRIPTION OF DRAWINGS

FIG. 13 is a diagram illustrating an example of Workflow-Description.

FIG. 28 is a diagram illustrating a description example of ResourceClass@startTime and ResourceClass@endTime in the resource description.

FIG. 31 is a diagram illustrating a description example of Workflow-Description.

FIG. 35 is a diagram illustrating DoNotMigrate.

FIG. 48 is a diagram illustrating a description example of Workflow-Description.

MODE FOR CARRYING OUT THE INVENTION

Hereinafter, specific embodiments to which the present technology has been applied will be described in detail with reference to the drawings.

<Overview of Present Technology>

First, an overview of the present technology will be described with reference to FIGS. 1 to 3.

Figure 1:
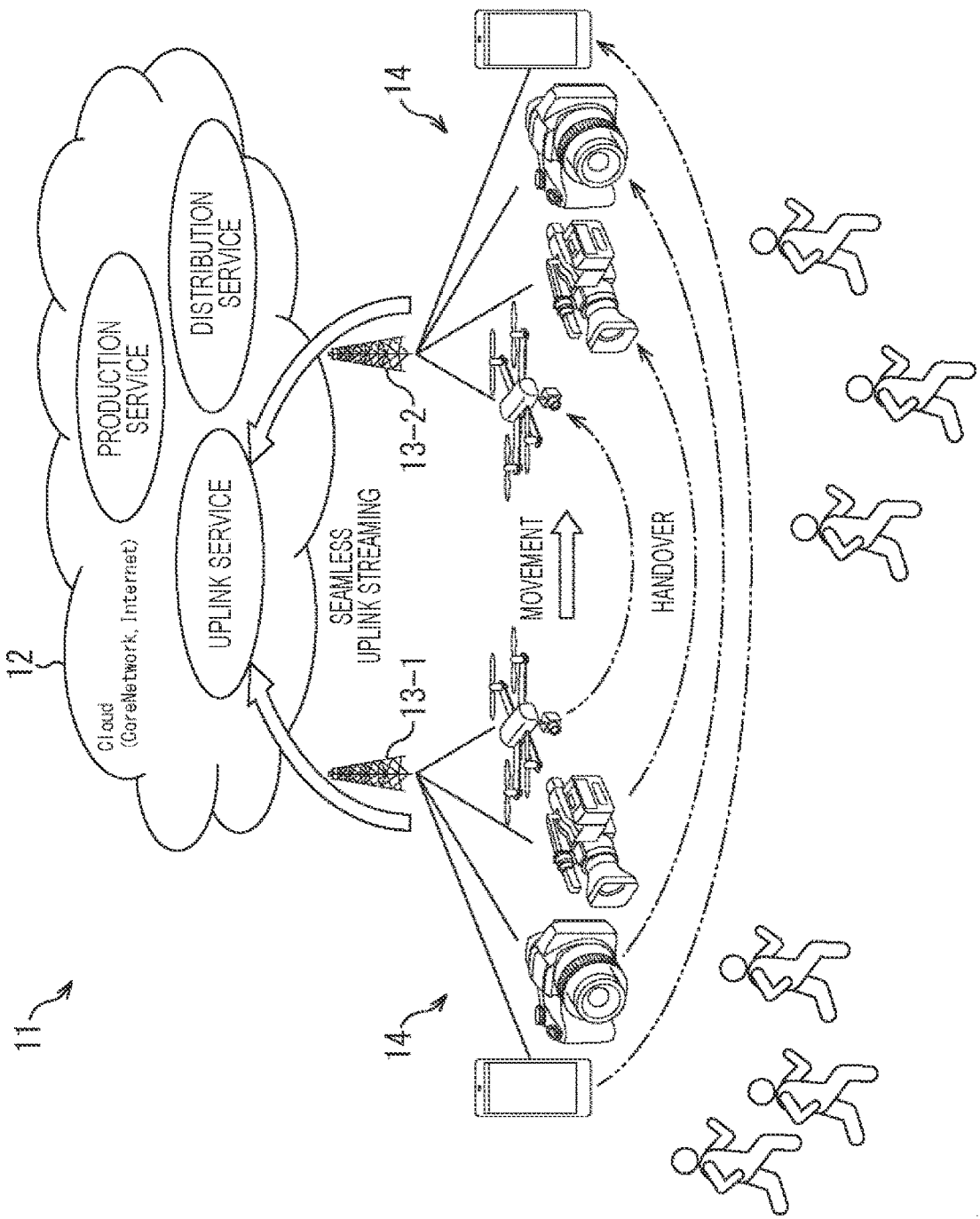
FIG. 1 is a diagram illustrating a use case in which an information processing system to which the present technology has been applied is assumed to be used.

FIG. 1 is a diagram illustrating a use case in which an information processing system to which the present technology has been applied is assumed to be used.

In a configuration example illustrated in FIG. 1, an information processing system 11 includes a cloud 12, a plurality of base stations 13, and a set of various user terminals 14.

The cloud 12 is formed as a plurality of servers is connected via a network and provides various services as the respective servers execute processing. For example, as illustrated in FIG. 1, the cloud 12 can provide an uplink service, a distribution service, a production service, and the like.

Each of the plurality of base stations 13 (in the example in FIG. 1, two base stations 13-1 and 13-2) communicates with the user terminals 14 in a cell that each of the base stations covers as a communicable range.

As the various user terminals 14, a professional camera, a digital still camera, a smartphone, a drone, and the like as illustrated in the figure can be used, for example. That is, the user terminal 14 is a mobile network capture device that implements a stream uplink function via a network and can communicate with the base station 13 while capturing a moving image to uplink the stream to the cloud 12.

Then, in the information processing system 11 configured in such a manner, it is required to enable protocol and resource negotiation in uplink streaming to be performed adaptively (first and second embodiments).

Moreover, in the information processing system 11, in a case where the user terminal 14 moves between cells from the base station 13-1 to the base station 13-2, for example, handover is performed between the base station 13-1 and the base station 13-2. At this time, it is required to enable uplink streaming to be performed seamlessly (third and fourth embodiments). Here, the seamless uplink means that, even in a case where the user terminal 14 is capturing a moving subject and moving from cell to cell with the subject, a live capturing stream is streamed seamlessly.

Specifically, as a use case of the information processing system 11, live broadcasting of long-distance movement such as a marathon is assumed. In such live broadcasting, in a case where uplink streaming is interrupted in an environment where the destination cell is congested, the broadcasting cannot be performed. For this reason, seamless uplink of the stream itself is required. Furthermore, appropriate control on the capture device side (or via the capture device on the basis of the intention on the production service side) is required in consideration of processing and distribution subsequent to the uplink.

Details of the environment assumed as the information processing system 11 will be described with reference to FIG. 2.

For example, at present, a Multi-access Edge Computing (MEC) architecture is assumed as a network that can be used in the information processing system 11 as described in FIG. 1.

In the MEC architecture, a FLUS-Source 21 implemented on a user terminal 14 is first connected to a FLUS-Sink 41 implemented on a Multi-access Edge Host (ME-Host) 31 serving as an edge server provided for each base station 13. For example, the FLUS-Source 21 is a streaming transmission module implemented on a client that transmits an uplink stream. The FLUS-Sink 41 is a streaming reception module implemented on a server that receives an uplink stream from the FLUS-Source 21. At this time, cache, storage processing, transcoding processing (see FIG. 3), and the like are executed as MEC applications at the subsequent stage to the FLUS-Sink 41.

Then, in a case where the user terminal 14 moves from the cell of the base station 13-1 to the cell of the base station 13-2, handover occurs between the base station 13-1 and the base station 13-2. At this time, the MEC applications that have been executed in an MEC environment bound to the cell before the user terminal 14 moves are also transferred to an MEC environment bound to the cell after the user terminal 14 moves.

That is, as the handover occurs, a FLUS-Sink 41-1 of an ME-Host 31-1 is shifted to a FLUS-Sink 41-2 of an ME-Host 31-2. By shifting an ME-Host 31 (MEC environment) in this manner, the information processing system 11 can make the most of the advantages of MEC computing such as low latency and load distribution.

Figure 2:
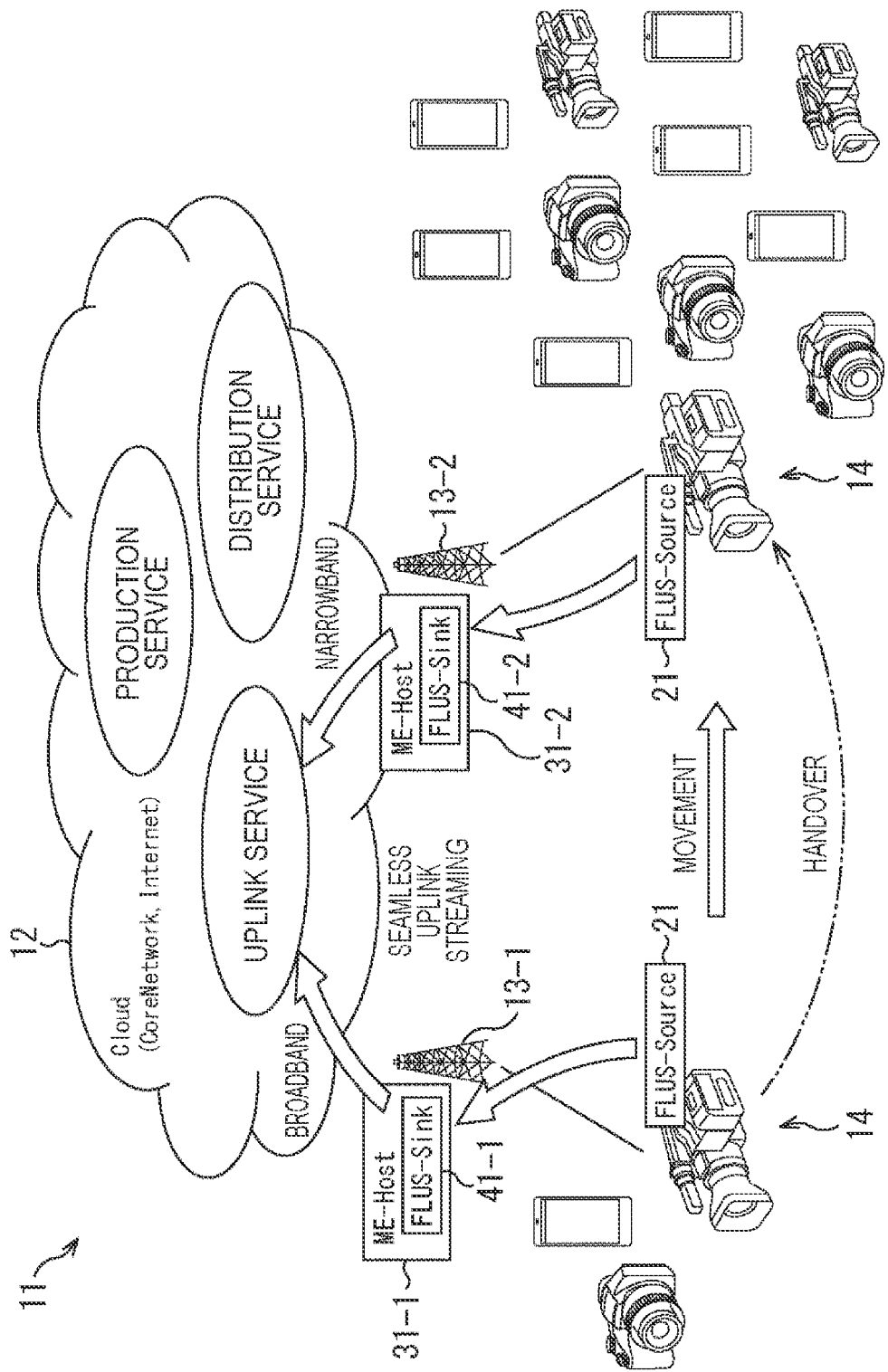
FIG. 2 is a diagram illustrating details of an environment assumed as the information processing system.

At this time, as illustrated in FIG. 2, it is assumed that there are more user terminals 14 in the cell of the base station 13-2 than in the cell of the base station 13-1. In this case, for example, a situation occurs in which, although the base station 13-1 before the transfer is in an environment where broadband (baseband or Visually Lossless) uplink is possible, the base station 13-2 after the transfer is in an environment where only narrowband (Intra-GOP or Long-GOP) uplink is possible. Under such circumstances, in the movement of the user terminal 14, it is required to enable uplink to be as seamless as possible before and after the movement.

Moreover, it is required to enable seamless uplink streaming control by achieving adaptive uplink in consideration of a distribution situation before and after such a transfer.

Therefore, as described below, in the present embodiment, a standard protocol (API: Application Programming Interface) and a flow (sequence) that can be used in the MEC architecture required to achieve seamless uplink such as the above-mentioned advance preparation are newly proposed.

Here, the content of a known technology will be described.

First, a technology in which the ME-Host 31-1 in the vicinity of the user terminal 14 executes server-side applications related to the user terminal 14 is a known technology. However, a technology in which a range of applications related to stream processing is conveyed to an ME-Platform side in a case where dynamic configuration changes occur is unknown.

That is, in the ME-Host 31, there is no standard protocol for the FLUS-Sink 41, which directly communicates with the user terminal 14, to define a series of Host applications related to stream processing existing at the subsequent stage to the FLUS-Sink 41 on the ME-Host 31 and convey the series to the ME-Platform.

Furthermore, a technology in which, on the ME-Host 31, applications migrate when the user terminal 14 is handed over between the ME-Host 31-1 and the ME-Host 31-2, for example, is a known technology. On the other hand, resource negotiation required to execute applications at the migration destination is not specified as a standard protocol.

Furthermore, European Telecommunications Standards Institute (ETSI) specifies a framework for registering general application execution conditions (static memory, a disc upper limit, and the like) in the ME-Platform. However, no technology is known to negotiate necessary requirements for execution of the applications.

Here, the content newly proposed in the present disclosure will be described.

First, proposed is to newly define "Workflow-Description", which performs, in the ME-Host 31-1 in the vicinity of the user terminal 14, processing for connecting the FLUS-Source 21 on the user terminal 14 to the FLUS-Sink 41-1, and which then enables services (applications) for processing a media stream at the subsequent stage (for example, the cloud 12) to be executed. Moreover, to enable such processing to deal with dynamic configuration changes, newly proposed is the Workflow-Description, which stores therein as information a series of applications related to processing of the media stream.

Furthermore, newly proposed is to define the Workflow-Description so that the FLUS-Source 21 can control whether or not applications at the subsequent stage to the FLUS-Sink 41 can be migrated between the ME-Hosts 31, conditions at the time of execution at the migration destination (streaming quality and a protocol), and the like.

Specifically, conditions required for resource negotiation at the migration destination can be described in the Workflow-Description so that the negotiation can be performed at the will of the FLUS-Source 21 side. That is, newly proposed is to enable the FLUS-Source 21 side to specify the Workflow-Description and declare or convey resources required for migration and expected quality so as to enable service quality after the transfer to be predicted and ensured in advance. Newly proposed is to enable resources before the transfer to be maintained if on the other hand the service quality after the transfer cannot be ensured.

Furthermore, proposed is to alleviate the resource negotiation by storing, for each application related to processing of a media stream described in the Workflow-Description, class identification as resource evaluation indices required for the processing (executed in the reference system to define a set) as information. That is, by allowing the expected resource amount to be specified by MEC-system-dependent class definition instead of specifying the amount numerically, the complexity of a way to specify resource description that describes conditions for executing the application defined in the Workflow-Description can be alleviated. Furthermore, by identifying the corresponding class in the reference MEC system in advance, accuracy of class identification can be improved.

Therefore, in the present embodiment, as described below, in a case where a transfer destination cell can be predicted, that is, in a case where the congestion state of the transfer destination cell can be predicted, negotiation is performed to reserve resources required after movement in advance before moving to the transfer destination cell. Furthermore, a CPU resource, a storage region, input/output (IO) throughput, and the like required for the FLUS-Sink 41 (and subsequent processing) to be operated on the ME-Host 31 bound to the transfer destination cell are reserved. Moreover, in a case where there are two transfer destination cells at the same time, the more advantageous cell can be selected, and uplink can be performed seamlessly, under the condition that the cells have a hierarchical relationship in terms of coverage and that the position is at a cell boundary. Furthermore, in a case where the transfer destination cell cannot be predicted or in order to ensure fault tolerance redundancy, the FLUS-Sink 41 (and subsequent processing) is executed on the ME-Hosts 31 bound to a plurality of adjacent cells to allow a plurality of uplink sessions to be synchronized.

Figure 3:
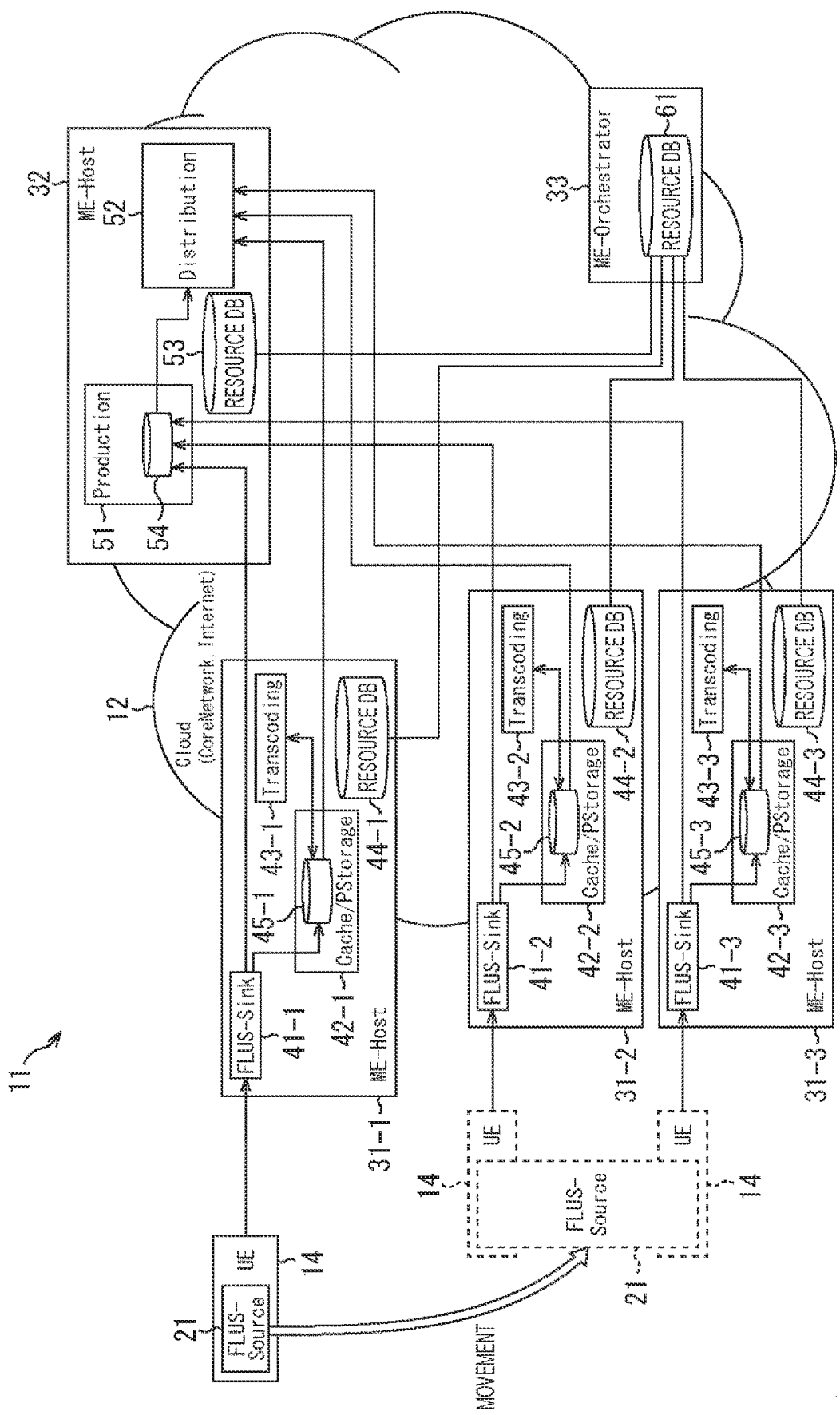
FIG. 3 is a block diagram illustrating a configuration example of the information processing system to which the present technology has been applied.

FIG. 3 is a block diagram illustrating a configuration example of an information processing system to which the present technology has been applied.

In the information processing system 11 illustrated in FIG. 3, the cloud 12 includes ME-Hosts 31-1 to 31-3 that provide uplink services and an ME-Host 32 that provides a distribution service and a production service. The cloud 12 also includes an ME-Orchestrator 33 that performs settings for the ME-Hosts 31-1 to 31-3 and the ME-Host 32 in an integrated manner.

FIG. 3 illustrates a state in which the user terminal (UE: User Equipment) 14 moves from the cell of the base station 13-1 in which the ME-Host 31-1 is provided to either the cell of the base station 13-2 in which the ME-Host 31-2 is provided or the cell of a base station 13-3 (not illustrated) in which an ME-Host 31-3 is provided. Note that the ME-Hosts 31-1 to 31-3 are formed in similar manners, and in a case where the ME-Hosts 31-1 to 31-3 are not required to be distinguished, each of them will be referred to simply as the ME-Host 31, and each of the components of the ME-Host 31 will be referred to in a similar manner.

The ME-Host 31 includes the FLUS-Sink 41, a data retention processing unit (Cache/PStorage) 42, a transcoding processing unit 43, and a database retention unit 44, and the data retention processing unit (Cache/PStorage) 42 includes a storage device 45.

The ME-Host 32 includes a production network processing unit 51, a distribution processing unit 52, and a database retention unit 53, and the production network processing unit 51 includes a storage unit 54.

The ME-Orchestrator 33 includes a database retention unit 61, and the database retention unit 61 retains a resource database that manages the operating environment and identification information of each of the ME-Hosts 31 and 32 in real time.

<First Configuration Example of Information Processing System According to First Embodiment>

Referring to FIGS. 4 to 10, protocol and resource negotiation in uplink streaming will be described as a first configuration example of the information processing system according to the first embodiment. For example, the first configuration example of the information processing system according to the first embodiment has a characteristic in which the priority for selection of the Workflow-Description for use in uplink can be specified at the time of protocol negotiation between the FLUS-Source 21 and the FLUS-Sink 41.

Figure 4:
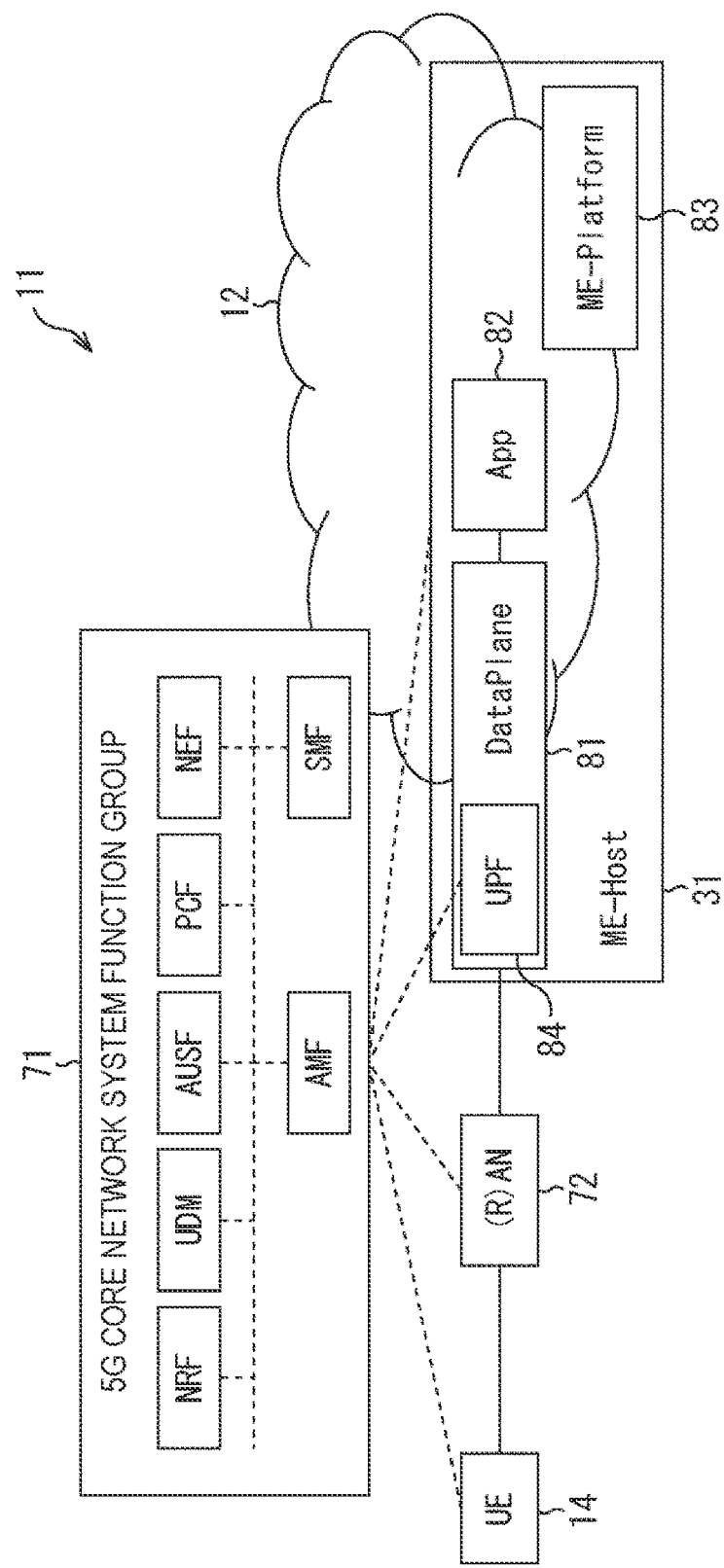
FIG. 4 is a diagram illustrating a first configuration example of the information processing system according to a first embodiment.

FIG. 4 illustrates, as the first configuration example of the information processing system 11 according to the first embodiment, a 5G core network system function group 71 and a session between the user terminal 14 and an application 82 in the ME-Host 31 serving as the MEC environment.

For example, in the information processing system 11, due to the edge server in edge computing, communication delay, which is one of the bottlenecks for conventional cloud computing, can significantly be prevented. Moreover, by executing distributed processing of a high-load application among the user terminal 14, the ME-Host 31 serving as the edge server, and the ME-Host 32 serving as the cloud server (FIG. 3), processing can be sped up.

Note that the standard specifications for this edge computing are specified in "ETSI-MEC". Also, the ME-Host in the ETSI-MEC corresponds to the ME-Host 31 serving as the edge server.

In the example illustrated in FIG. 4, the line connecting the application 82 on the ME-Host 31 to the user terminal 14 (an application implemented on the user terminal 14) via an access network 72 of the 5G core network 71 standardized in 3GPP represents a user data session. Note that the access network ((R)AN) 72 in the 5G core network 71 includes a wired access network (AN: Access Network) and a wireless access network (RAN: Radio Access Network).

Furthermore, on the ME-Host 31, there is an edge computing platform called an ME-Platform 83. Then, the application 82 executed on the ME-Platform 83 exchanges user data such as stream data with the user terminal 14 via a data plane 81 serving as an abstraction of the user data session with the user terminal 14. Here, the data plane 81 has a function as a User Plane Function (UPF) 84 in 3GPP. Note that the data plane 81 may have a function corresponding to the UPF 84.

Furthermore, the 5G core network 71 employs a service-based architecture, and a plurality of Network Functions (NFs), which are functions of the core network, is defined. Then, the NFs are connected via a unified interface called a service-based interface.

In the example of FIG. 4, illustrated as the NFs are an NF Repository Function (NRF: NF service discovery), a Unified Data Management (UDM: management of subscriber information), an Authentication Server Function (AUSF: management of UE authentication information), a Policy Control Function (PCF: control of policy related to mobility and session management for proper operation of an AMF and an SMF), a Network Exposure Function (NEF: provision of NF services to applications in an MNO network), an Access and Mobility Management Function (AMF: management, authentication, and authorization of UE mobility, and control of the SMF), and a Session Management Function (SMF: UE session management).

Protocol and resource negotiation will be described with reference to FIGS. 5 to 10.

Figure 5:
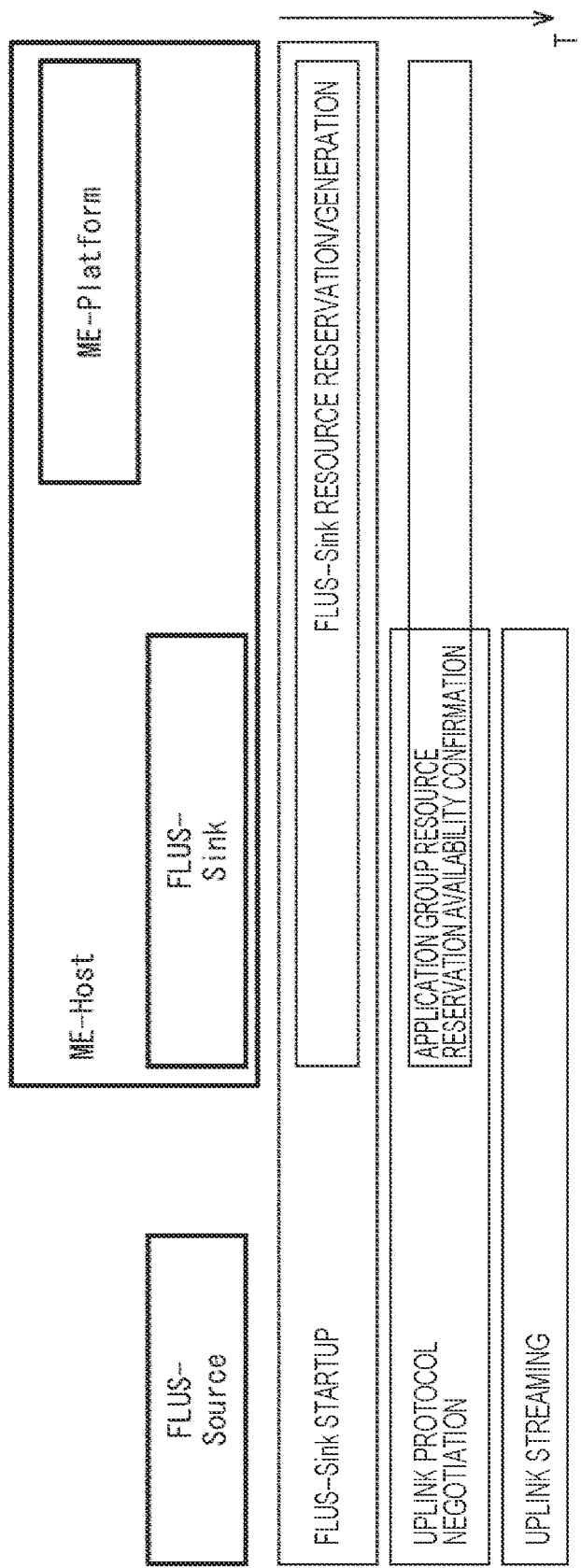
FIG. 5 is a diagram illustrating processing for starting uplink streaming.

FIG. 5 is a diagram illustrating processing for starting uplink streaming in the information processing system 11 in FIG. 4. Furthermore, FIG. 5 mainly illustrates processing performed between the FLUS-Source 21 and the FLUS-Sink 41.

First, FLUS-Sink startup processing is performed.

The FLUS-Sink startup processing is started by the FLUS-Source 21 and is performed with the ME-Platform 83, which causes the FLUS-Sink 41 to be started. Furthermore, FLUS-Sink resource reservation and generation processing is performed as one of pieces of FLUS-Sink startup processing. The FLUS-Sink resource reservation and generation processing is started by the ME-Platform 83 and is performed with the FLUS-Sink 41, which causes resources of the FLUS-Sink 41 to be reserved and generated.

Specifically, the FLUS-Source 21 accesses an API, provided by the MB-Platform 83, that controls operation of an application operated on the ME-Host 32. Then, the ME-Platform 83 secures required resources (for example, a calculation resource and a storage resource) on the ME-Host 32 and requests execution of the FLUS-Sink application. As a result, the FLUS-Sink 41 is started.

Furthermore, after the FLUS-Sink startup processing is performed, uplink protocol negotiation processing is performed.

The uplink protocol negotiation processing is started by the FLUS-Source 21 and is performed with the FLUS-Sink 41. Negotiation of a protocol for use in uplink streaming is performed, and the protocol is determined. Furthermore, as one of pieces of uplink protocol negotiation processing, resource reservation availability confirmation processing for a group of applications (application 82) is performed. The resource reservation availability confirmation processing for the group of applications is started by the FLUS-Sink 41 and is performed with the ME-Platform 83 to confirm whether or not a reservation for resources of the group of applications is available.

Then, after the uplink protocol negotiation processing is performed, uplink streaming is performed between the FLUS-Source 21 and the FLUS-Sink 41.

Figure 6:
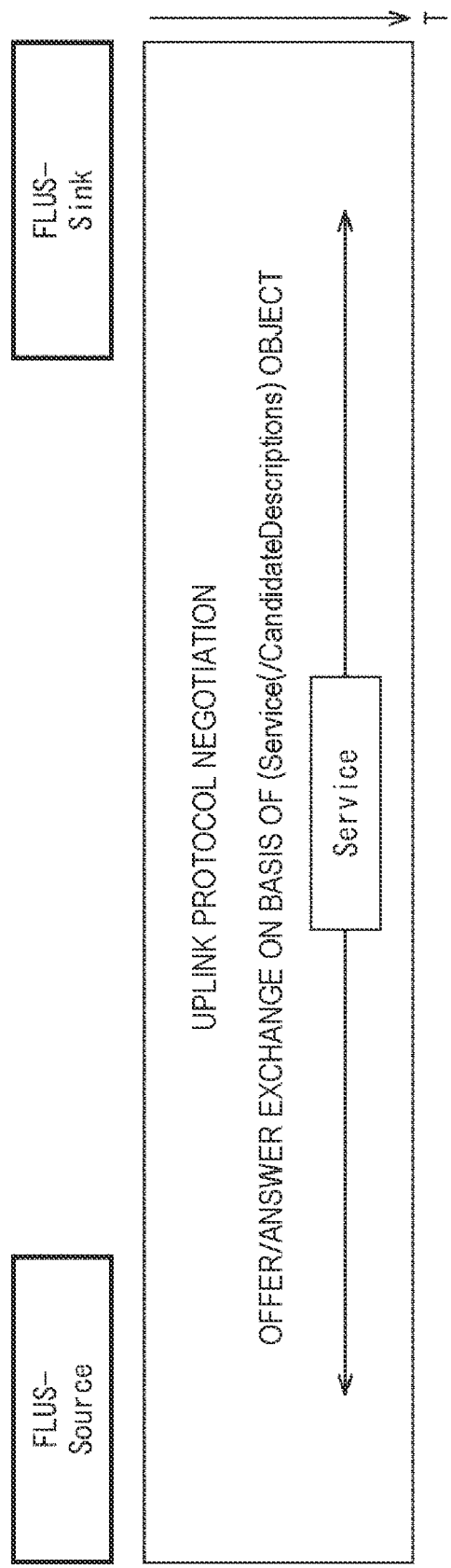
FIG. 6 is a diagram illustrating uplink protocol negotiation.

Here, as illustrated in FIG. 6, the FLUS-Source 21 communicates with the FLUS-Sink 41 on the basis of a Service object several times to perform the uplink protocol negotiation.

For example, the Service object is an object that stores information required to manage the session of the uplink streaming service from the FLUS-Source 21 to the FLUS-Sink 41, and in the Service object, information extracted from CandidateDescriptions selected as a result of the uplink protocol negotiation is stored in a Session object. This Session object has stored therein information about a protocol and a communication format for use in the session of the streaming service (Session Description) and includes information related to below-mentioned applications at the subsequent stage to the FLUS-Sink (for example, the application 82 in FIG. 11) (WorkflowDescription).

Specifically, first, in the Service object, as a CandidateDescriptions object, a plurality of CandidateDescriptions for a protocol and a format for use is described as candidates. Then, the FLUS-Source 21 and the FLUS-Sink 41 change the description to enable negotiation (offer/answer exchange) to be performed.

For example, in each CandidateDescription as a candidate, an sdId, which identifies the CandidateDescription itself, a SessionDescription, and a WorkflowDescription are arranged.

The SessionDescription has stored therein a url (or a file body) of a session description file (an SDP or an MPD) that describes a media container of a streaming protocol, a transport protocol, and the like. The WorkflowDescription represents a group of applications required to process the streaming, and a network resource, a calculation resource, a storage resource, and the like required for execution of the group of applications. Moreover, the priority assigned to each of the CandidateDescriptions is expressed by the list appearance order in the CandidateDescriptions object (for example, the higher the appearance rank is, the higher the priority is). This priority may be based on anything. For example, the priority may be determined in accordance with the network bandwidth situation or may be assigned in the negotiation on the basis of the network connection environment of the FLUS-Source 21.

Then, the FLUS-Source 21 and the FLUS-Sink 41 perform negotiation by listing CandidateDescriptions in the CandidateDescriptions in a priority order that the FLUS-Source 21 and the FLUS-Sink 41 expect and communicate in the Service/CandidateDescriptions object. Thereafter, when one candidate is finally determined, a value for a finally determined Session/CandidateDescription@sdId is stored in @SessionDescription of the Session object with Session @active='true', which indicates that the session is one determined as being active currently, and the session is determined.

Figure 7:
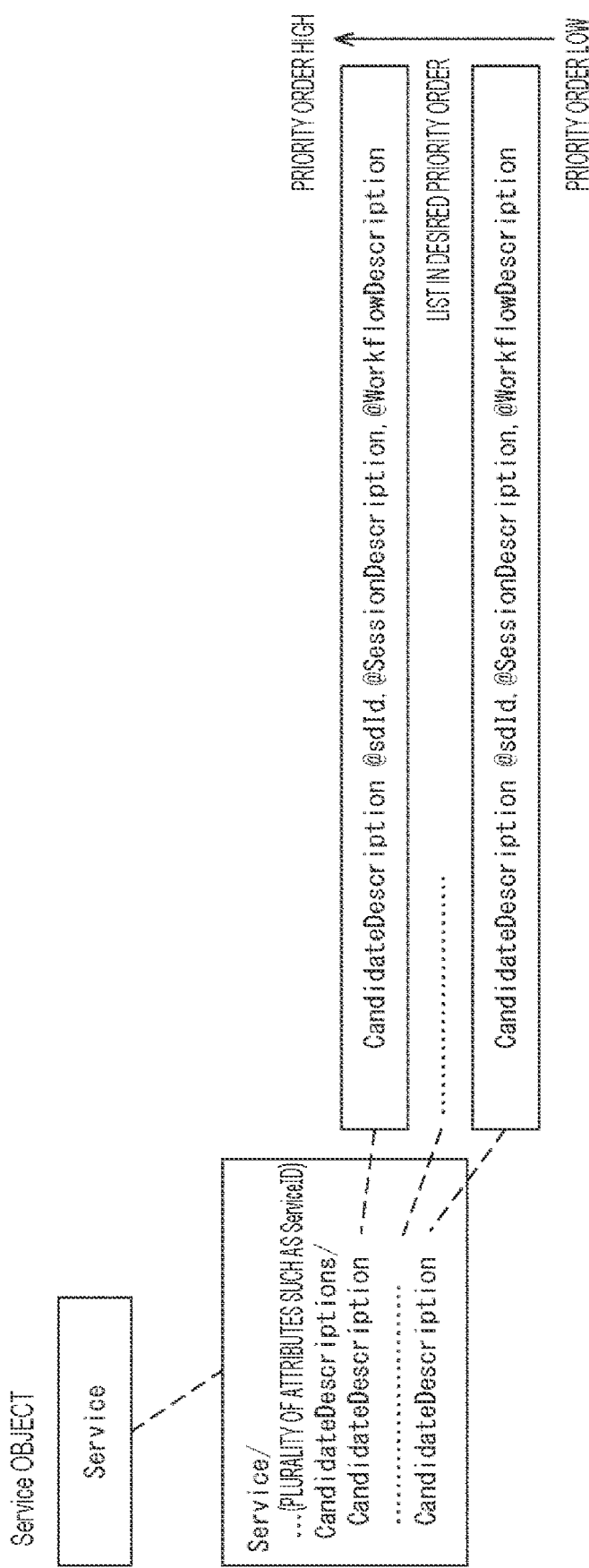
FIG. 7 is a diagram illustrating an example of a structure of a Service object.

FIG. 7 illustrates an example of a structure of the Service object.

As illustrated in FIG. 7, the Service object has a Service-specific attribute group such as an ID that identifies a Service and one CandidateDescriptions element (having a plurality of CandidateDescription elements thereunder).

Here, it is known that a Service object (which describes ServiceID and the like) includes a Session object for use in storing a session attribute. On the other hand, CandidateDescriptions/CandididateDescription under a Service object, @sdId, @SessionDescription, and @WorkflowDescription under CandididateDescription, and Session@active are newly proposed in the present disclosure.

Figure 8:
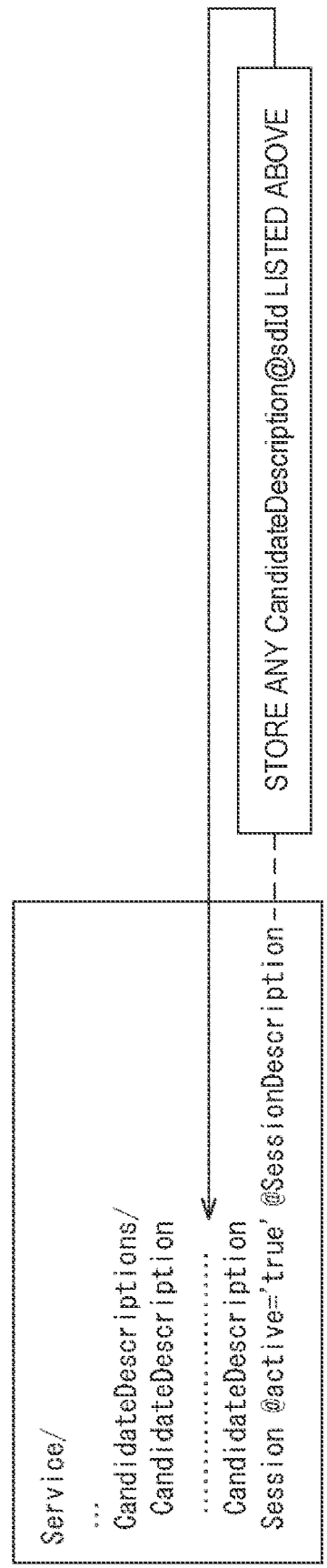
FIG. 8 is a diagram illustrating CandidateDescription@sdId stored in @SessionDescription.

Then, after the negotiation is performed, as illustrated in FIG. 8, a determined CandidateDescription@sdId from among the above is stored in @SessionDescription of Session @active='true'. Therefore, Session @active='true' indicates a streaming session that has been negotiated and determined, that is, a streaming session that has started processing. On the other hand, Session @active='false (default)' indicates that the session has not started or has ended.

Figure 9:
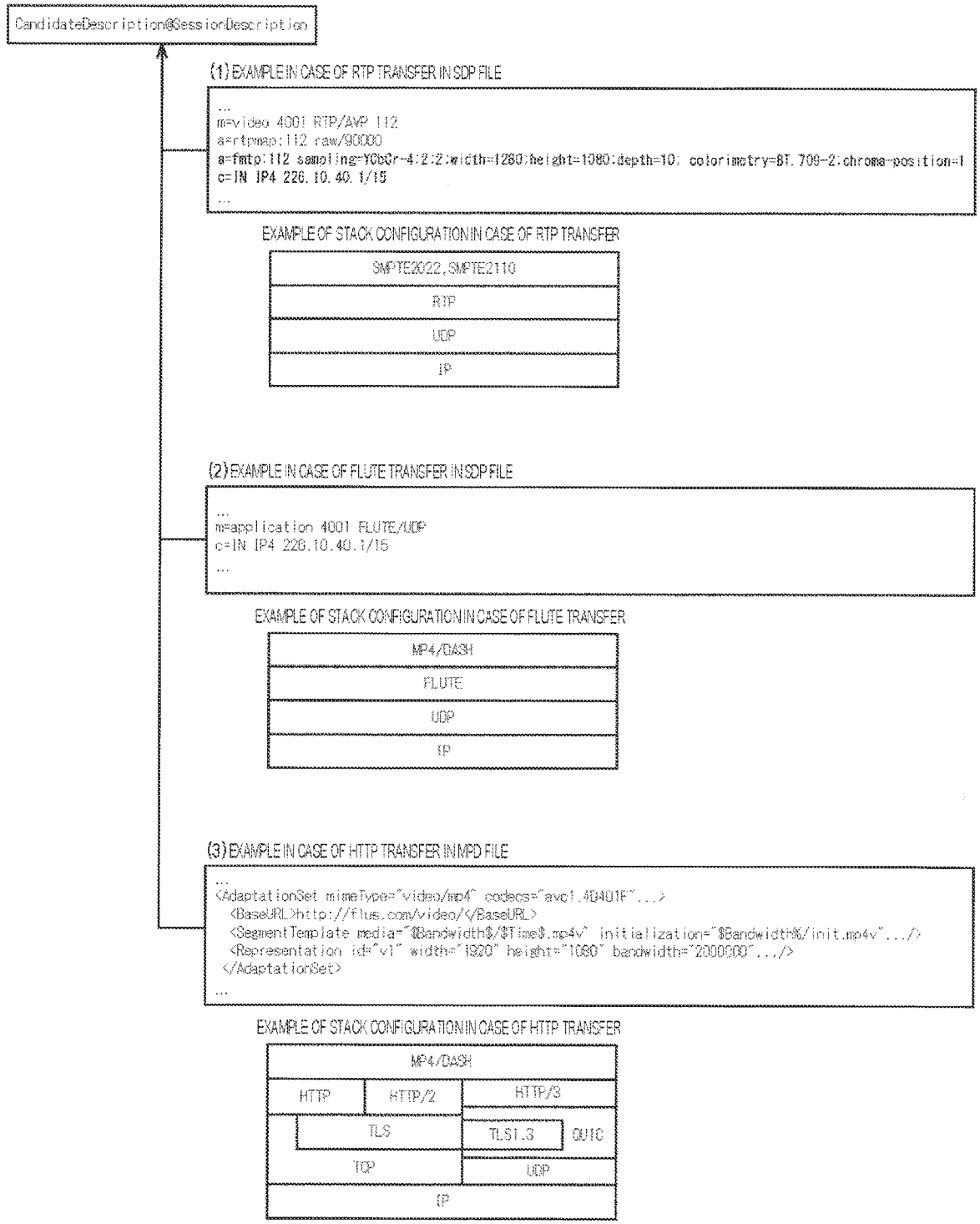
FIG. 9 is a diagram illustrating a Session Description Protocol (SDP) or a Media Presentation Description (MPD) stored in CandidateDescription@SessionDescription.

Furthermore, as illustrated in FIG. 9, a url of an SDP or an MPD is stored in CandidateDescription@SessionDescription. Alternatively, instead of this url, a base64/url-encoded SDP or MPD file body may be stored. At this time, any of first to third storing methods described below can be selected.

For example, in a first storing method, the content illustrated as an example in a case of RTP transfer in an SDP file is base64/url-encoded and stored in SessionDescription. For example, the first storing method is preferably selected in a case where the uplink network resources are abundant, where delay is not allowed, and where direct connection to the production processing system is established. At this time, a stack configuration in the case of the RTP transfer is as illustrated in the figure.

Furthermore, in a second storing method, the content illustrated as an example in a case of File Delivery over Unidirectional Transport (FLUTE) transfer in an SDP file is base64/url-encoded and stored in SessionDescription. For example, the second storing method is preferably selected in a case where the uplink network resources are limited and where delay is not allowed. At this time, a stack configuration in the case of the FLUTE transfer is as illustrated in the figure.

Furthermore, in a third storing method, the content illustrated as an example in a case of HTTP transfer in an MPD file is base64/url-encoded and stored in SessionDescription. Note that the types of HTTP include HTTP, HTTP/2, and HTTP/3. For example, the third storing method is preferably selected in a case where the uplink network resources are limited and where a format having a high affinity with the distribution system is maintained. At this time, a stack configuration in the case of the HTTP transfer is as illustrated in the figure.

Here, SMPTE2022, which is used in the stack configuration in the case of the RTP transfer, is a protocol for storing in an IP packet and transmitting Serial Digital Interface (SDI), which is a conventional uncompressed video and audio transmission method between broadcasting devices. Similarly, SMPTE2110 is a protocol for transmitting each video/audio component as an individual stream in Precision Time Protocol (PTP) synchronization.

Furthermore, FLUTE described above is a file transfer protocol in multicast. For example, FLUTE includes a combination of File Delivery Table (FDT), which describes a transfer control attribute of a file to be transferred and a multicast protocol for a scalable file object called Layered Coding Transport (LCT). FLUTE was conventionally developed mainly for use in asynchronous file transfer, but in ATSC 3.0, which is a next-generation broadcasting standard, FLUTE has been extended so as to be easily applied to broadcast live streaming. This extended version, called ROUTE, takes the place of RTP, which has been applied to conventional real-time streaming, and is optimized for transport of broadcasting-type DASH-fragmentedMP4 (fMP4) streaming. Note that transfer control metadata in ROUTE corresponding to FDT is called Service-based Transport Session Instance Description (S-TSID).

Furthermore, HTTP/3 described above is a new version of Hypertext Transfer Protocol (HTTP), which is a protocol used for Web access. A characteristic of HTTP/3 is to use UDP as the transport layer protocol. While conventional HTTP was one of the typical communication protocols that use TCP, HTTP/3 uses UDP instead of TCP to achieve high-speed Web access. Note that, in HTTP, the version called HTTP/1.1 is widely used, and there is also HTTP/2, which has improved communication efficiency. HTTP/2 is mainly used by a service provider called Over The Top (OTT), for example.

Figure 10:
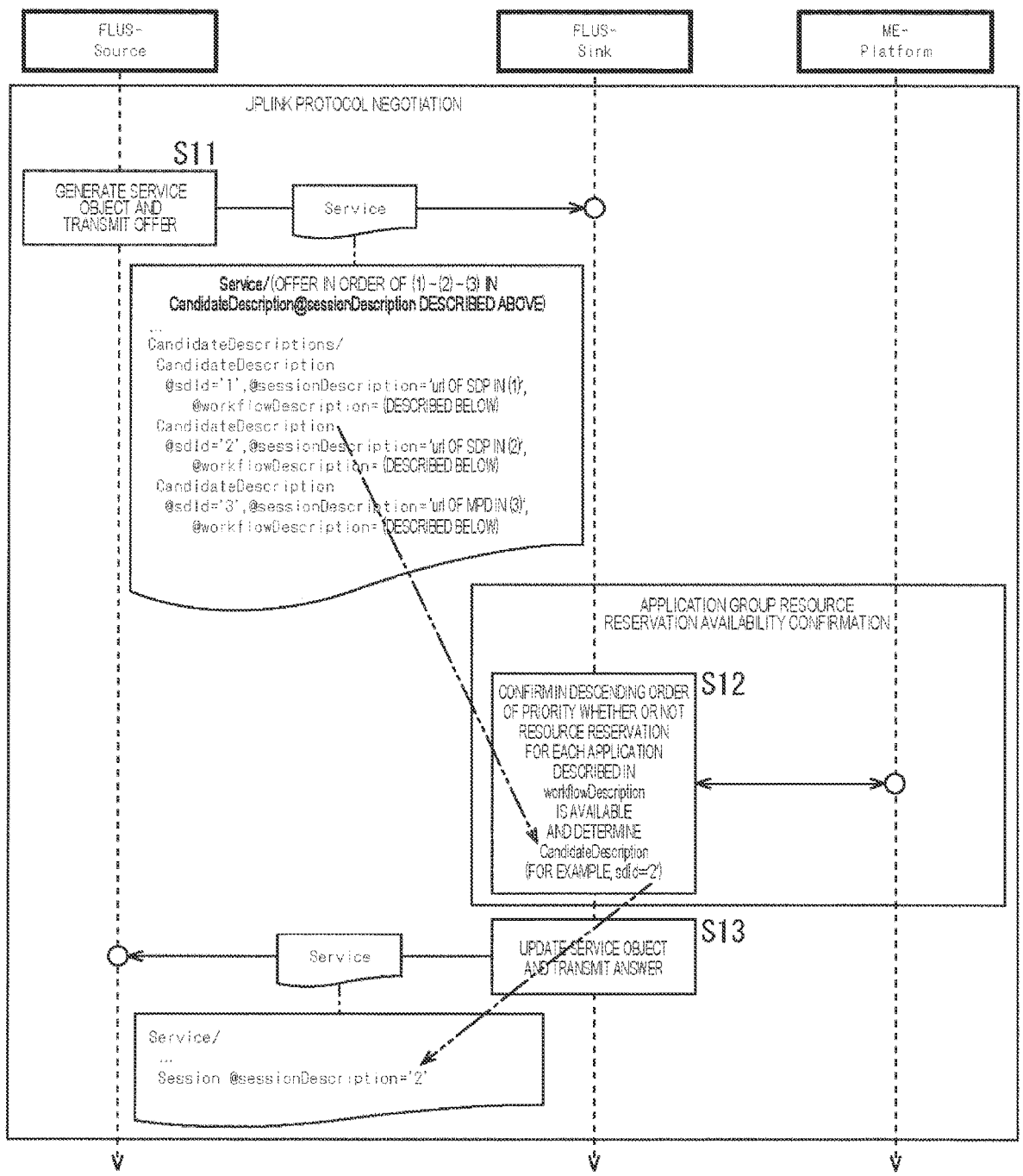
FIG. 10 illustrates a flowchart for performing the uplink protocol negotiation.

FIG. 10 illustrates a flowchart for performing the uplink protocol negotiation.

In step S11, the FLUS-Source 21 generates a Service object and transmits an offer to the FLUS-Sink 41. At this time, the FLUS-Source 21 transmits the offer in order of the first storing method, the second storing method, and the third storing method described with reference to FIG. 9. Mote that the @workflowDescription of the Service object will be described in the second embodiment described later.

Thereafter, the FLUS-Sink 41 and the ME-Platform 83 confirm whether or not resource reservation for the group of applications is available.

In step S12, the FLUS-Sink 41 confirms with the ME-Platform 83 in descending order of priority whether or not resource reservation for each application described in the workflowDescription is available. Then, the FLUS-Sink 41 determines a selected CandidateDescription from the plurality of CandidateDescription candidates described in the Service object transmitted in step S11.

In step S13, the FLUS-Sink 41 updates the Service object and transmits the Service object serving as an answer to the FLUS-Source 21. For example, in a case where sdId='2' is determined in step S12, the Service object is updated with Session @sessionDescription='2'.

<Second Configuration Example of Information Processing System According to First Embodiment>

Referring to FIGS. 11 to 28, protocol and resource negotiation in uplink streaming (including applications at the subsequent stage to a FLUS-SINK) will be described as a second configuration example of an information processing system 11A according to the first embodiment.

Note that, in this second configuration example, among "proposed methods to solve the problems of protocol negotiation for establishing uplink occurring in a case where FLUS is used in the uplink to make the uplink adaptive", "Workflow-Description of a group of applications executed in an edge Host related to processing of an uplinked media stream" will be described. For example, in general, protocol negotiation is performed by listing protocol types (and their parameter values). On the ether hand, newly proposed is to list "protocol attribute+resource requirements of the subsequent application flow", in which the protocol type is bound to a flow and resource requirements of the subsequent application after reception, and use it as a material for negotiation. Furthermore, WorkflowDescription describes the flow and resource requirements of the subsequent application.

Figure 11:
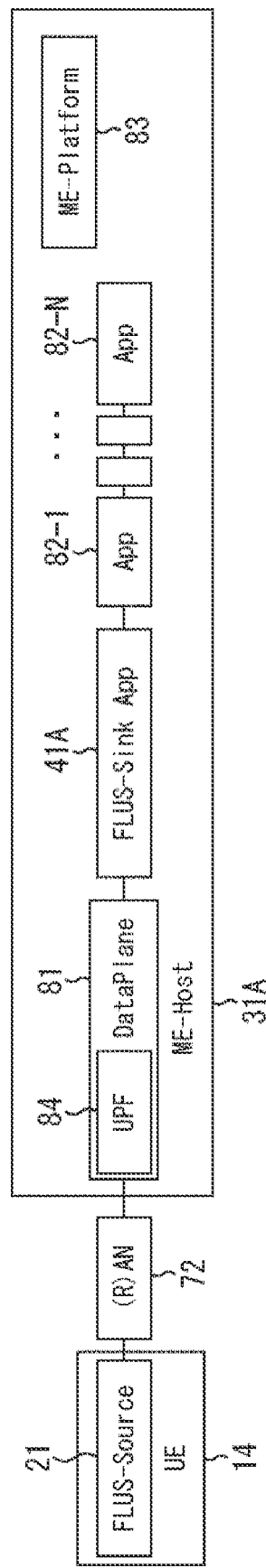
FIG. 11 is a diagram illustrating a second configuration example of the information processing system according to the first embodiment.

FIG. 11 illustrates the second configuration example of the information processing system 11A according to the first embodiment.

For example, in the information processing system 11A, a FLUS-Sink application 41A to be connected to the FLUS-Source 21 on the user terminal 14 is executed in the ME-Host 31 in the vicinity of the user terminal 14. Then, as a characteristic, media processing services (applications 82-1 to 62-N) at the subsequent stage defined in the accompanying "Workflow-Description" are executed. Furthermore, in the information processing system 11A, required resource conditions are described in the Workflow-Description, and negotiation can be performed at the will of the FLUS-Source 21 side. Furthermore, in the information processing system 11A, a profile (a class of resources required for executing an application) is defined in the description of resource conditions to simplify resource negotiation.

In general, protocol negotiation is performed by listing protocol types (and their parameter values) between transmission/reception modules. Newly proposed in the present disclosure is to list "protocol attribute+resource requirements of the subsequent application flow", in which the protocol type is bound to a flow and resource requirements of the subsequent application after reception, and use it as a material for negotiation.

As illustrated in FIG. 11, the information processing system 11A has a configuration in which a plurality of applications 82-1 to 82-N is connected at the subsequent stage to the FLUS-Sink application 41A. Then, in the information processing system 11A, an uplinked stream received by the FLUS-Sink application 41A is processed by the applications 82-1 to 82-W executed on the ME-Host 31A.

For example, the applications 82-1 to 62-N at the subsequent stage to the FLUS-Sink application 41A include a cache/storage application and a transcoding application.

The cache/storage application is an application that stores an input stream as a file in storage such as memory and a Solid State Drive (SSD). For example, the cache/storage application provides a function of abstracting storage of various classes depending on the I/O throughput and the difference in fault tolerance requirements.

The transcoding application is an application that changes a coding format of an input stream. For example, the transcoding application converts the format of a stream that can be uplinked only in an IntraGOP format due to a poor network environment into a baseband (or Visually Lossless) format having an affinity with the processing system such, as the production. Note that, currently, the trend of providing such media processing applications as services on the cloud (called microservices or the like) is accelerating. Also, it is assumed that an environment will be created in which the functions provided by an expensive professional media processing device that is operated in an on-premises environment will be available as a network service on the cloud as needed in terms of timing and quantity.

Also, a file that describes an order of pieces of processing of the group of applications, input/output parameters, and the like is called Workflow-Description. The following method of describing the Workflow-Description for media processing is newly proposed in the present disclosure. In other words, while it is known that related applications are listed in the Workflow-Description and that sequential processing and parallel processing can be distinguished depending on the way of describing the sequence, the way of describing the input/output parameters of the respective applications and a delay limit attribute are newly proposed.

An example of the workflow description will be described with reference to FIGS. 12 and 13.

Figure 12:
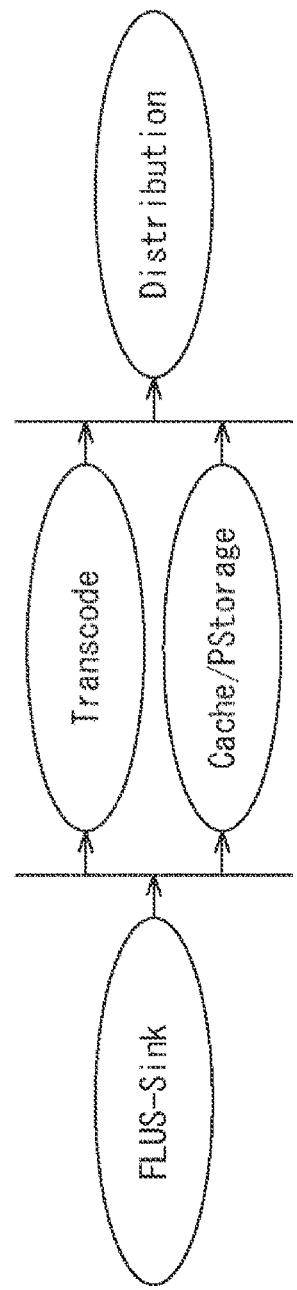
FIG. 12 is a diagram illustrating a dependency relationship among applications.

FIG. 12 illustrates a dependency relationship among the applications 82-1 to 82-N at the subsequent stage to the FLUS-Sink application 41A, and FIG. 13 illustrates an example of the originally defined Workflow-Description. Here, the Workflow-Description is regarded as one originally defined, and the specifications of a workflow for media processing on the cloud and a framework of the applications are currently being defined in MPEG-I-Network-Based Media Processing (MPEG-I-NBMP) and have not been defined. Note that a similar standard which currently exists is MPEG-M.

For example, as illustrated in FIG. 12, as the applications 82-1 to 82-N at the subsequent stage to the FLUS-Sink application 41A, a transcoding application (Transcode), a cache/storage application (Cache/PStorage), and a stream distribution application (Distribution) are provided. Then, it is assumed that there is a dependency relationship (sequence) as illustrated in the figure among them.

Then, as illustrated in FIG. 13, for example, a startTime attribute of a workflow element indicates absolute time (wall clock time) to start workflow processing in a case where the schedule is determined in advance. Note that, in a case where there is no limit in the time to start processing (in a case where best-effort processing is possible), this attribute is not described.

Furthermore, a seq element or a par element can be arranged as a child element of the workflow element. The seq element represents sequential processing of the application indicated in the element under it, and the par element represents sequential processing or parallel processing of the application(s) indicated in the element under it.

First, a first element under a Seq element is an Application element having a url attribute value 'FLUS-Sink-url', which represents execution of the FLUS-Sink application serving as a starting point. After that, a par element is arranged, and under the par element, an Application element having a url attribute value 'Transcode-url' and an Application element having a url attribute value 'Cache/PStorage-url' are arranged. This means that these two applications (the Transcode application and the Cache/PStorage application) are processed in parallel as illustrated in FIG. 12, that is, they are processed in synchronization with each other in terms of time.

Moreover, after the par element, an Application element having a url attribute value 'Distribution-url' is arranged, which means that this application (a Distribution application) is executed last as illustrated in FIG. 12. Each of the Application elements has a delayLimit attribute to enable a delay limit for processing (a maximum allowable value for delay until the input first bit is output (msec)) to be specified.

The data to be processed in this workflow is an uplinked stream, which is an input of the FLUS-Sink application represented by the Application element having the url attribute value 'FLUS-Sink-url'. That is, after uplink protocol negotiation is performed between the FLUS-Sink application and the FLUS-Source 21 that establishes an uplink streaming session, the attribute of the input stream of the FLLUS-Sink application is represented in an SDP or an MPD referred to by the url of SessionDescription of CandidateDescription represented by the sdId value (the determined value for CandidateDescription@sdId) stored in the SessionDescription attributes of the Session element, with Session@active='true' in the Application object. Alternatively, the attribute may be represented by a base64/url-encoded SDP or MPD file body, instead of this url.

Then, the uplink stream received by the FLUS-Sink application serves as an output of the FLUS-Sink application and is taken over as inputs of the Transcode application and the Cache/PStorage application. That is, the output of the FLUS-Sink application is represented as an OutputDescription attribute of the Application element having the url attribute value 'FLUS-Sink-url', which is equal to an InputDescription attribute of the Application element having the url attribute value 'Transcode-url' and an InputDescription attribute of the Application element having the url attribute value 'Cache/PStorage-url'.

Figure 14:
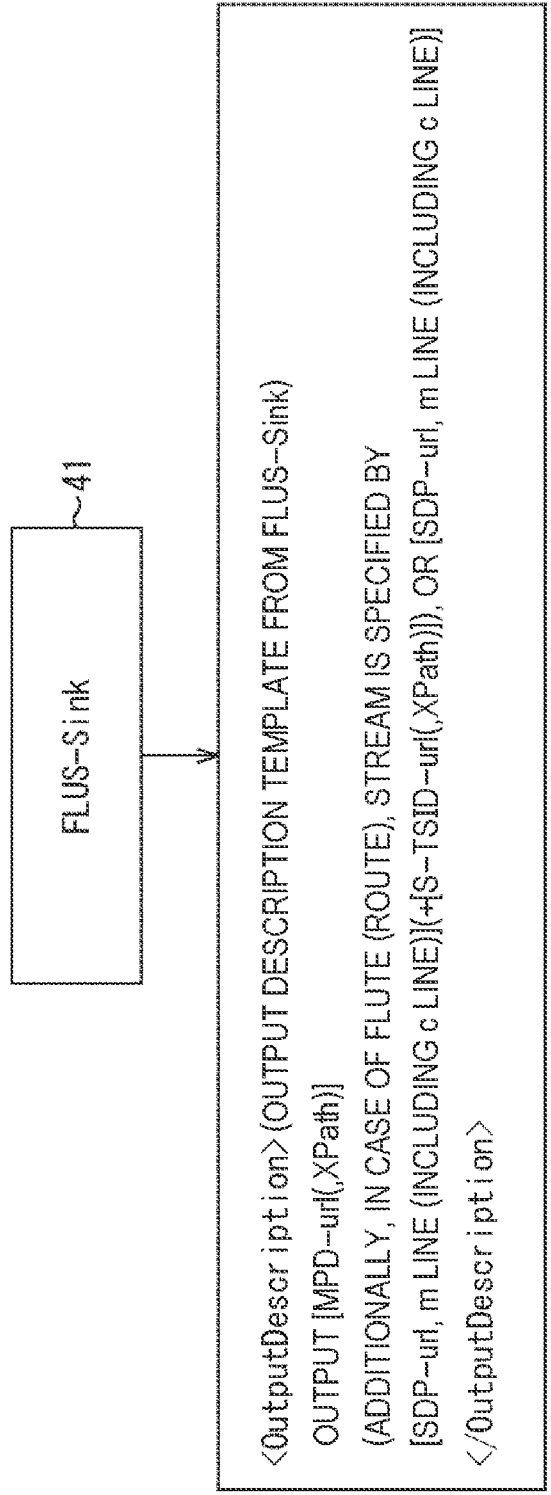
FIG. 14 is a diagram illustrating a description example for output from a FLUS-Sink.

Furthermore, in the OutputDescription attribute of the Application element having the url attribute value 'FLUS-Sink-url', the target stream and its attribute are specified on the basis of the description template as illustrated in FIG. 14, for example. Note that, in the case of the FLUS-Sink 41, since the uplink stream is received and just passed to the subsequent application as it is, the attribute of the stream is not changed, and only the address such as the url is changed as needed.

Here, in the above-mentioned Workflow description method, a method for describing sequential processing in the Seq element and a method for describing parallel processing in the Par element are known. On the other hand, adding description of input and output and description of required resources for each application is newly proposed in the present disclosure. Furthermore, a method for describing input and output for each Application defined as illustrated in FIGS. 14 to 18 is newly proposed in the present disclosure.

FIG. 14 is a diagram illustrating an example of a method for describing output from the FLUS-Sink 41 (FLUS-Sink application 41A).

As illustrated in the figure, the attribute of the stream for processing at the subsequent stage to the FLUS-Sink 41 is described in an output MPD or SDP.

Note that, in a case where a plurality of streams is included in the MPD (or an S-TSID in the case of ROUTE), one of the streams is specified by XPath. The same applies to FIGS. 15 to 18 regarding this XPath.

Figure 15:
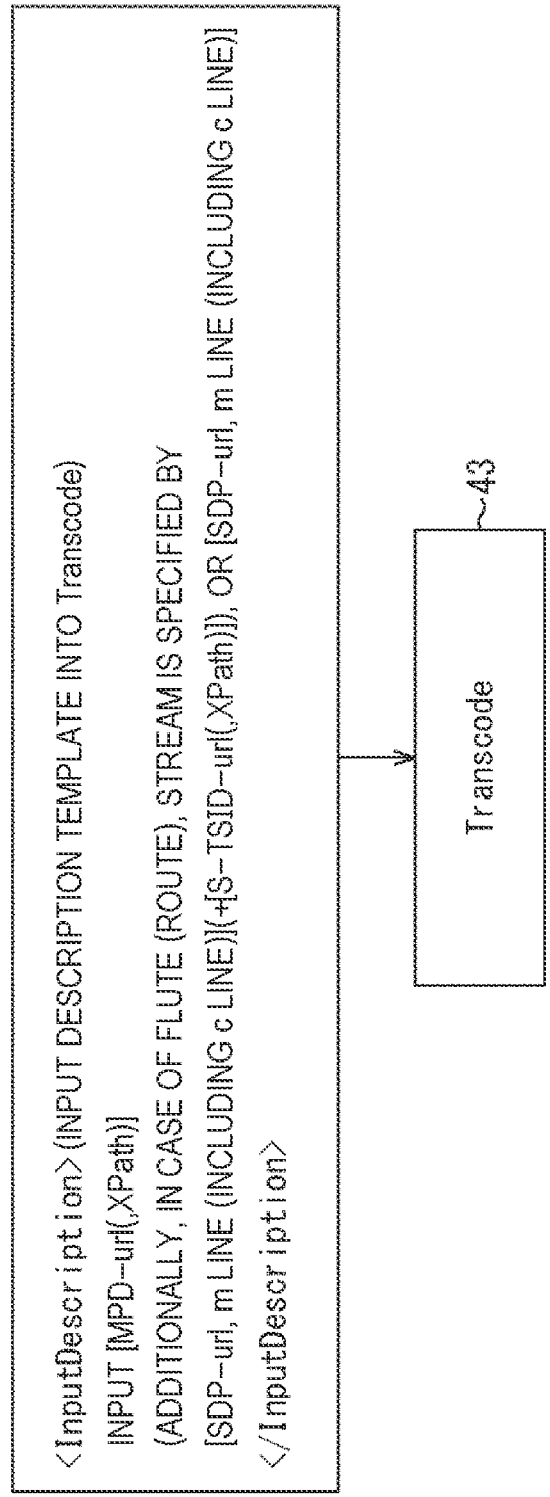
FIG. 15 is a diagram illustrating a description example for input into a transcoding processing unit.

FIG. 15 illustrates an example of a method for describing input into the transcoding processing unit 43 (one Transcode application out of the plurality of applications 82).

As illustrated in the figure, InputDescription input into the transcoding processing unit 43 has the same content as OutputDescription (FIG. 14) output from the FLUS-Sink 41.

Figure 16:
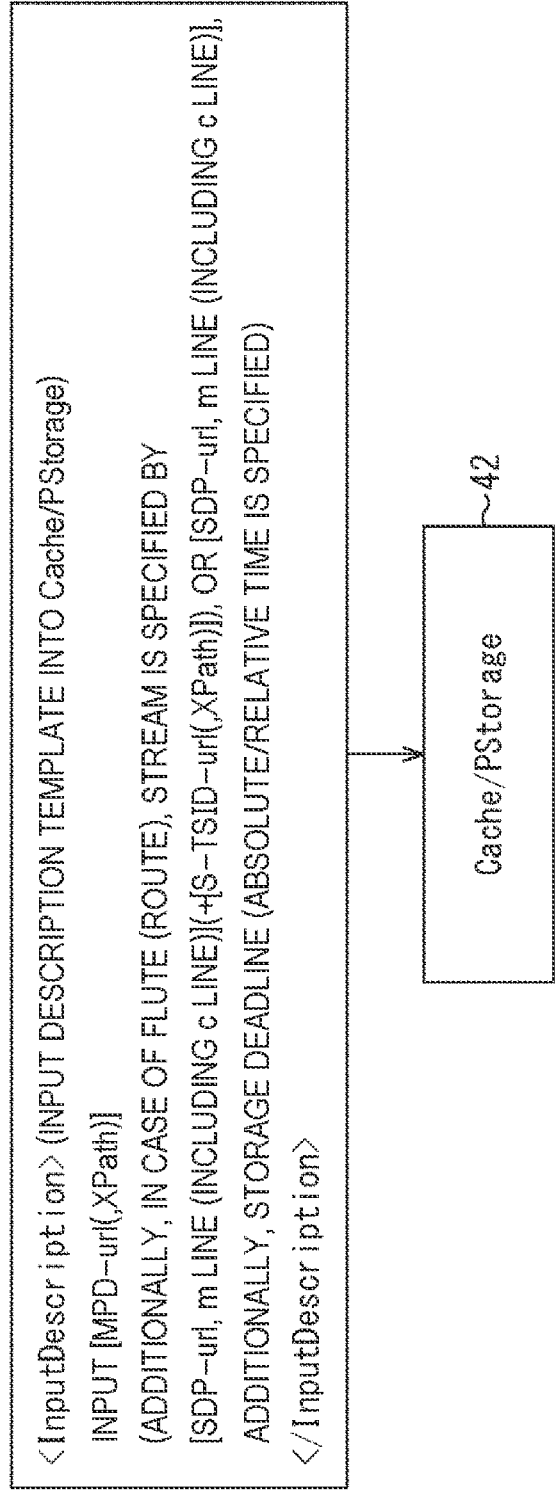
FIG. 16 is a diagram illustrating a description example for input into a storage device.

FIG. 16 illustrates an example of a method for describing input into the data retention processing unit (Cache/PStorage) 42 (one Cache/PStorage application out of the plurality of applications 82).

As illustrated in the figure, InputDescription input into the data retention processing unit (Cache/PStorage) 42, which receives the same stream as one that the transcoding processing unit 43 receives, has the same content as Output-Description (FIG. 14) output from the FLUS-Sink 41. Moreover, in the case of the data retention processing unit (Cache/PStorage) 42, absolute time or relative time from input time can be specified as a storage deadline for retention in the storage device 45 serving as storage (on-memory, an SSD, a hard disc, or the like). Note that, in a case where the deadline is set for deletion, the deadline can be specified in the storage deadline of the input description.

Furthermore, since the data retention processing unit (Cache/PStorage) 42 only performs processing for storing the input stream in the storage device 45, an application that takes over the stream is not specified. That is, the stream file stored in the storage device 45 is accessed and acquired as needed by another application by the storage deadline of the file in the file access method provided by the Web server, the file system, or the like that achieves the Cache/PStorage system.

Figure 17:
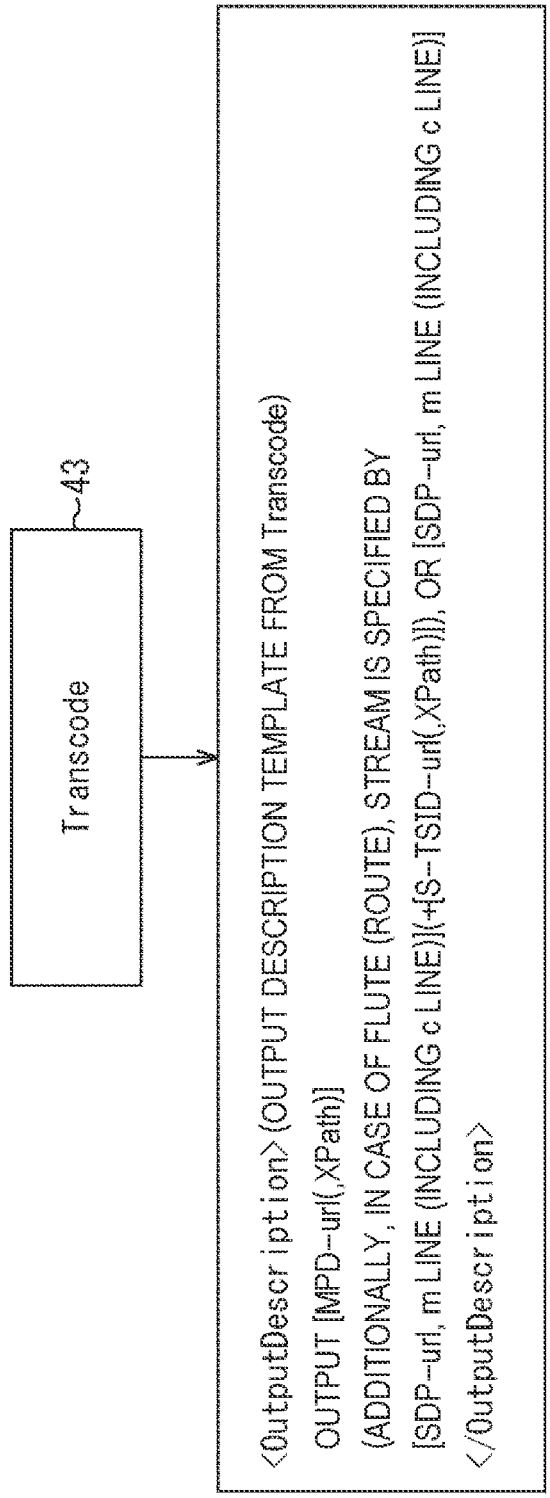
FIG. 17 is a diagram illustrating a description example for output from the transcoding processing unit.

On the other hand, in the transcoding processing unit 43, when the input stream is transcoded, the attribute of the transcoded stream is specified by the attribute of the stream such as the MPD and the SDP. Then, as illustrated in FIG. 17, the attribute is specified in OutputDescription output from the transcoding processing unit 43. Note that the attribute of the transcoded stream is described in the output MPD or SDP.

Figure 18:
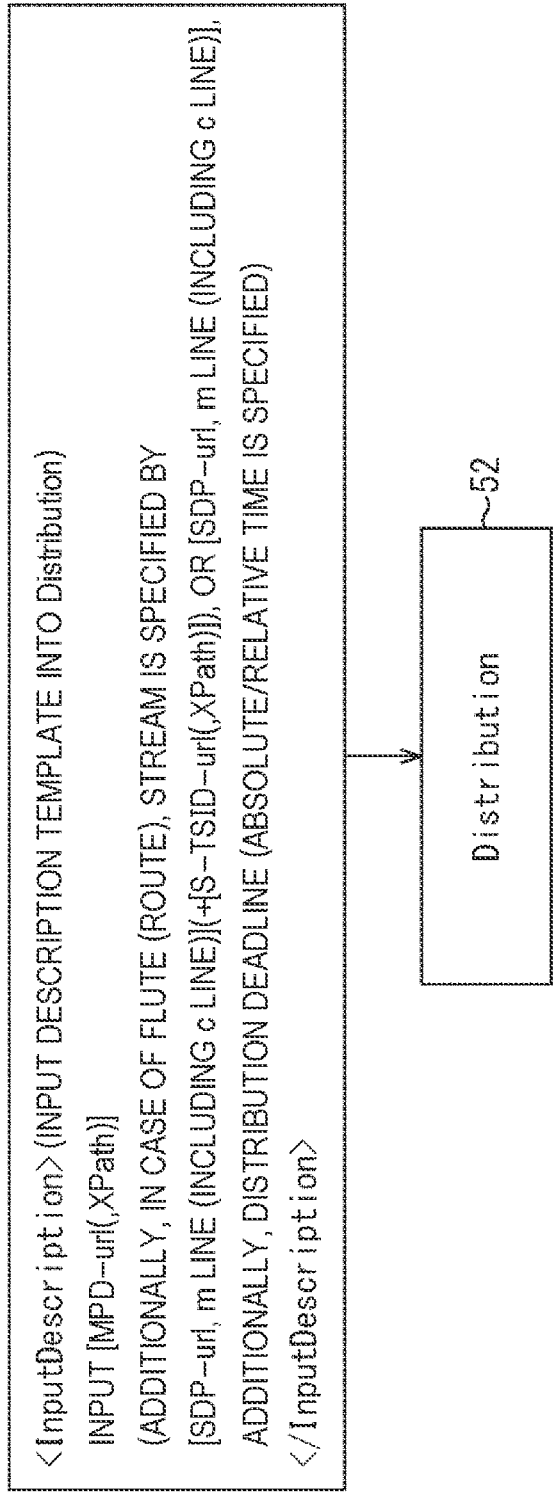
FIG. 18 is a diagram illustrating a description example for input into a distribution processing unit.

FIG. 18 illustrates an example of a method for describing input into distribution processing unit 52 (one Distribution application out of the plurality of applications 82).

The transcoded stream output from the transcoding processing unit 43 is taken over as input into the distribution processing unit 52. That is, OutputDescription output from the transcoding processing unit 43 is equal to InputDescription of the Application element having the url attribute value 'Distribution-url' in terms of the attribute, and a distribution deadline can be specified.

Then, since the distribution processing unit 52 performs processing for distributing the input stream to a client device via the cloud, the distribution processing unit 52 does not have OutputDescription. That is, the client side acquires and receives the stream by the distribution deadline in the stream access method provided by the Web server, the stream server, or the like that implements the distribution system. Note that, in a case where the deadline is set for distribution stop, the deadline can be specified in the distribution deadline of the input description.

Figure 19:
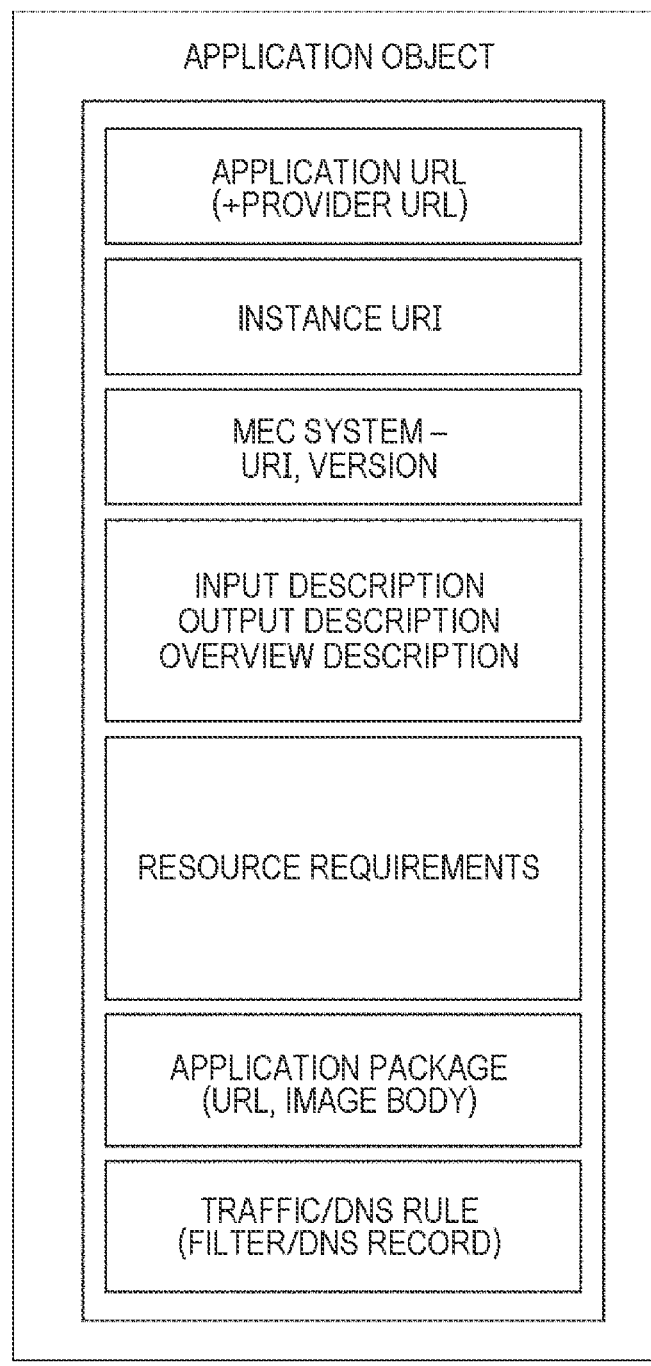
FIG. 19 is a diagram illustrating an application object.

FIG. 19 illustrates an example of an application object that represents the attribute of an application such as the FLUS-Sink application 41A and the applications 82-1 to 82-N (the Transcode application, the Cache/PStorage application, and the Distribution application). For example, definition of the attribute of an application object is managed in the ME-Platform, and the attribute of each application is managed on the basis of the definition of the attribute.

Application URL (+ Provider URL) identifies the type of the Transcode application, the Cache/PStorage application, the Distribution application, or the like (+ optionally, the provider URL is identified). For example. Application URL is specified by Application@url described in the workflow.

Instance URI identifies the application when the application is executed and is generated in the ME-Platform when the application is executed.

MEC System-URI, Version is an identifier that identifies an MEC system (virtual environment) in which the application is executed.

Input Description and Output Description describe urls of input and output and protocols of the application and are specified in Application/InputDescription and /OutputDescription described in WorkflowDescription, for example. Overview Description describes an overview of processing of the application.

Resource Requirements include specified values such as virtual CPU use amount/second+period, virtual memory/storage capacity/second+period, and IO throughput/second+period and are defined by an MEC-system-URL-dependent resource class ID. For example, Resource Requirements are specified in ResourceDescription described in WorkflowDescription.

Application Package (URL, Image Body) is a url of an MEC-system-dependent application execution image, or the image body.

Traffic/DNS Rule (filter/DNS record) is information that controls routing of packets in a 5G system via the ME-Platform.

Referring to FIGS. 20 to 24, processing in a configuration in which the application 82 is connected at the subsequent stage to the FLUS-Sink application 41A in the same ME-Host 31 as in the information processing system 11A in FIG. 11 will be described.

Figure 20:
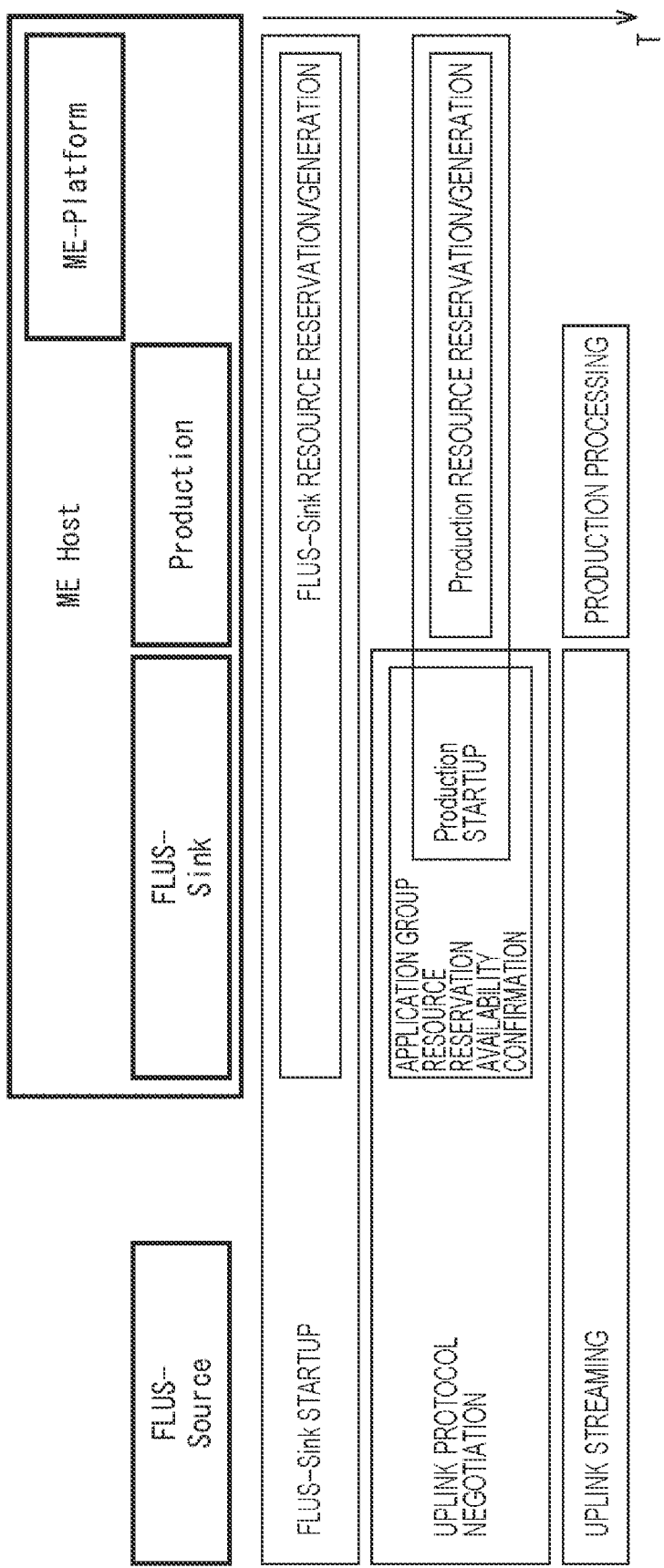
FIG. 20 is a diagram illustrating processing for starting uplink streaming.

FIG. 20 is a diagram illustrating processing for starting uplink streaming in the information processing system 11A in FIG. 11. That is, FIG. 20 illustrates an example of processing for starting the application 82 in a case where the application 82 at the subsequent stage to the FLUS-Sink application 41A is executed in the same ME-Host 31 as the FLUS-Sink application 41.

First, FLUS-Sink startup processing is performed.

The FLUS-Sink startup processing is started by the FLUS-Source 21 and is performed with the ME-Platform 83, which causes the FLUS-Sink application 41A to be started. Furthermore, FLUS-Sink resource reservation and generation processing is performed as one of pieces of FLUS-Sink startup processing. The FLUS-Sink resource reservation and generation processing is started by the ME-Platform 83 and is performed with the FLUS-Sink application 41A, which causes resources of the FLUS-Sink application 41A to be reserved and generated.

Furthermore, after the FLUS-Sink startup processing is performed, uplink protocol negotiation processing is performed.

The uplink protocol negotiation processing is started by the FLUS-Source 21 and is performed with the FLUS-Sink application 41A. Negotiation of a protocol for use in uplink streaming is performed. Furthermore, in the uplink protocol negotiation processing, the Workflow-Description of the CandidateDescription described in the Service object for use in communication between the FLUS-Sink application 41A and the FLUS-Source 21 is analyzed.

Figures 21, 22:
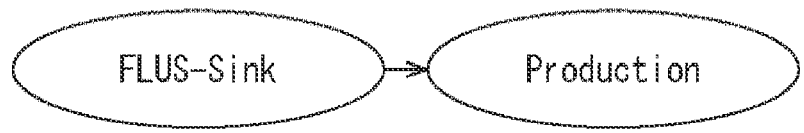
FIG. 21 is a diagram illustrating a description example of Workflow-Description.
FIG. 22 is a diagram illustrating connection among applications.

For example, this Workflow-Description is described as illustrated in FIG. 21, and in this Workflow-Description, the output from the FLUS-Sink is linked to a Production application as illustrated in FIG. 22.

For example, required resources for the FLUS-Sink application described in Workflow/Seq/Application [@url='FLUS-Sink-url']/ResourceDescription illustrated in FIG. 21 (the ResourceDescription element under the Application element having the url attribute value 'FLUS-Sink-url' under the Seq element under the Workflow element) are referred to in the FLUS-Sink startup processing with the FLUS-Source 21 serving as a starting point.

Furthermore, the ME-Platform 83, which receives the FLUS-Sink startup request from the FLUS-Source 21, checks on its own ME-Host 31 whether or not the resource requirements described in this ResourceDescription are satisfied. Then, in a case where the resource requirements can be satisfied, the ME-Platform 83 generates a new FLUS-Sink application 41A and returns the address of the FLUS-Sink application 41A to the FLUS-Source 21.

Figure 23:
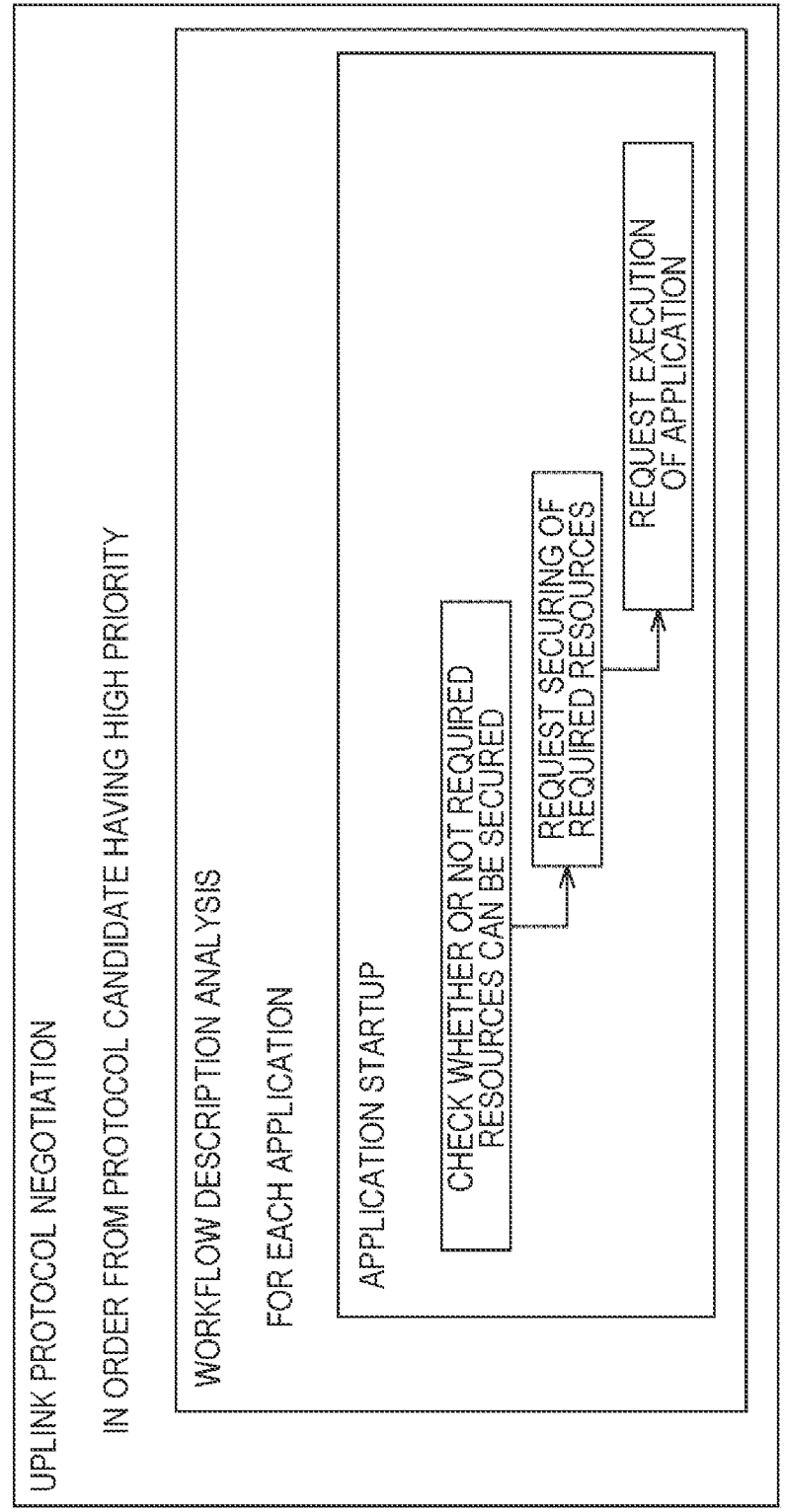
FIG. 23 is a diagram illustrating uplink protocol negotiation.

Then, for example, as illustrated in FIG. 23, uplink protocol negotiation is performed between the FLUS-Source 21 and the FLUS-Sink 41.

First, the FLUS-Sink application 41A analyzes the Workflow-Description of each CandidateDescription of the CandidateDescriptions in the Session object received from the FLUS-Source 21 in order of priority. In this manner, the FLUS-Sink application 41A checks whether the required resources can be secured for each of the subsequent applications 82-1 to 82-N.

For example, in the case of the processing illustrated in FIG. 20, the FLUS-Sink application 41A starts a phase of starting the Production application as one of the plurality of applications 82. Then, an API, provided by the ME-Platform 83, is accessed, and the resources described in Workflow/Seq/Application[url='Production-url']/ResourceDescription are secured. This allows the FLUS-Sink application 41A to start the Production application as one of the plurality of applications 82.

Then, after the uplink protocol negotiation processing is performed, uplink streaming is performed between the FLUS-Source 21 and the FLUS-Sink application 41A, and production processing is performed by the Production application.

Figure 24:
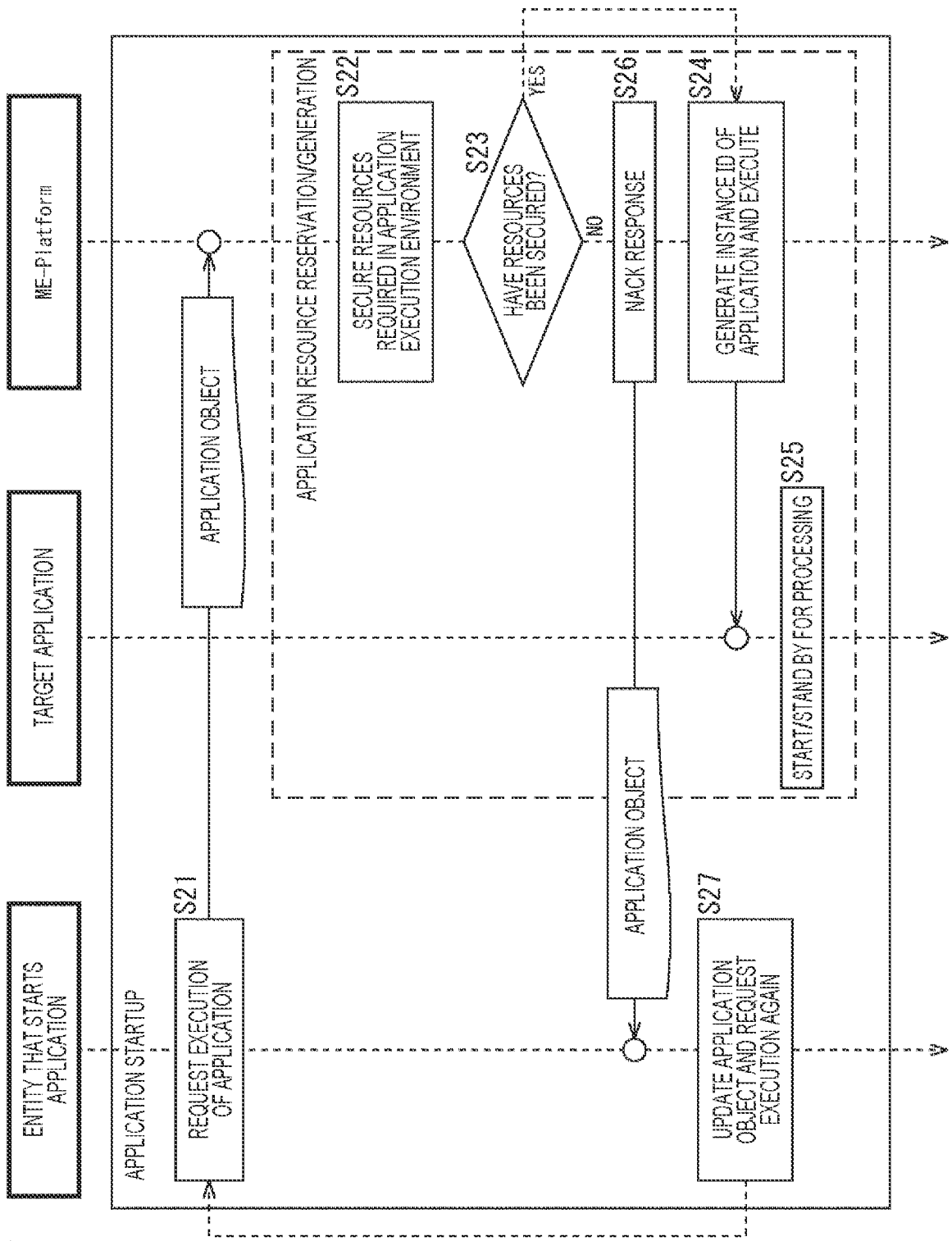
FIG. 24 is a flowchart illustrating processing in which an entity that starts an application starts the application.

FIG. 24 is a flowchart illustrating processing in which an entity that starts an application starts the application.

For example, in a case where the application to be started is the FLUS-Sink application 41A, the entity that starts the application is the FLUS-Source 21. Furthermore, in a case where the application to be started is any of the applications described in the Workflow-Description, the entity that starts the application is the FLUS-Sink application 41A.

In step S21, the entity that starts the application generates an application object in accordance with the application definition and requests the ME-Platform 83 to execute the application. At this time, the required resource requirements described in ResourceDescription of the Workflow-Description are stored in Resource Requirements of the application object transmitted by the entity that starts the application.

In step S22, the ME-Platform 83 attempts to secure various resources required to execute the application, such as a calculation resource, memory/storage, and a network resource, before executing the application on the basis of the content of the application object.

In step S23, the ME-Platform 83 determines whether or not the resources have been secured by the attempt in step S22.

In a case where the ME-Platform 83 determines in step S23 that the resources have been secured, the processing proceeds to step S24.

In step S24, the ME-Platform 83 generates an instance ID that identifies the application instance of the application object and executes the application.

In step S25, after the application to be started is started as the ME-Platform 83 has executed the application in step S24, the application waits for an input object (a file, a stream, or the like) in accordance with the input description and is on standby for processing. Then, when the application to be started receives the input object, the application starts processing.

Conversely, in a case where the ME-Platform 83 determines in step S23 that the desired resources have not been secured, the processing proceeds to step S26. Then, the ME-Platform 83 returns a NACK response to the entity that starts the application and transmits the application object that has failed to secure the resources.

In step S27, in a case where the application has a plurality of ResourceDescriptions, the entity that starts the application rewrites the resource requirements part of the application object and requests the ME-Platform 83 to execute the application again. Then, the processing returns to step S21, the rewritten application object is transmitted, and the similar processing is then repeated until the time limit set as the deadline is reached. Note that, in a case where this time limit is reached, this means the application startup is failed.

Then, after the application to be started is started, the FLUS-Source 21 starts uplink streaming, and the FLUS-Sink application 41A hands over the received stream to the Production application to cause the Production processing to be performed.

Note that, in third and fourth embodiments described later, in a case where the entity that starts an application is a FLUS-Sink 41S of a SourceMEHost, the application to be started is a FLUS-Sink 41T of a TargetMEHost.

Resource description for each application will be described with reference to FIGS. 25 to 28.

For example, in ResourceDescription for each application in Workflow-Description, resources required for execution of each application are described. In general, the resources required for execution of an application are:
  CPU use amount/second+period (time/absolute time specified),
  Memory/storage capacity/second+period (time/absolute time specified),
  IO throughput/second+period (time/absolute time specified),
  and the like.

However, it is assumed that reserving resources for each application by means of such numerical expressions is complex. Therefore, by grouping these into several sets and defining a dictionary for profiling, the resource description of Workflow-Description can be simplified. For example, if the dictionary is a general-purpose dictionary that does not depend on the vendor that provides the MEC environment, the dictionary can be specified regardless of the MEC environment without depending on the difference among the MEC environments provided by different vendors.

Moreover, a general-purpose resource class identifier 'urn:generic_resource_class:class-x' is defined so that the above set can be referred to by the identifier. Alternatively, an MEC-system-dependent dictionary may be prepared, and a set of an MEC system identifier and an MEC-system-dependent resource class identifier may be expressed as 'urn:vendor_specific_resource_class:vendor_x:class-x'.

Figure 25:
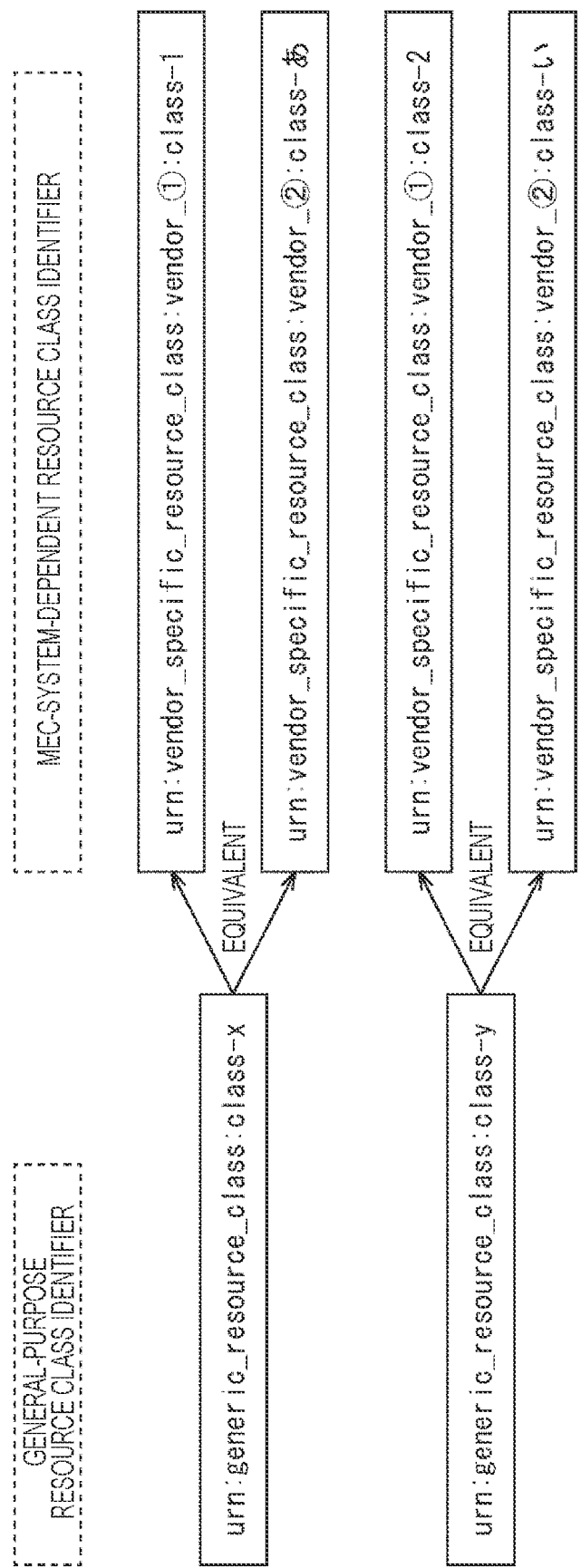
FIG. 25 is a diagram illustrating definition of mapping of a general-purpose resource class identifier and an MEC-system-dependent resource class identifier.

In a case of using both of these expressions, a mapping illustrated in FIG. 25 is defined. That is, an equivalency set of the general-purpose resource class identifier and the MEC-system-dependent resource class identifier is defined.

Figure 26:
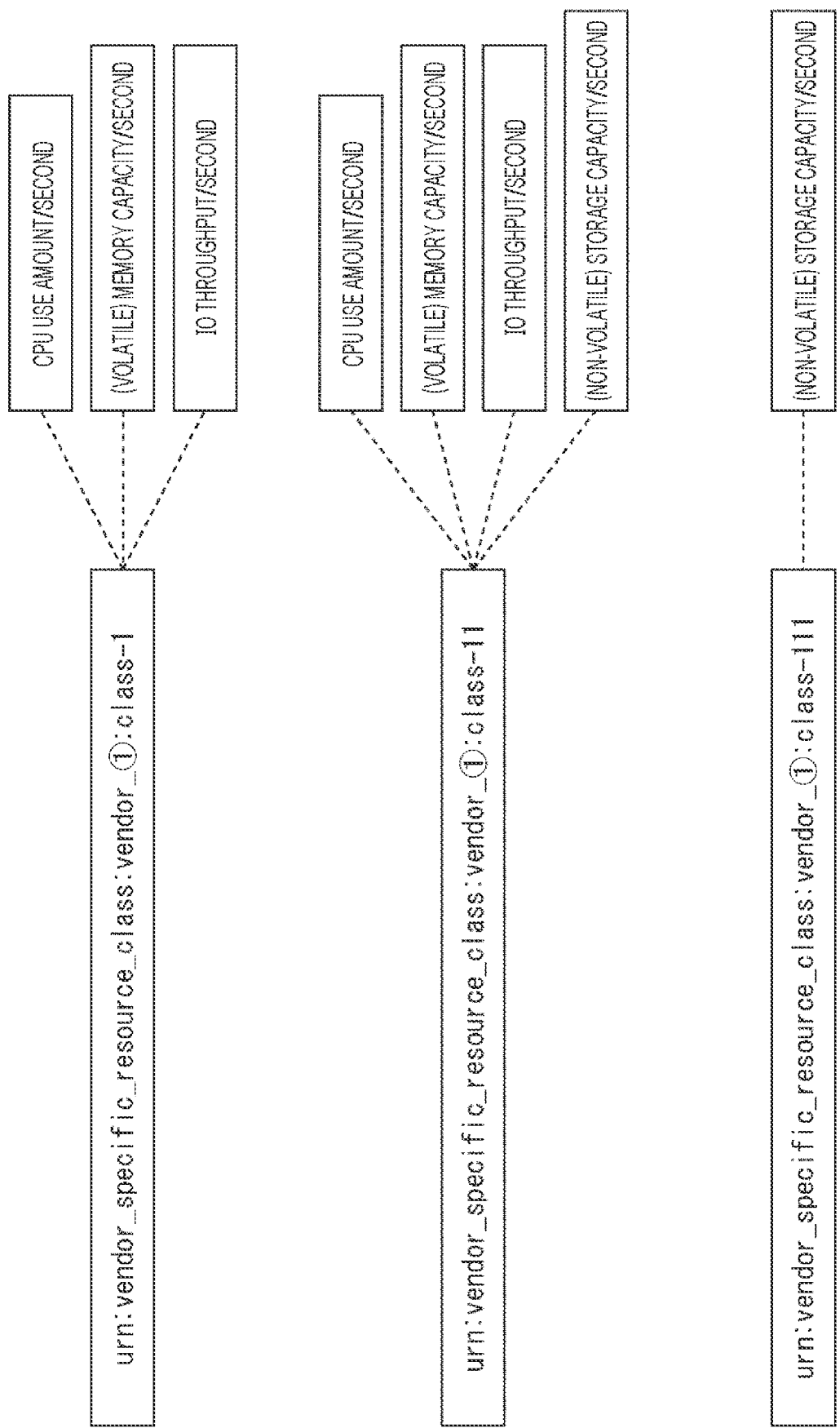
FIG. 26 is a diagram illustrating an example of items of an MEC-system-dependent dictionary.

Also, as illustrated in FIG. 26, as items of the MEC-system-dependent dictionary, CPU use amount/second+period, (volatile-)memory/(non-volatile-)storage capacity/second+period, and IO throughput/second+period are defined as a set. Then, the resource is expressed by combination of these items and time (a period of time or absolute start time/absolute end time). Moreover, the item name 'class-1', 'class-11' or the like is expressed by values typical of the use case of uplink streaming.

Specifically, AVC-UHDTV(4K, 10, 4:2:2)-LongGOP-DASH indicates a use case in which a 4K(3840×2160)-UHDTV(10 bit/4:2:2) stream is AVC-encoded at 200 Mbps and is streamed in several frames (LongGOP)DASH/CMAF. Note that a use case in which this stream is stored in a cache on non-volatile storage is expressed as AVC-UHDTV(4K,10,4:2:2)-LongGOP-DASH-onPStorage. Furthermore, AVC-UHDTV(4K,10,4:2:2)-AllIntra-DASH indicates a use case in which a stream is streamed at 600 Mbps in one frame (IntraGOP) DASH/CMAF. Note that a use case in which this stream is stored in a cache on non-volatile storage is expressed as AVC-UHDTV(4K,10, 4:2:2)-AllIntra-DASH-onPStorage.

Then, on the basis of the typical and representative protocol set and parameter values, the set is defined for each target MEC system in advance by conducting rough measurement with use of an appropriate reference stream.

Figure 27:
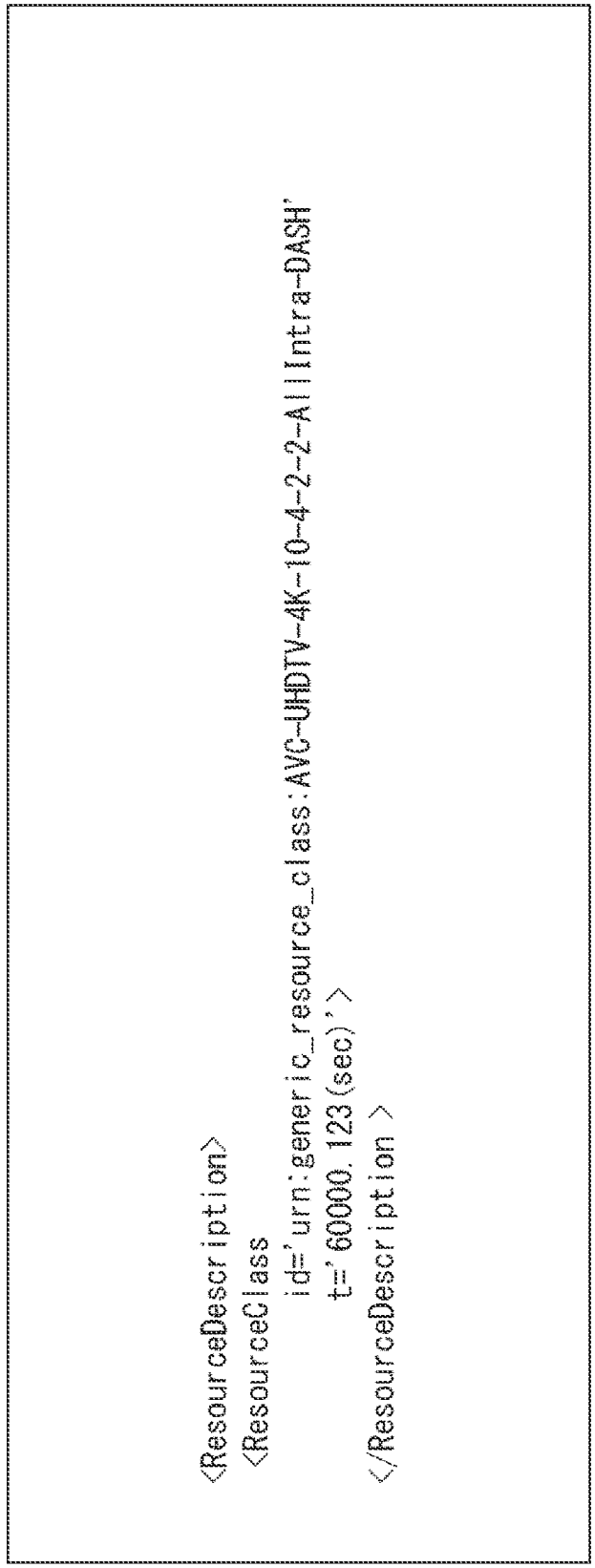
FIG. 27 is a diagram illustrating an example of resource description.

FIG. 27 illustrates an example of resource description.

As illustrated in FIG. 27, for ResourceClass@id, a general-purpose resource class identifier, an MEC-system-dependent resource class identifier, or the like as illustrated above in FIG. 25 is specified. Furthermore, ResourceClass@t indicates time (sec) to maintain it.

Moreover, in a case where the execution time has a start and an end on absolute time, the start time is indicated by ResourceClass@startTime, and the end time is indicated by ResourceClass@endTime, as illustrated in FIG. 28. This example indicates that 1TB (terabyte) of storage is reserved from startTime to endTime.

Second Embodiment

Referring to FIGS. 29 to 32, as a second embodiment, an example of a case where the applications 82 at the subsequent stage to the FLUS-Sink 41 are connected in the different ME-Host 31 (a case where the resources of the ME-Host 31 are not sufficient) will be described.

That is, the second embodiment has a characteristic in which, in a case where resources required for the applications 82 at the subsequent stage to the FLUS-Sink 41 cannot be secured, the applications 82 are executed on a plurality of ME-Hosts 31 that satisfies the resource requirements.

Figure 29:
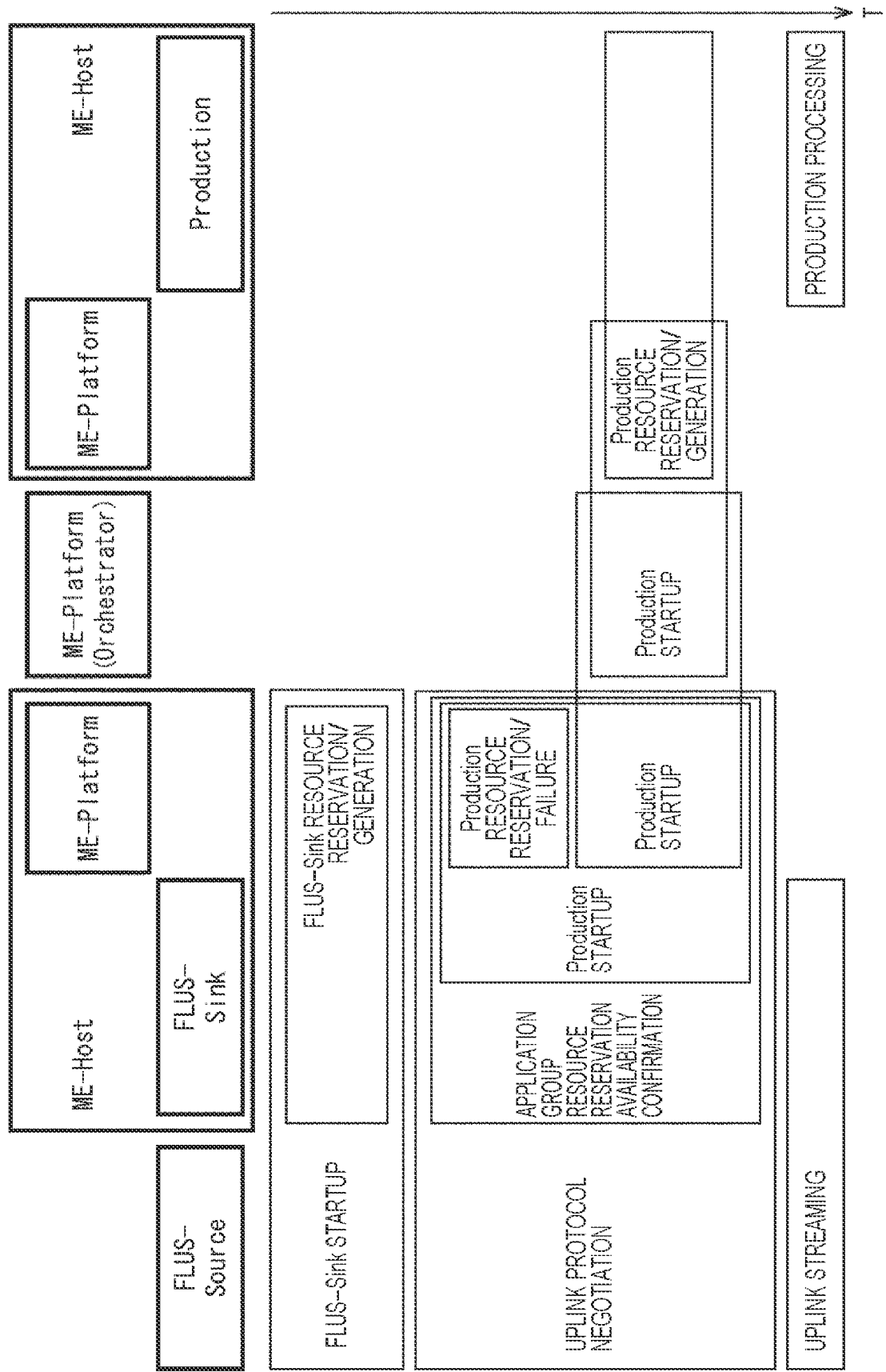
FIG. 29 is a diagram illustrating processing for starting uplink streaming.

FIG. 29 illustrates processing for starting uplink streaming in a case where the Production application cannot be executed on the ME-Host 31 on which the FLUS-Sink 41 is being executed due to limitation of the calculation resource, the storage resource, and the like on the ME-Host 31.

In this case, as illustrated in FIG. 29, it is assumed that the ME-Platform 83 searches for an optimum ME-Host 31 from a plurality of ME-Hosts 31 and executes the Production application. Furthermore, the ME-Platform 83 serves as the ME-Orchestrator 33 as illustrated in FIG. 3, that is, plays a role of coordinating the plurality of ME-Hosts 31.

First, FLUS-Sink startup processing is performed.

The FLUS-Sink startup processing is started by the FLUS-Source 21 and is performed with the ME-Platform 83, which causes the FLUS-Sink 41 to be started. Furthermore, FLUS-Sink resource reservation and generation processing is performed as one of pieces of FLUS-Sink startup processing. The FLUS-Sink resource reservation and generation processing is started by the ME-Platform 83, and resources of the FLUS-Sink 41 are reserved and generated.

After the FLUS-Sink startup processing is performed, uplink protocol negotiation processing is performed.

The uplink protocol negotiation processing is started by the FLUS-Source 21 and is performed with the ME-Platform 83, and negotiation for a protocol required for uplink is performed. Furthermore, as one of pieces of uplink protocol negotiation processing, resource reservation availability confirmation processing for a group of applications is performed. The resource reservation availability confirmation processing for the group of applications is started by the FLUS-Sink 41 and is performed with the ME-Platform 83 to confirm whether or not resource reservation for the group of applications is available.

Then, as one of pieces of the resource reservation availability confirmation processing for the group of applications, Production startup processing is performed. The Production start processing is started by the FLUS-Sink 41 and is performed with the ME-Platform 83. The ME-Platform 83 reserves resources in its own ME-Host 31 and in a case where the ME-Platform 83 fails to do so, the ME-Platform 83 performs the Production startup processing with an ME-Platform 83 that functions as the ME-Orchestrator 33.

As a result, the ME-Platform 83 that functions as the ME-Orchestrator 33 searches for an optimum ME-Host 31 from a plurality of HE-Hosts 31 and executes the Production application in the ME-Host 31.

Then, after the uplink protocol negotiation processing is performed, uplink streaming is performed between the FLUS-Source 21 and the FLUS-Sink 41, and production processing is performed by the Production application.

Figure 30:
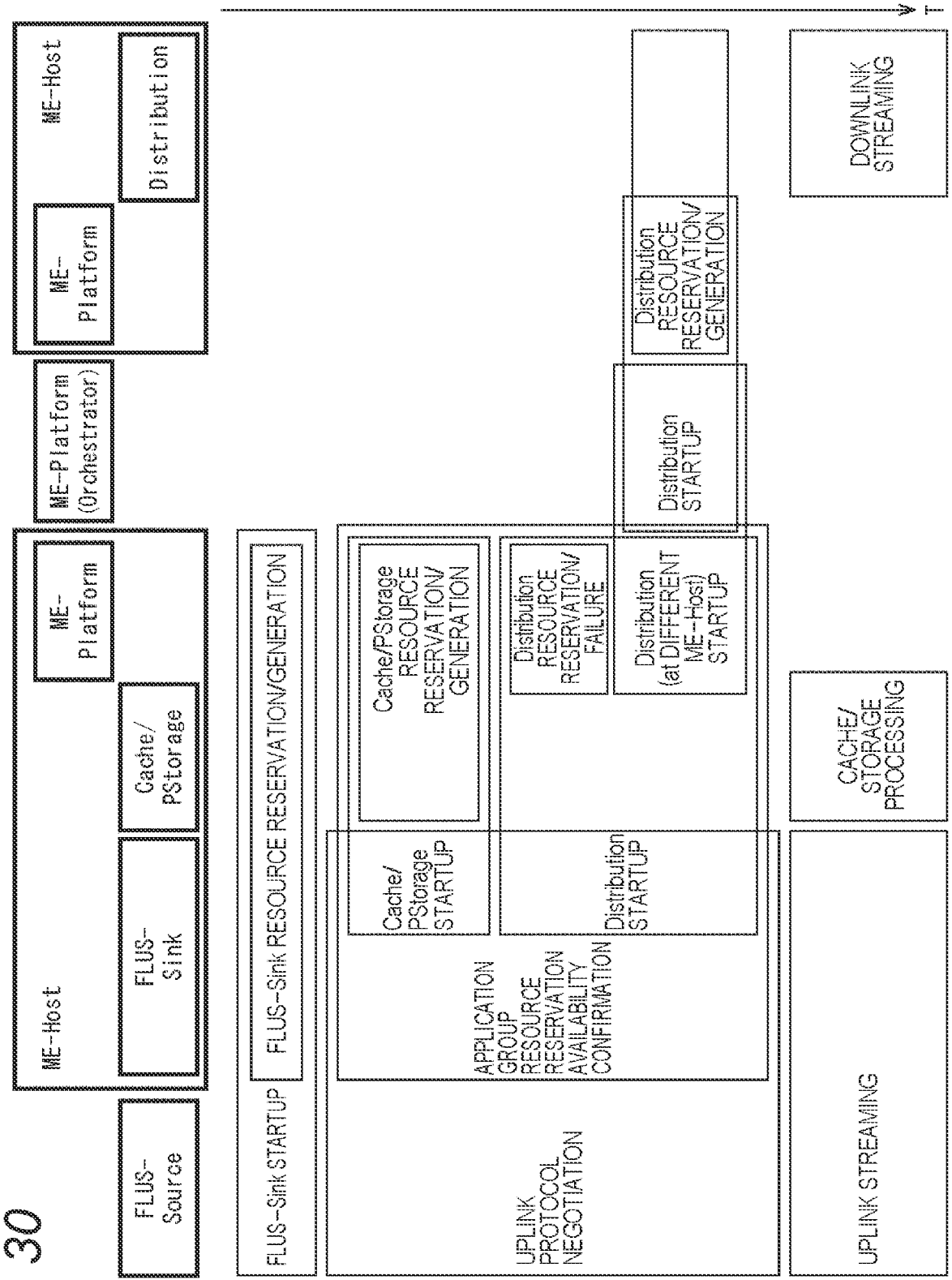
FIG. 30 is a diagram illustrating processing for starting uplink streaming.

FIG. 30 illustrates processing for starting uplink streaming in a case where there is one application 82 (Cache/PStorage) application) to be executed by the FLUS-Sink 41 and the ME-Host 31, and where there is one application 82 (Distribution application) to be executed by another ME-Host 31.

First, the FLUS-Source 21 performs FLUS-Sink startup processing to start the FLUS-Sink 41. Then, after the FLUS-Sink startup processing is performed, uplink protocol negotiation processing is performed.

In the uplink protocol negotiation processing, the FLUS-Sink 41 analyzes the Workflow-Description of the CandidateDescription described in the Service object for use in communication with the FLUS-Source 21. In this Workflow-Description, the output of the FLUS-Sink 41 is linked to the Cache/PStorage application that executes cache/storage processing and the Distribution application that executes downlink streaming processing to a stream playback client.

Here, suppose that both the Cache/PStorage application and the Distribution application cannot be executed on the same ME-Host 31 as that of the FLUS-Sink 41 (a reservation for Distribution resources is failed) due to resource limitation. At this time, in a case where a different ME-Host 31 that can meet the resource requirements for the Distribution is found, the Distribution application is executed on the different. ME-Host 31.

Figure 32:
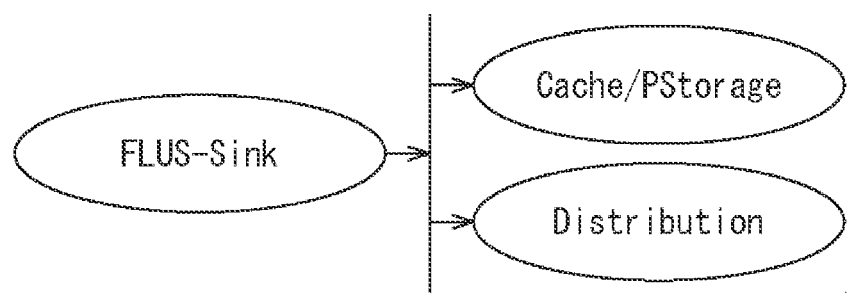
FIG. 32 is a diagram illustrating connection among applications.

FIG. 31 illustrates an example of description of the Workflow-Description in such a case, and as illustrated in FIG. 32, the output of the FLUS-Sink is linked to the Cache/PStorage application and the Distribution application.

Third Embodiment

Referring to FIGS. 33 to 38, as a third embodiment, transfer of the FLUS-Sink 41 and the subsequent applications 82 between the ME-Hosts 31 due to handover of the FLUS-Source 21 between the base stations 13 will be described.

That is, the third embodiment has a characteristic in which, in a case where the environment of the ME-Host 31 shifts due to the handover of the FLUS-Source 21 between the base stations 13, protocol negotiation including securing of resources required for the subsequent applications 82 is performed.

Figure 33:
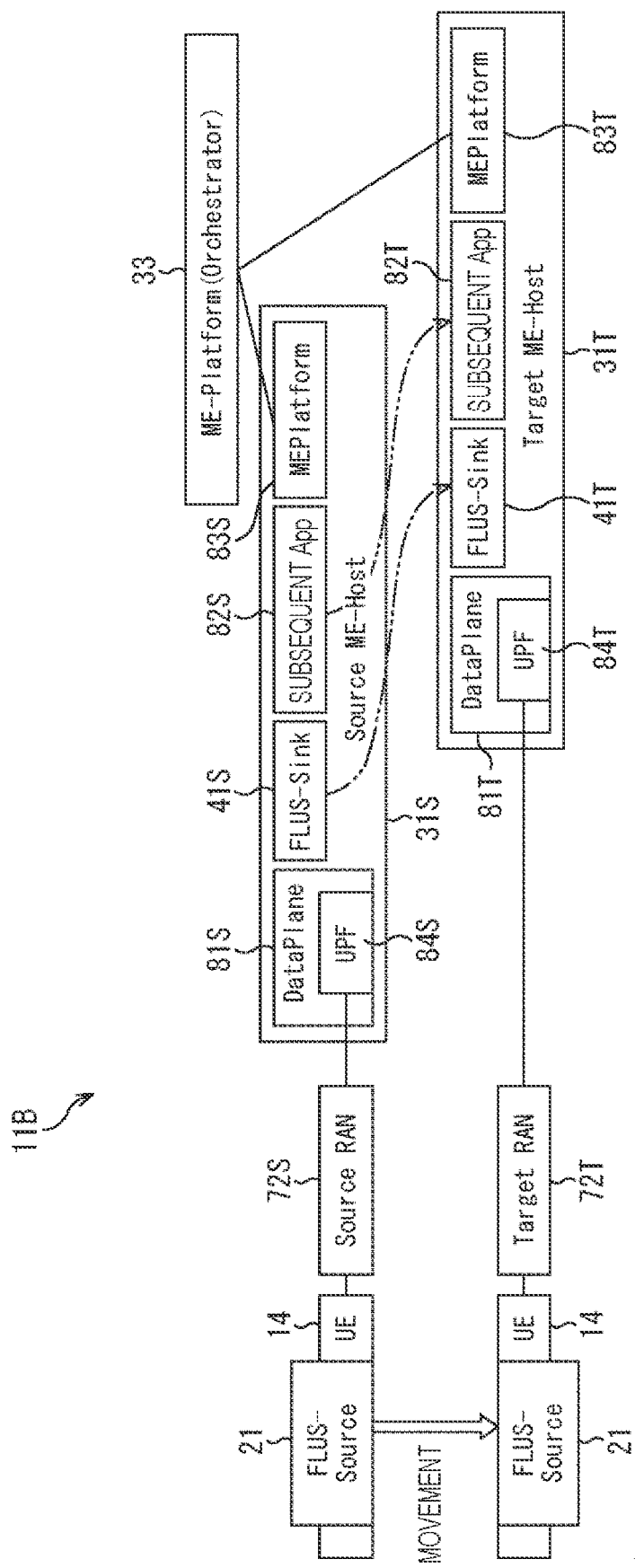
FIG. 33 is a diagram illustrating a configuration example of an information processing system according to a third embodiment.

FIG. 33 illustrates a configuration example of an information processing system 112 according to the third embodiment.

Here, consider a case where, when the user terminal 14 that implements the FLUS-Source 21 such as a camera as illustrated in FIG. 1 moves to follow a subject, the user terminal 14 is handed over between the base stations 13 each of which implements an ME-Host 31. At this time, it is assumed that an ME-Host 31 is implemented on each of the base stations 13.

Furthermore, in the following description, the access network 72 before the handover is referred to as a source access network 72S, and the ME-Host 31 before the handover is referred to as a source ME-Host 31S. Similarly, the access network 72 in the destination of the handover is referred to as a target access network 72T, and the ME-Host 31 in the destination of the handover is referred to as a target ME-Host 31T.

Then, as illustrated in FIG. 33, provided are a FLUS-Sink application 41S on the source ME-Host 31S bound to a predetermined base station 13 and the FLUS-Source 21 that is uplink-streaming via the source access network 72S. It is assumed that the user terminal 14 that implements this FLUS-Source 21 moves to the target access network 72T in the base station 13 to which the target ME-Host 31T is bound.

A flow of processing in such a configuration will be described below.

Figure 38:
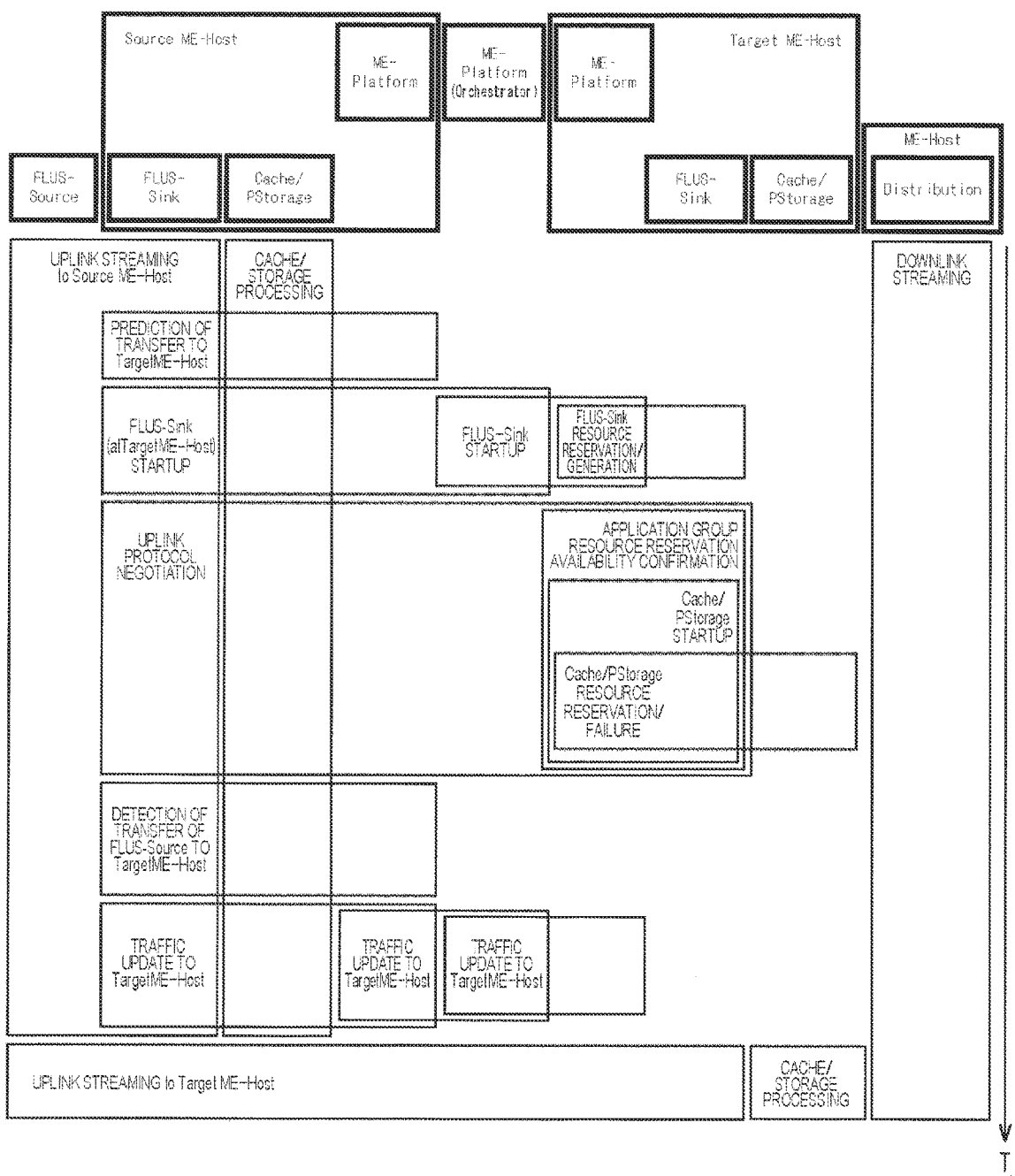
FIG. 38 is a diagram illustrating processing for starting uplink streaming.

FIG. 38 illustrates a flow after the uplink streaming has already started. Note that, in FIG. 38, the phase in which the FLUS-Source 21 starts the FLUS-Sink 41S on the source ME-Host 31S and the phase in which uplink protocol negotiation is performed as described above are omitted.

Figure 36:
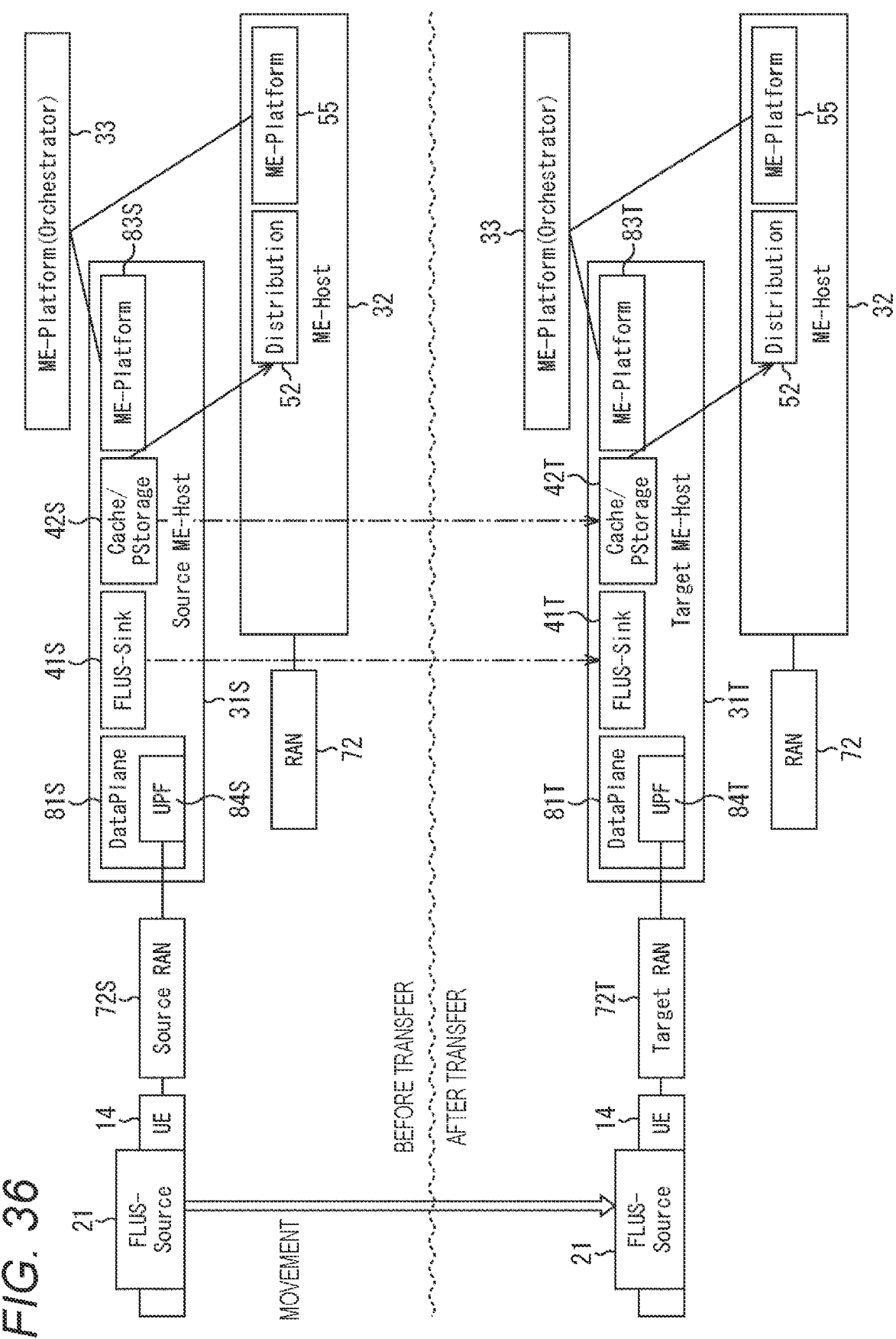
FIG. 36 is a diagram illustrating transfer of a FLUS-Sink and a Cache/PStorage application.
Figure 37:
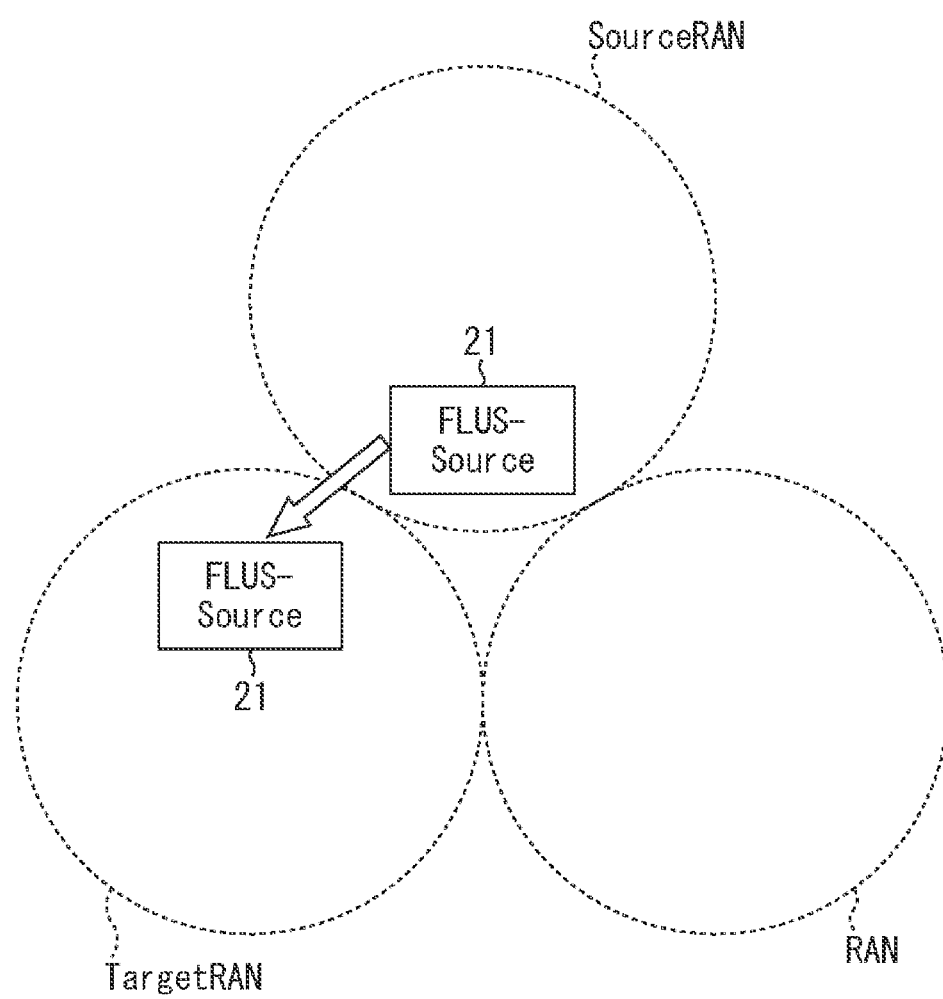
FIG. 37 is a diagram illustrating movement of a FLUS-Source from a Source RAN to a Target RAN.

For example, as illustrated in FIG. 36, there is a FLUS-Source 21 that is uplink-streaming with the FLUS-Sink 41S on the source ME-Host 31S. Furthermore, a data retention processing unit (Cache/PStorage) 42S and the distribution processing unit 52 are connected to the subsequent stage to the FLUS-Sink 41S. Here, the data retention processing unit (Cache/PStorage) 42 and the distribution processing unit 52 are a Cache/PStorage application and a Distribution application executed as the applications 82. Furthermore, in the example illustrated in FIG. 36, the Distribution application is executed on a different. ME-Host 32 from that of the FLUS-Sink 41S.

Then, the user terminal 14 that implements the FLUS-Source 21 moves to the target access network 72T in the base station 13 to which the target ME-Host 31T, which is a different ME-Host, is bound. At this time, the Cache/PStorage application that is being executed on the source ME-Host 31S transfers to the target ME-Host 31T. Here, the transfer does not mean that the application moves together with the state information thereof but means that a corresponding application is separately generated on the target ME-Host 31 in the transfer destination. That is, the state information of the application does not move.

Furthermore, the FLUS-Sink 41S that is being executed on the source ME-Host 31S can detect movement (a position) of the user terminal 14 on which the FLUS-Source 21 is implemented by the API provided by the ME-Platform 83S. Then, suppose that movement of the user terminal 14 from the source access network 72S, in which the user terminal 14 exists at present, to the target access network 72T, which is a different access network, is predicted from position transfer information at each time point, statistical information, analysis of mobility patterns using AI, and the like (prediction of transfer to Target ME-Host in FIG. 38). Note that it is assumed that the target ME-Host 31T is implemented on the base station of the target access network 72T as the transfer destination. At this time, the FLUS-Sink 41S on the source ME-Host 31S requests the ME-Orchestrator 33 to execute the FLUS-Sink 41T and the subsequent applications on the target ME-Host 31T (FLUS-Sink (at Target ME-Host) startup in FIG. 38).

At this time, reservation for resources for the application is attempted on the basis of the protocol resource requirements equivalent to those for the currently established session or from the list of the CandidateDescription candidates listed in Service/CandidateDescriptions in a priority order (FLUS-Sink resource reservation/generation in FIG. 38). Here, the protocol resource requirements are described in the protocol and WorkflowDescription referred to in CandidateDesription referred to by sdId stored in SessionDescription with Service/Session[@state='active'].

Figure 34:
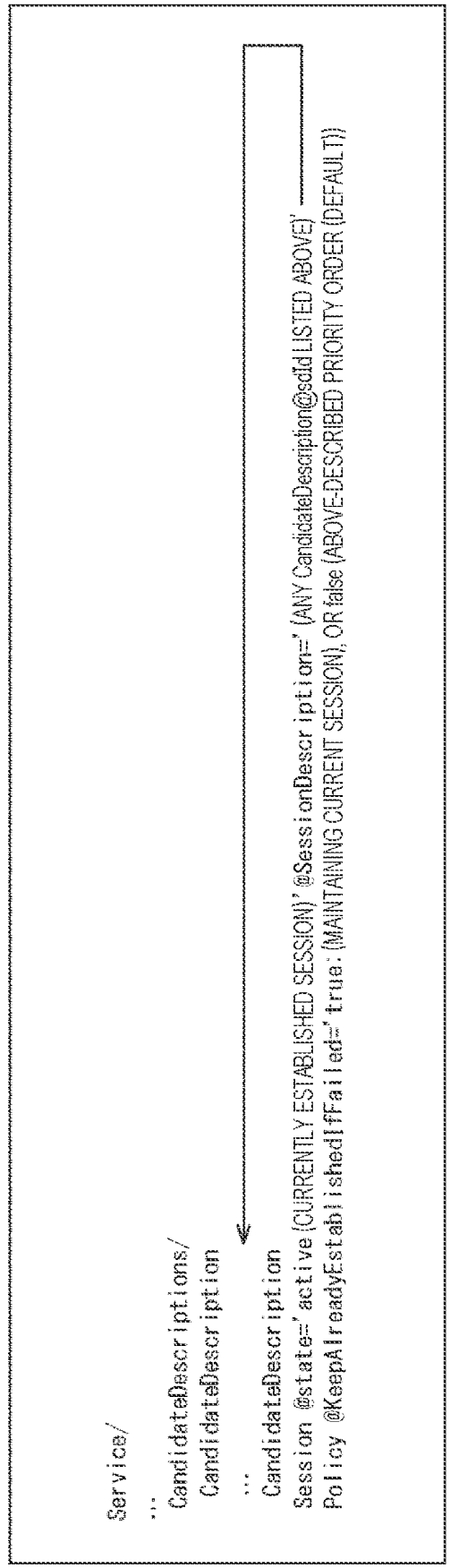
FIG. 34 is a diagram illustrating KeepAlreadyEstablishedIfFialed.

Moreover, at this time, whether to maintain the currently established session or attempt to execute the application in the priority in the candidate list can be determined by a flag (true: maintaining the current session, false: candidate priority order) in Service/Policy/KeepAlreadyEstablishedIfFailed giving an instruction on a policy of session candidate selection after transfer as illustrated in FIG. 34. In a case where this flag does not exist, KeepAlreadyEstablishedIfFialed='false' (default) is specified. That is, the transfer of the ME-Host 31 shall be attempted to take advantage of the MEC as much as possible.

Furthermore, while the FLUS-Sink 41T and the subsequent applications on the target ME-Host 31T are started as the required resources are reserved (application group resource reservation availability confirmation in FIG. 38), the processing is not started immediately, but the actual processing is performed after the stream actually arrives. Suppose that, as time further passes, the FLUS-Sink 41S on the source ME-Host 31S detects via the ME-Platform 83S that the user terminal 14 on which the FLUS-Source 21 is implemented moves and is connected to the new target access network 72T to which the target ME-Host 31T is bound (detection of transfer of FLUS-Source to Target ME-Host in FIG. 38).

In response to this, the traffic is changed so that the FLUS-Sink 41T, which stands by on the target ME-Host 31T, can receive the stream from the target access network 72T after the transfer (traffic update to Target ME-Host in FIG. 38). As a result, the FLUS-Sink 41T and the data retention processing unit (Cache/PStorage) 42, which are in the standby state, start processing the uplink stream transmitted from the FLUS-Source 21 via the target access network 72T after the transfer (Uplink streaming to Target ME-Host in FIG. 38).

Note that, in a case where the transfer itself of the applications including the FLUS-Sink 41 between the ME-Hosts 31 is not allowed, Policy@DoNotMigrate='true' can be specified as illustrated in FIG. 35. Note that, in a case where this flag is true, KeepAreadyEstablishedIfFailed is not specified.

Fourth Embodiment

Referring to FIGS. 39 to 48, as a fourth embodiment, transfer of the FLUS-Sink 41 and the subsequent applications between the ME-Hosts 31 (a case where the resources of the ME-Host 31 are not sufficient) will be described.

That is, the fourth embodiment has a characteristic in which, in a case where the environment of the ME-Host 31 shifts due to the handover of the FLUS-Source 21 between the base stations 13, an MH-Host that can secure resources required for the subsequent applications is selected.

Figure 39:
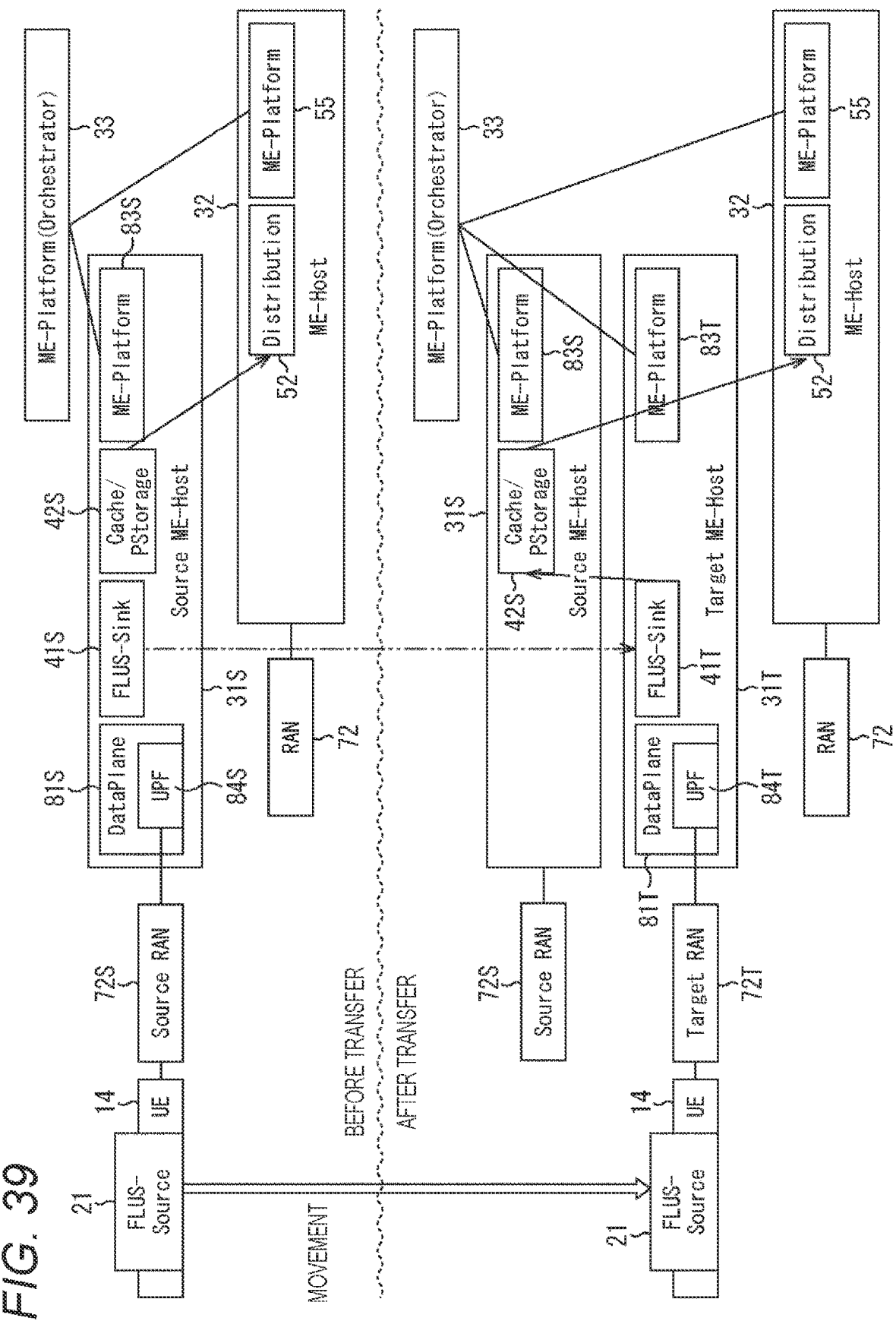
FIG. 39 is a diagram illustrating a configuration example of an information processing system according to a fourth embodiment.

FIG. 39 illustrates, as a configuration example of the information processing system according to the fourth embodiment, an example of a case where sufficient resources cannot be secured on the target ME-Host 31T and where the desired applications cannot be executed on the target ME-Host 31T.

Figure 40:
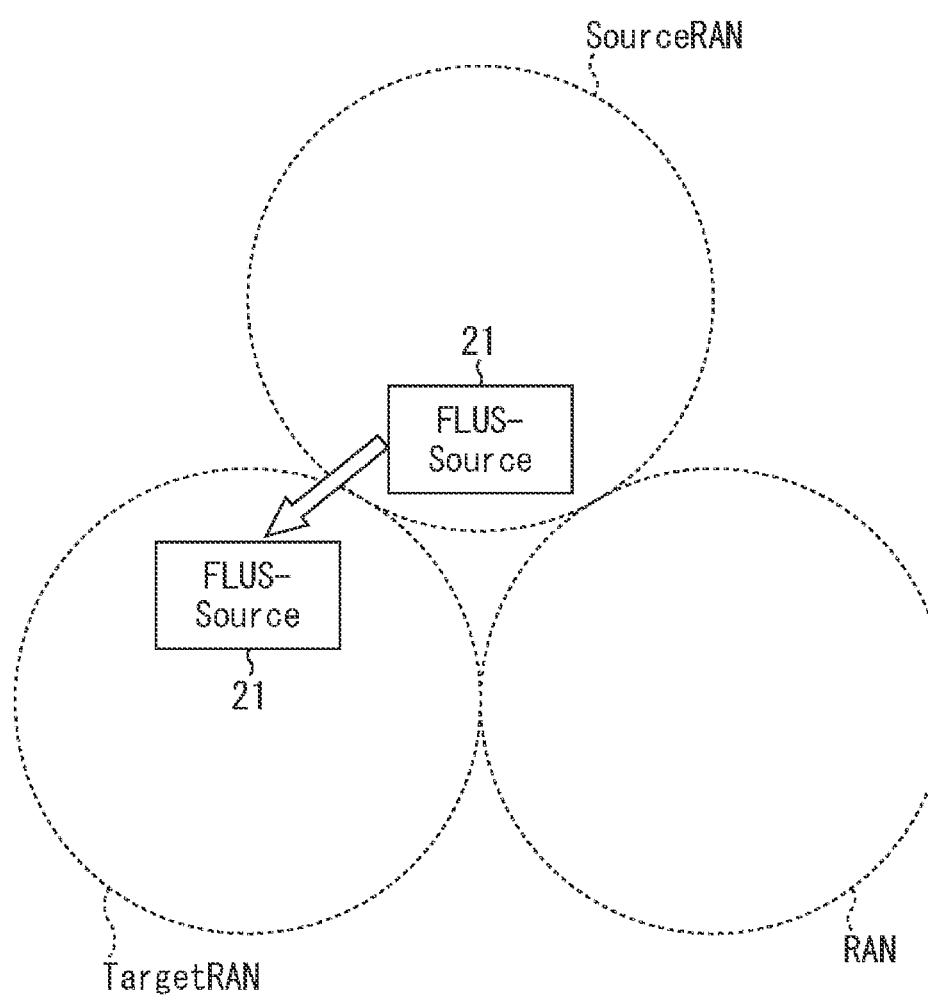
FIG. 40 is a diagram illustrating movement of a FLUS-Source from a Source RAN to a Target RAN.

That is, FIG. 39 illustrates an example of a case where, when the FLUS-Source 21 is handed over as the FLUS-Source 21 moves from a Source RAN to a Target RAN as illustrated in FIG. 40, the FLUS-Sink 41 can be executed on the target ME-Host 31T, but the Cache/PStorage application cannot be started.

Figure 41:
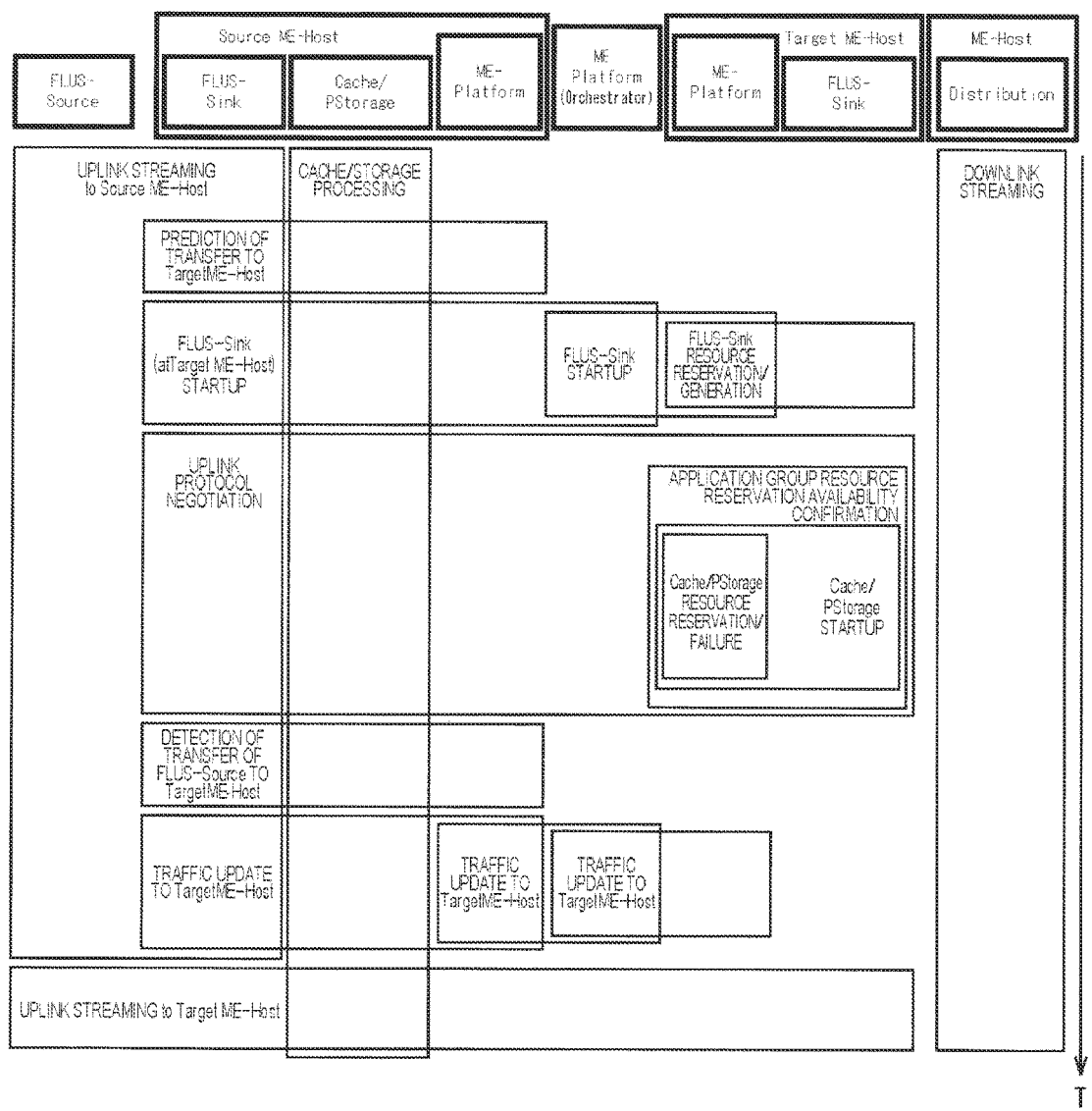
FIG. 41 is a diagram illustrating processing for starting uplink streaming.

In this case, processing described with reference to FIG. 41 is performed.

That is, the FLUS-Sink 41S on the source ME-Host 31S requests the ME-Orchestrator 33 to execute the FLUS-Sink 41T and the Cache/PStorage on the target ME-Host 31T, but only the Cache/PStoage cannot satisfy the resource requirements and fails to be executed (Cache/PStoage resource reservation/failure in FIG. 41). In this case, it is apparent in advance that, even in a case where the user terminal 14 that implements the FLUS-Source 21 is transferred to the target access network 72T to which the target ME-Host 31T is bound, the Cache/PStorage on the target ME-Host 31T cannot process the uplink stream serving as an output from the FLUS-Sink 41T. Accordingly, even in a case where the transfer occurs, the data retention processing unit (Cache/PStorage) 42S on the source ME-Host 31S is in a standby state so that the execution state of the data retention processing unit (Cache/PStorage) 42S may be maintained.

Thereafter, as time passes, the FLUS-Sink 41S on the source ME-Host 31S detects via the ME-Platform 83S that the user terminal 14 on which the FLUS-Source 21 is implemented moves and is connected to a new RAM to which the target ME-Host 31T is bound (detection of transfer of FLUS-Source to Target ME-Host in FIG. 41). In response to this, the traffic is changed so that the FLUS-Sink 41T, which stands by on the target ME-Host 31T, can receive the uplink stream from the target access network 72T after the transfer (traffic update to Target ME-Host in FIG. 41).

As a result, the FLUS-Sink 41T, which is in the standby state, starts processing the uplink stream transmitted from the FLUS-Source 21 via the target access network 72T after the transfer (Uplink streaming to Target ME-Host in FIG. 38). However, since the subsequent Cache/PStorage is not started on the same target ME-Host 31T, the output stream of the FLUS-Sink 41 is transmitted to the data retention processing unit (Cache/PStorage) 42S on the source ME-Host 31S executed before the transfer.

Figure 42:
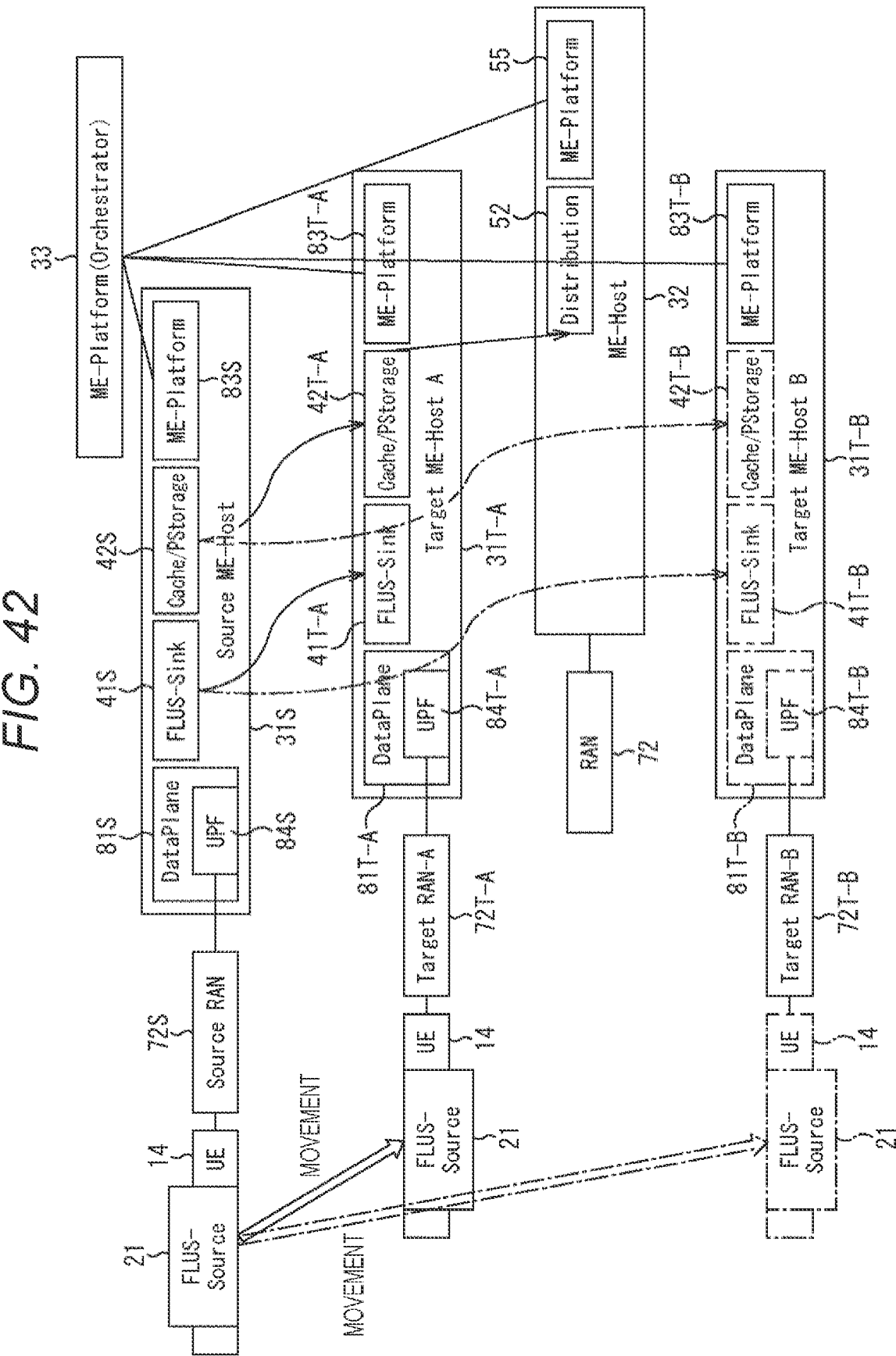
FIG. 42 is a diagram illustrating a case of transfer to two target ME-Hosts.
Figure 43:
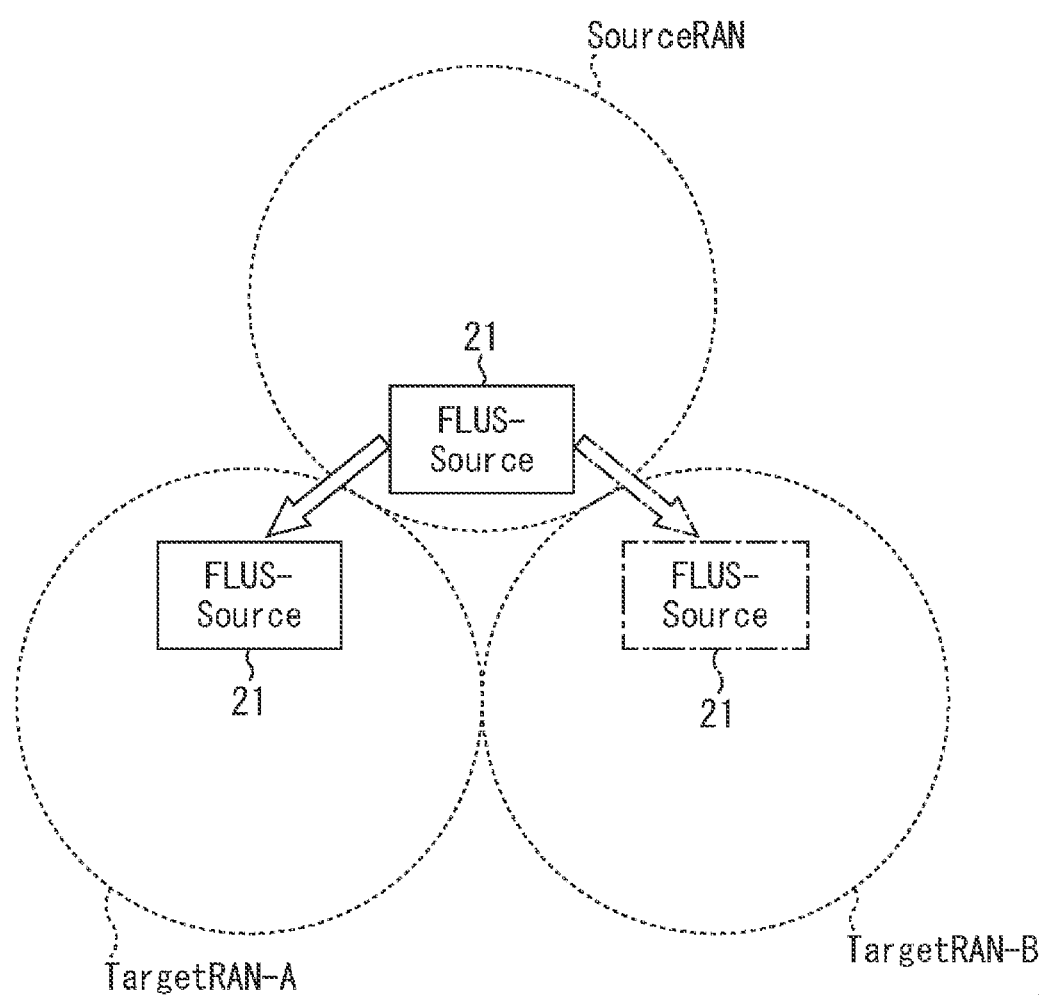
FIG. 43 is a diagram illustrating movement of a FLUS-Source from a Source RAN to a Target RAN.

Next, the block diagram illustrated in FIG. 42 illustrates an example in which, in a case where a transfer destination cell (access network 72) cannot be predicted, sets of the FLUS-Sink 41 and the Cache/PStorage are executed on a target ME-Host 31T-A and a target ME-Host 31T-B respectively bound to two cells that may be transfer destinations. Note that the two cells that may be transfer destinations are a Target RAN-A and a Target RAN-B as illustrated in FIG. 43. Here, a case where the FLUS-Source 21 is eventually transferred to a target access network 72T-A bound to a target ME-Host 31T-A is illustrated.

Figure 44:
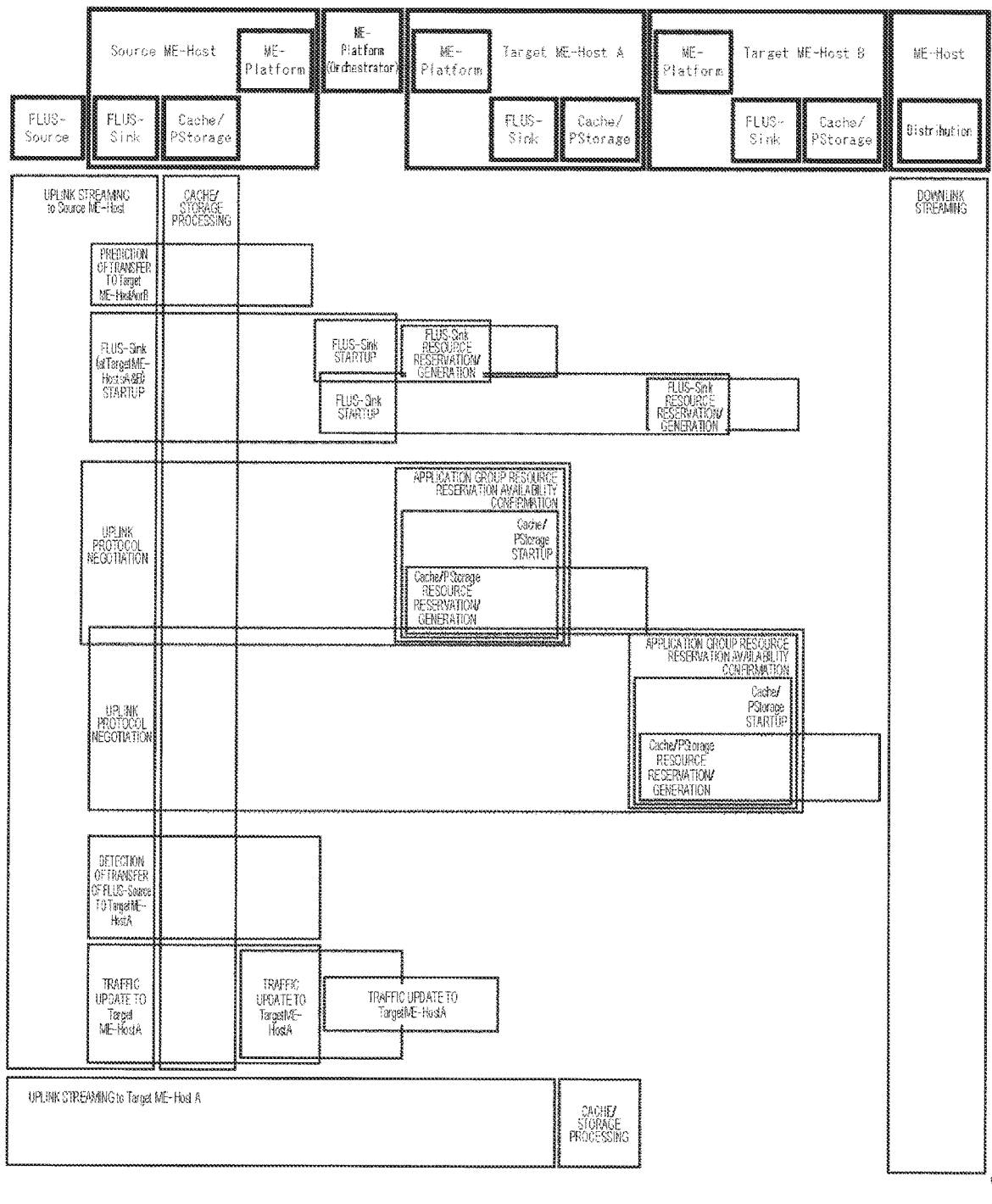
FIG. 44 is a diagram illustrating processing for starting uplink streaming.

In this case, the processing illustrated in FIG. 44 is performed.

FIG. 44 illustrates a flow after the uplink streaming has already started.

For example, suppose that the FLUS-Sink 41 predicts movement of the user terminal 14 from the source access network 72S, in which the user terminal 14 exists at present, to a target access network 72T-A or 72T-B, which is a different access network (prediction of transfer to Target ME-Host A or B in FIG. 44).

At this time, the FLUS-Sink 41S on the source ME-Host 31S requests the ME-Orchestrator 33 to execute FLUS-Sinks 41T-A and 41T-B and the subsequent applications on the target ME-Hosts 31T-A and 31T-B (FLUS-Sink (at Target ME-Hosts A & B) startup in FIG. 44).

Then, the uplink protocol negotiation is performed between the FLUS-Sink 41 and the target ME-Host 31T-A and between the FLUS-Sink 41 and the target ME-Host 31T-B, respectively, and the resource reservation availability confirmation for the group of applications is performed in the target ME-Host 31T-A and the target ME-Host 31T-B, respectively.

Suppose that, as time further passes, it is detected that the user terminal 14 on which the FLUS-Source 21 is implemented moves and is connected to the new target access network 72T-A to which the target ME-Host 31T-A is bound (detection of transfer of FLUS-Source to Target ME-Host A in FIG. 44).

In response to this, the traffic is changed so that the FLUS-Sink 41T-A, which stands by on the target ME-Host 31T-A, can receive the stream from the target access network 72T-A after the transfer (traffic update to Target ME-Host A in FIG. 44). As a result, the FLUS-Sink 41T-A and the data retention processing unit (Cache/PStorage) 42-A, which are in the standby state, start processing the uplink stream transmitted from the FLUS-Source 21 via the target access network 72T-A after the transfer (Uplink streaming to Target ME-Host A in FIG. 44).

Figure 45:
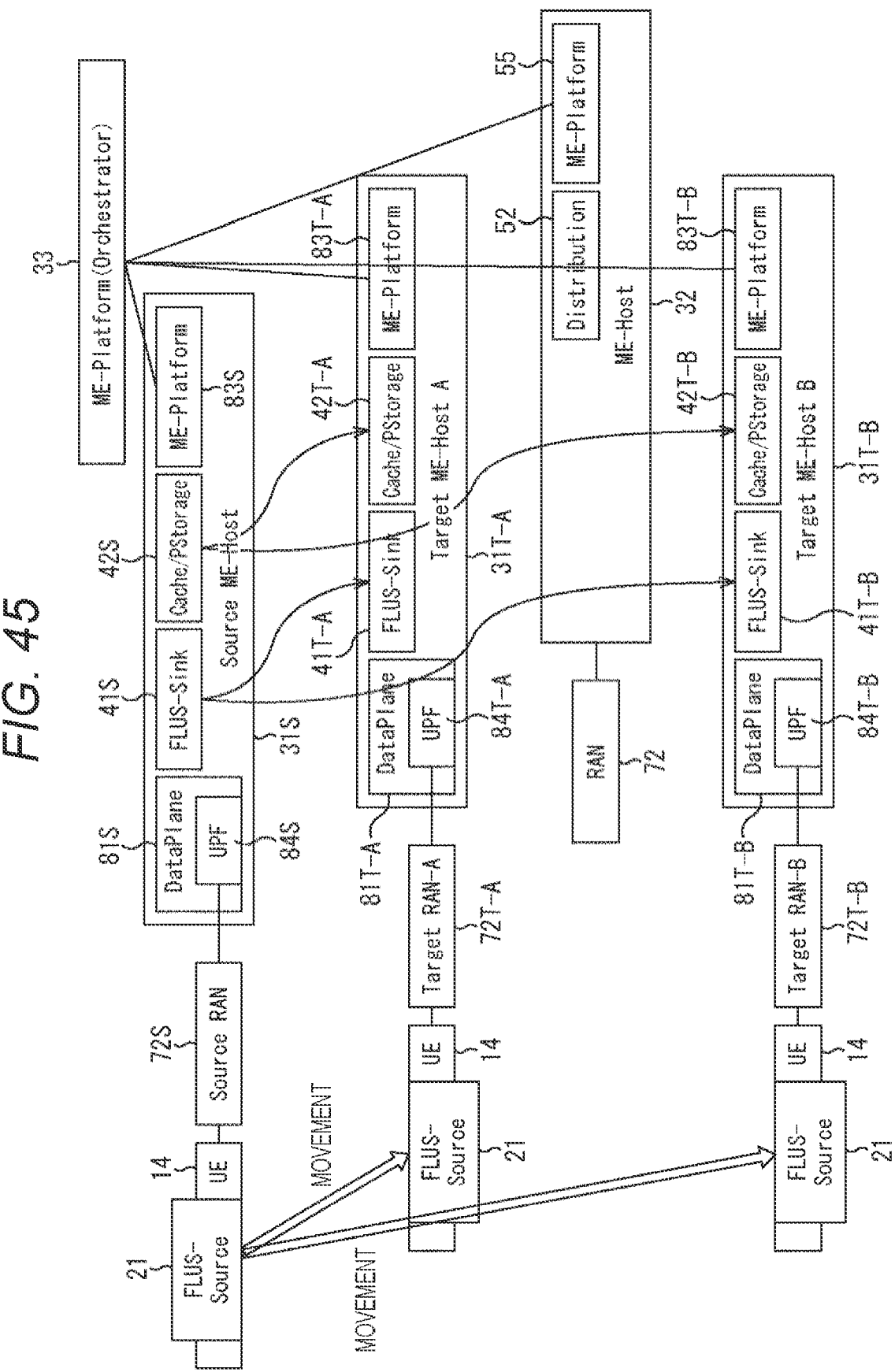
FIG. 45 is a diagram illustrating an example of ensuring fault tolerance redundancy.

Next, the block diagram illustrated in FIG. 45 is an example of ensuring fault tolerance redundancy, in which sets of the FLUS-Sink 41 and the Cache/PStorage are executed on the ME-Hosts 31 (target ME-Hosts 31T-A and 31T-B) bound to two cells (target access networks 72T-A and 72T-B) whose coverages overlap, and in which two uplink sessions are synchronized and executed.

Figure 46:
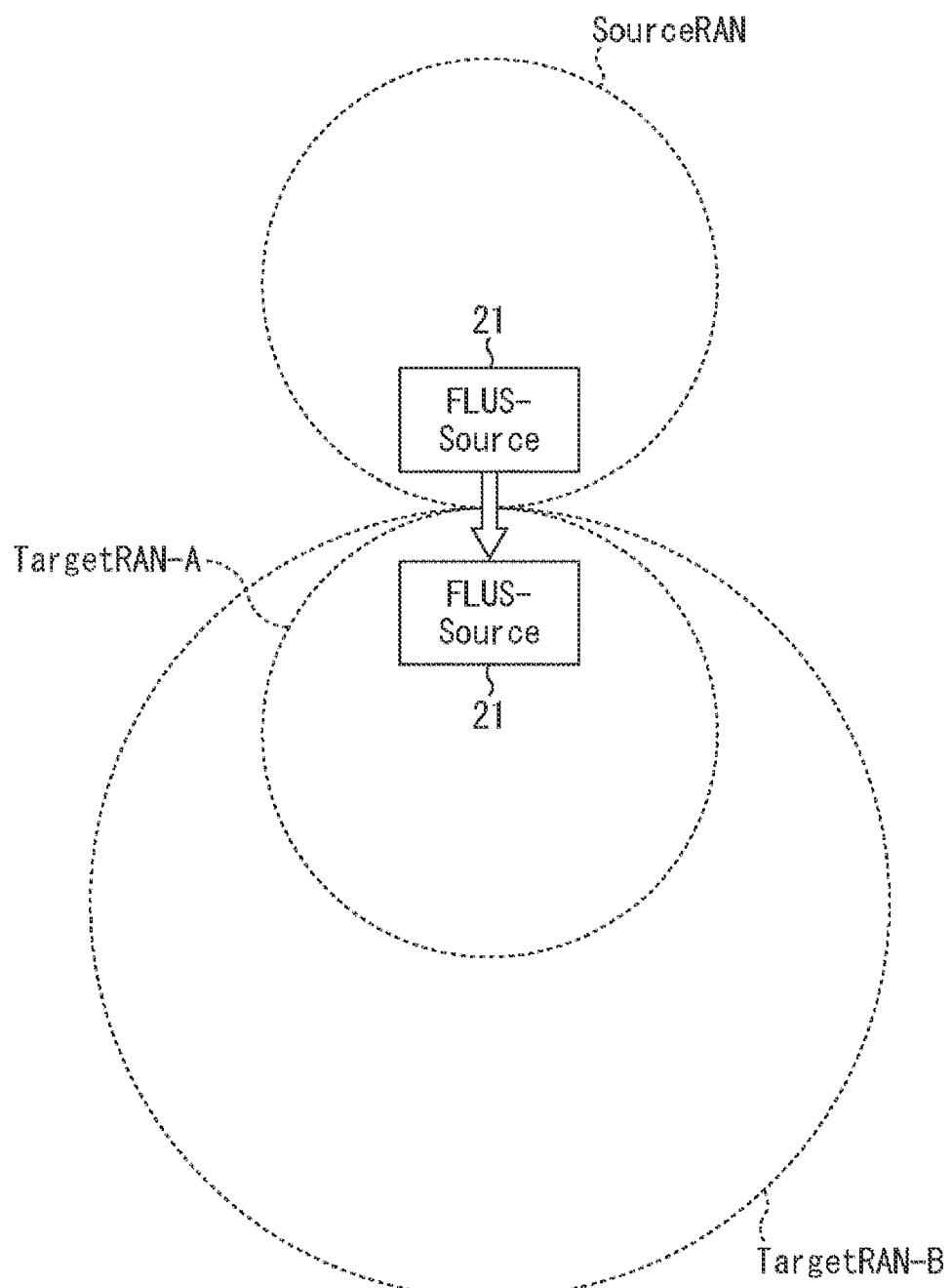
FIG. 46 is a diagram illustrating movement of a FLUS-Source from a Source RAN to a Target RAN-A and a Target RAN-B.

For example, it is assumed that the transferred FLUS-Source 21 is connected to both the Target RAN-A and the Target RAN-B at the same time as illustrated in FIG. 46. In this case, it is assumed that either the output of the FLUS-Sink 41T-A on the target ME-Host 31T-A or the output of the FLUS-Sink 41T-B on the target ME-Host 31T-B is input into the Distribution application.

Figure 47:
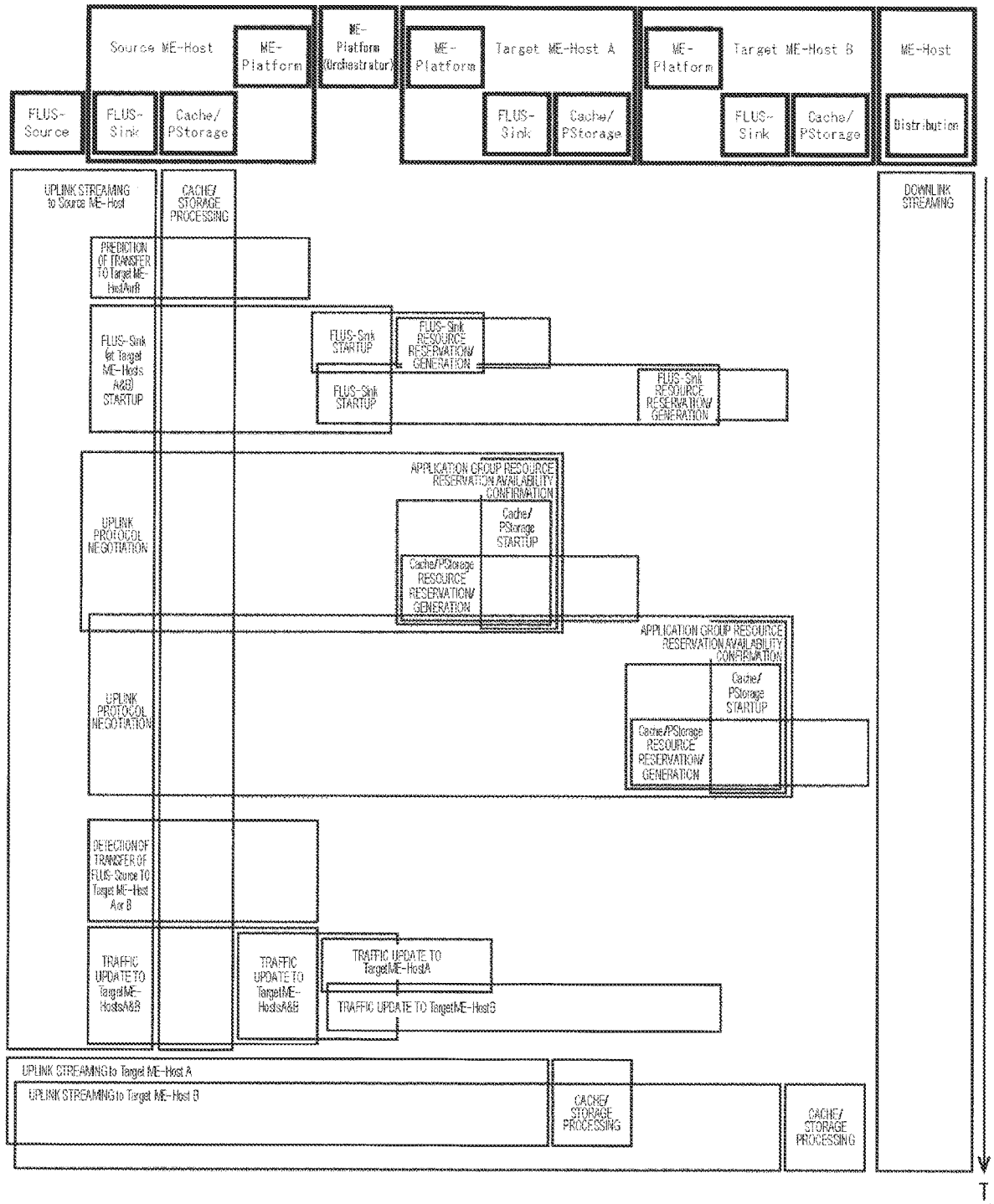
FIG. 47 is a diagram illustrating processing for starting uplink streaming.

In this case, processing described with reference to FIG. 47 is performed.

FIG. 47 illustrates a flow after the uplink streaming has already started.

For example, suppose that the FLUS-Sink 41 predicts movement of the user terminal 14 from the source access network 72S, in which the user terminal 14 exists at present, to a target access network 72T-A or 72T-B, which is a different access network (prediction of transfer to Target ME-Host A or B in FIG. 47).

At this time, the FLUS-Sink 41S on the source ME-Host 31S requests the ME-Orchestrator 33 to execute the FLUS-Sinks 41T-A and 41T-B and the subsequent applications on the target ME-Hosts 31T-A and 31T-B (FLUS-Sink (at Target ME-Hosts A & B) startup in FIG. 47).

Then, the uplink protocol negotiation is performed between the FLUS-Sink 41 and the target ME-Host 31T-A and between the FLUS-Sink 41 and the target ME-Host 31T-B, respectively, and the resource reservation availability confirmation for the group of applications is performed in the target ME-Host 31T-A and the target ME-Host 31T-B, respectively.

Suppose that, as time further passes, it is detected that the user terminal 14 on which the FLUS-Source 21 is implemented moves and is connected to the new target access networks 72T-A and 72T-B to which the target ME-Hosts 31T-A and 31T-B are bound, respectively (detection of transfer of FLUS-Source to Target ME-Host A or B in FIG. 47).

In response to this, the traffic is changed so that the FLUS-Sinks 41T-A and 41T-B, which stand by on the target ME-Hosts 31T-A and 31T-B, can receive the stream from the target access networks 72T-A and 72T-B after the transfer (traffic update to Target ME-Hosts A & B in FIG. 47). As a result, the FLUS-Sink 41T-A and the data retention processing unit (Cache/PStorage) 42-A, which are in the standby state, start processing the uplink stream transmitted from the FLUS-Source 21 via the target access networks 72T-A and 72T-B after the transfer (Uplink streaming to Target ME-Host A and Uplink streaming to Target ME-Host B in FIG. 44).

This redundant configuration can be specified by setting the duplicate attribute of the Service element of the target application to 'true' in the Workflow-Description as illustrated in FIG. 48.

Note that, in the description of the above embodiments, although the FLUS-Source 21 generates a Service object and transmits it to the FLUS-Sink 41, the FLUS-Sink 41 may generate the Service object. Moreover, the FLUS-Sink 41 may transmit a Service object to the FLUS-Source 21, and the FLUS-Source 21 may select CandidateDescription from the Service object, update the Service object, and send it to the FLUS-Sink 41. That is, either the FLUS-Source 21 or the FLUS-Sink 41 may start processing as long as the FLUS-Source 21 and the FLUS-Sink 41 transmit and receive a Service object, negotiate for a protocol required for uplink, and perform control protocol negotiation for a content uplink stream.

<Configuration Example of Computer>

Next, the series of pieces of processing (information processing method) described above can be performed by hardware or software. In a case where the series of pieces of processing is performed by software, a program including the software is installed in a general-purpose computer or the like.

Figure 49:
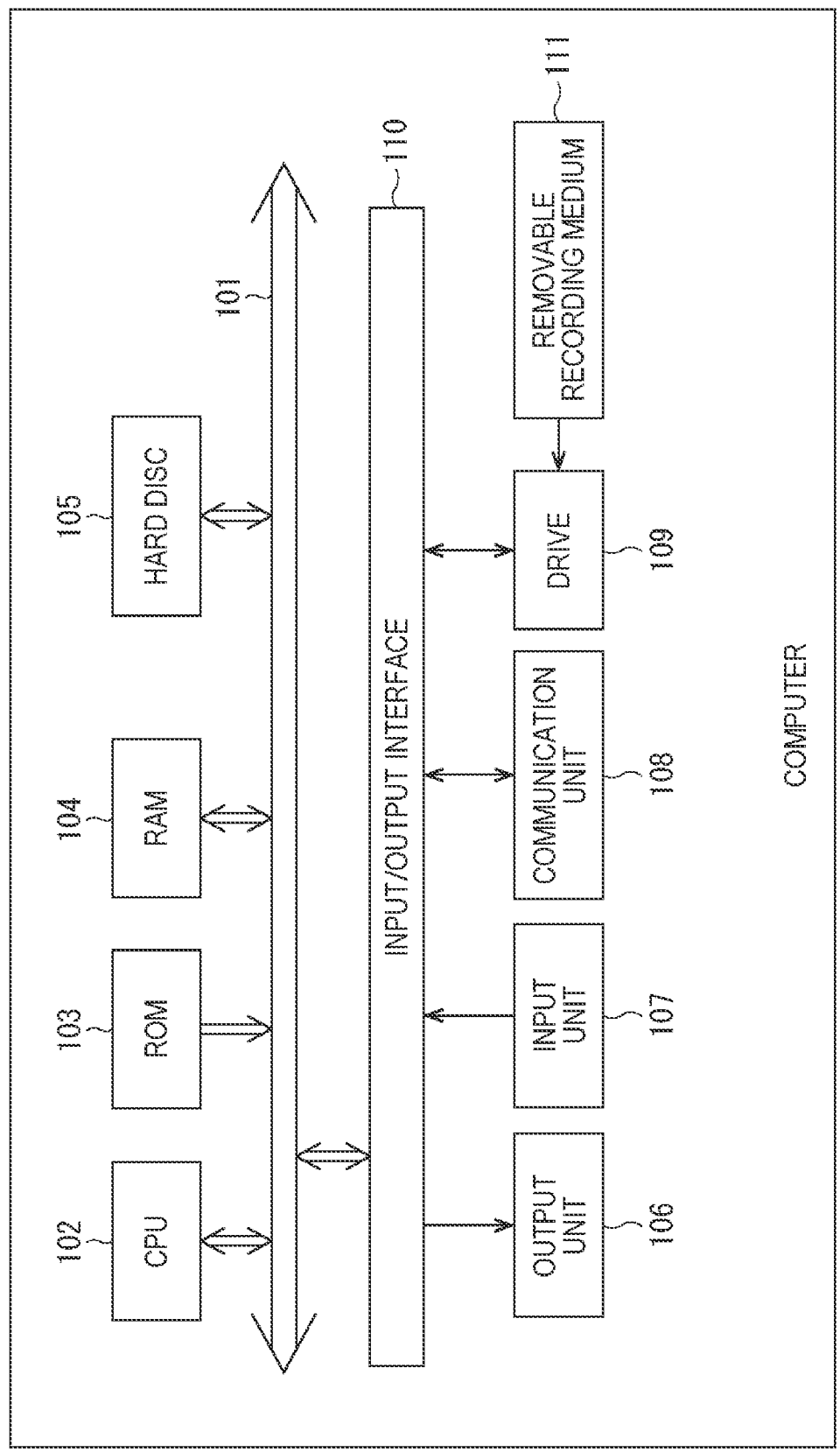
FIG. 49 is a block diagram illustrating a configuration example of an embodiment of a computer to which the present technology has been applied.

FIG. 49 is a block diagram illustrating a configuration example of an embodiment of a computer in which a program that executes the above-mentioned series of pieces of processing is installed.

The program can be recorded in advance in a hard disc 105 or a ROM 103 serving as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include a flexible disc, a Compact Disc Read Only Memory (CD-ROM), a Magneto Optical (MO) disc, a Digital Versatile Disc (DVD), a magnetic disc, and semiconductor memory.

Note that the program can not only be installed in the computer from the removable recording medium 111 as described above but can also be downloaded to the computer via a communication network or a broadcasting network and installed in the built-in hard disc 105. That, is, for example, the program can be transferred wirelessly from a download site to the computer via an artificial satellite for digital satellite broadcasting or transferred by wire to the computer via a network such as a Local Area Network (LAN) and the Internet.

The computer has a Central Processing Unit (CPU) 102 built therein, and an input/output interface 110 is connected to the CPU 102 via a bus 101.

When an input unit 107 is operated by the user to cause a command to be input via the input/output interface 110, the CPU 102 executes the program stored in the Read Only Memory (ROM) 103 in accordance with the command. Alternatively, the CPU 102 loads the program stored in the hard disc 105 into a Random Access Memory (RAM) 104 and executes it.

As a result, the CPU 302 performs the processing in accordance with the above-mentioned flowcharts or the processing in accordance with the configuration of the above-mentioned block diagram. Then, the CPU 102 outputs the processing result from an output unit 106, transmits it from a communication unit 108, or records it in the hard disc 105 via the input/output interface 110 as needed, for example.

Note that the input unit 107 includes a keyboard, a mouse, a microphone, and the like. Furthermore, the output unit 106 includes a Liquid Crystal Display (LCD), a loudspeaker, and the like.

Here, in the present specification, the processing performed by the computer in accordance with the program does not necessarily have to be performed in chronological order in the order described as the flowchart. That is, the processing performed by the computer in accordance with the program also includes processing executed in parallel or individually (for example, parallel processing or processing by an object).

Furthermore, the program may be processed by one computer (processor) or may be processed in a distributed manner by a plurality of computers. Moreover, the program may be transferred to a distant computer and executed.

Moreover, in the present specification, the system means a set of a plurality of components (devices, modules (parts), and the like), and it does not matter whether or not all the components are in the same housing. Therefore, both a set of a plurality of devices housed in separate housings and connected via a network and a device having a plurality of modules housed in one housing are both systems.

Furthermore, for example, the configuration described as one device (or processing unit) may be divided and configured as a plurality of devices (or processing units). Conversely, the configurations described above as a plurality of devices (or processing units) may collectively be configured as one device (or processing unit). Further, it is to be understood that a configuration other than the above may be added to the configuration of each device (or each processing unit). Further, as long as the configuration and operation of the entire system are substantially the same, a part of the configuration of one device (or processing unit) may be included in the configuration of another device (or another processing unit).

Furthermore, for example, the present technology can be configured as cloud computing in which one function is shared and jointly processed by a plurality of devices via a network.

Furthermore, for example, the above-mentioned program can be executed in an arbitrary device. In this case, the device is only required to have necessary functions (functional blocks or the like) and be able to acquire necessary information.

Furthermore, for example, each step described in the above-mentioned flowchart can not only be executed by one device but can also be shared and executed by a plurality of devices. Moreover, in a case where one step includes a plurality of pieces of processing, the plurality of pieces of processing included in the step can not only be executed by one device but can also be shared and executed by a plurality of devices. In other words, the plurality of pieces of processing included in one step can be executed as pieces of processing in a plurality of steps. Conversely, the pieces of processing described as a plurality of steps can collectively be executed as one step.

Note that, in the program executed by the computer, processing of the steps for describing the program may be executed in chronological order in the order described in this specification, or may be executed in parallel or individually at a necessary time such as at a time when calling is performed. That is, the processing of the steps may be executed in different order from the above-mentioned order unless it is inconsistent. Moreover, the processing of the steps for describing the program may be executed in parallel with processing of another program, or may be executed in combination with processing of another program.

Note that the plurality of the present technologies described in the present specification can be carried out independently and individually unless it is inconsistent. It is to be understood that some of the plurality of the present technologies can be carried out in combination. For example, some or all of the present technologies described in one of the embodiments may be combined with some or all of the present technologies described in another one of the embodiments. Furthermore, a part or an entirety of any of the present technologies described above may be carried out in combination with another technology not described above.

<Example of Configuration Combination>

Note that the present technology can employ the following configuration.

(1)

An information processing apparatus including:
a communication module that performs protocol negotiation for content uplink stream,
in which the communication module
transmits to an other communication device a Service object that includes information regarding stream of a content for use in the protocol negotiation,
receives from the other communication device information for negotiation transmitted on the basis of the Service object, and
performs control protocol negotiation for the content uplink stream with the other communication device.

(2)

The information processing apparatus according to (1) described above,
in which, in the Service object, a plurality of CandidateDescriptions for a protocol and a format for use in the content uplink stream is described as candidates.

(3)

The information processing apparatus according to (2) described above,
in which the Service object includes priority assigned to each of the plurality of CandidateDescriptions.

(4) The information processing apparatus according to (3) described above,
in which the priority is determined in accordance with a network bandwidth situation.

(5)

The information processing apparatus according to (2) or (3) described above,
in which each of the plurality of CandidateDescriptions includes WorkflowDescription that defines an other application related to media processing in the other communication device and a resource condition required for the media processing.

(6)

The information processing apparatus according to any one of (2) to (5) described above,
in which the Information for the negotiation includes information of the CandidateDescription selected by the other communication device on the basis of the Service object.

(7)

The information processing apparatus according to (6) described above,
in which, on the basis of the information for the negotiation, a Session object is stored in the Service object on the basis of the CandidateDescription selected from the Service object.

(8)

The information processing apparatus according to any one of (1) to (7) described above,
in which the Service object is generated by the communication module serving as a side that transmits a content in the content uplink stream.

(9)

The information processing apparatus according to any one of (1) to (8) described above,
in which a plurality of the information processing apparatuses is connected via a network to form an information processing system, and
in the information processing apparatus located close to the other communication device, an application serving as the communication module is executed, and an other application is connected at a subsequent stage to the application serving as the communication module and is executed.

(10)

The information processing apparatus according to (9) described above, in which, in a case where, in the information processing apparatus located close to the other communication device, a resource required for the other application connected at a subsequent stage to the application serving as the communication module is unable to be secured, the other application is executed on the other information processing apparatus than the information processing apparatus on which the application serving as the communication module is executed.

(11)

The information processing apparatus according to (10) described above, in which, when a handover occurs due to movement of the other communication device, the information processing apparatus which is a first apparatus before transfer negotiates with the information processing apparatus which is a second apparatus after transfer to secure the resource required for the other application.

(12)

The information processing apparatus according to (11) described above, in which, in a state where a first part of the other application is maintained in the information processing apparatus which is the first apparatus before transfer, a second part other than the first part is executed in the information processing apparatus which is the second apparatus after transfer.

(13)

The information processing apparatus according to (12) described above, in which, the other application is executed in a plurality of the information processing apparatuses as the information processing apparatuses which are the second apparatuses after transfer.

(14)

The information processing apparatus according to any one of (1) to (7) described above, in which the Service object is generated by the communication module serving as a side that receives a content in the content uplink stream.

(15)

The information processing apparatus according to any one of (1) to (8) and (14) described above, in which a plurality of the other communication devices is connected via a network to form an information processing system, and in the other communication device located close to the information processing apparatus, an application serving as the communication module is executed, and an other application is connected at a subsequent stage to the application serving as the communication module and is executed.

(16)

The information processing apparatus according to (15) described above, in which, in a case where, in the other communication device located close to the information processing apparatus, a resource required for the other application connected at a subsequent stage to the application serving as the communication module is unable to be secured, the other application is executed on the other different communication device than the other communication device on which the application serving as the communication module is executed.

(17)

The information processing apparatus according to (16) described above, in which, when a handover occurs due to movement of the information processing apparatus, the other communication device which is a first device before transfer negotiates with the other communication device which is a second device after transfer to secure the resource required for the other application.

(18)

The information processing apparatus according to (17) described above, in which, in a state where a first part of the other application is maintained in the other communication device which is the first device before transfer, a second part other than the first part is executed in the other communication device which is the second device after transfer.

The information processing apparatus according to (18) described above, in which, the other application is executed in a plurality of the other communication devices as the other communication devices which are the second devices after transfer.

(20)

An information processing method including:

a communication module that performs protocol negotiation for content uplink stream, transmitting to an other communication device a Service object that includes information regarding stream of a content for use in the protocol negotiation, receiving from the other communication device information for negotiation transmitted on the basis of the Service object, and performing control protocol negotiation for the content uplink stream with the other communication device.

Note that the present embodiments are not limited to the aforementioned embodiments, and that various changes can be made without departing from the scope of the present disclosure. Also, effects described in the present description are illustrative only and shall not be limited, and other effects may exist.

REFERENCE SIGNS LIST

11 Information processing system
12 Cloud
13 Base station
14 User terminal
21 FLUS-Source
31 and 32 ME-Host
33 ME-Orchestrator
41 FLUS-Sink
42 Data retention processing unit (Cache/PStorage)
43 Transcoding processing unit
44 Database retention unit
45 Storage device
51 Production network processing unit
52 Distribution processing unit
53 Database retention unit
54 Storage unit
61 Database retention unit
71 5G core network
72 Access network
81 Data plane
82 Application
83 ME-Platform
84 UPF

The invention claimed is:

1. An information processing apparatus comprising:
at least one processor; and
a communication module configured to perform protocol negotiation for content uplink stream,
transmit, to an other communication device, a Service object that includes information regarding stream of a content for use in the protocol negotiation,
receive, from the other communication device, information for negotiation transmitted on a basis of the Service object, and
perform control protocol negotiation for the content uplink stream with the other communication device,
wherein, in the Service object, a plurality of CandidateDescriptions for a protocol and a format for use in the content uplink stream is described as candidates,
wherein the Service object includes priority assigned to each CandidateDescription of the plurality of CandidateDescriptions,
wherein the priority assigned to each CandidateDescription of the plurality of CandidateDescriptions is expressed by a list appearance order in a CandidateDescriptions object, and
wherein the communication module is implemented via the at least one processor.

2. The information processing apparatus according to claim 1,
wherein the priority is determined in accordance with a network bandwidth situation.

3. The information processing apparatus according to claim 1,
wherein each CandidateDescription of the plurality of CandidateDescriptions includes WorkflowDescription that defines an other application related to media processing in the other communication device and a resource condition required for the media processing.

4. The information processing apparatus according to claim 1,
wherein the information for the negotiation includes information of the CandidateDescription selected by the other communication device on a basis of the Service object.

5. The information processing apparatus according to claim 4,
wherein, on a basis of the information for the negotiation, a Session object is stored in the Service object on a basis of the CandidateDescription selected from the Service object.

6. The information processing apparatus according to claim 1,
wherein the Service object is generated by the communication module serving as a side that transmits a content in the content uplink stream.

7. The information processing apparatus according to claim 1,
wherein a plurality of the information processing apparatuses is connected via a network to form an information processing system, and
in the information processing apparatus located in a vicinity of the other communication device, an application serving as the communication module is executed, and an other application is connected at a subsequent stage to the application serving as the communication module and is executed.

8. The information processing apparatus according to claim 7,
wherein, in a case where, in the information processing apparatus located in a vicinity of the other communication device, a resource required for the other application connected at a subsequent stage to the application serving as the communication module is unable to be secured,
the other application is executed on the other information processing apparatus than the information processing apparatus on which the application serving as the communication module is executed.

9. The information processing apparatus according to claim 8,
wherein, when a handover occurs due to movement of the other communication device, the information processing apparatus which is a first apparatus before transfer negotiates with the information processing apparatus which is a second apparatus after transfer to secure the resource required for the other application.

10. The information processing apparatus according to claim 9,
wherein, in a state where a first part of the other application is maintained in the information processing apparatus which is the first apparatus before transfer, a second part other than the first part is executed in the information processing apparatus which is the second apparatus after transfer.

11. The information processing apparatus according to claim 10,
wherein, the other application is executed in a plurality of the information processing apparatuses as the information processing apparatuses which are the second apparatuses after transfer.

12. The information processing apparatus according to claim 1,
wherein the Service object is generated by the communication module serving as a side that receives a content in the content uplink stream.

13. The information processing apparatus according to claim 1,
wherein a plurality of the other communication devices is connected via a network to form an information processing system, and
in the other communication device located in a vicinity of the information processing apparatus, an application serving as the communication module is executed, and an other application is connected at a subsequent stage to the application serving as the communication module and is executed.

14. The information processing apparatus according to claim 13,
wherein, in a case where, in the other communication device located in a vicinity of the information processing apparatus, a resource required for the other application connected at a subsequent stage to the application serving as the communication module is unable to be secured,
the other application is executed on the other different communication device than the other communication device on which the application serving as the communication module is executed.

15. The information processing apparatus according to claim 14,
wherein, when a handover occurs due to movement of the information processing apparatus, the other communication device which is a first device before transfer negotiates with the other communication device which is a second device after transfer to secure the resource required for the other application.

16. The information processing apparatus according to claim 15, wherein, in a state where a first part of the other application is maintained in the other communication device which is the first device before transfer, a second part other than the first part is executed in the other communication device which is the second device after transfer.

17. The information processing apparatus according to claim 16,
wherein, the other application is executed in a plurality of the other communication devices as the other communication devices which are the second devices after transfer.

18. An information processing method to be used by a processor, the method comprising:
performing protocol negotiation for content uplink stream;
transmitting, to an other communication device, a Service object that includes information regarding stream of a content for use in the protocol negotiation;
receiving, from the other communication device, information for negotiation transmitted on a basis of the Service object; and
performing control protocol negotiation for the content uplink stream with the other communication device,
wherein, in the Service object, a plurality of CandidateDescriptions for a protocol and a format for use in the content uplink stream is described as candidates,
wherein the Service object includes priority assigned to each CandidateDescription of the plurality of CandidateDescriptions, and
wherein the priority assigned to each CandidateDescription of the plurality of CandidateDescriptions is expressed by a list appearance order in a CandidateDescriptions object.

19. A non-transitory computer-readable medium having embodied thereon a program, which when executed by a computer causes the computer to execute an information processing method, the method comprising:
performing protocol negotiation for content uplink stream;
transmitting, to an other communication device, a Service object that includes information regarding stream of a content for use in the protocol negotiation;
receiving, from the other communication device, information for negotiation transmitted on a basis of the Service object; and
performing control protocol negotiation for the content uplink stream with the other communication device,
wherein, in the Service object, a plurality of CandidateDescriptions for a protocol and a format for use in the content uplink stream is described as candidates,
wherein the Service object includes priority assigned to each CandidateDescription of the plurality of CandidateDescriptions, and
wherein the priority assigned to each CandidateDescription of the plurality of CandidateDescriptions is expressed by a list appearance order in a CandidateDescriptions object.

\* \* \* \* \*